United States Patent
Rattray et al.

(10) Patent No.: US 9,207,812 B2
(45) Date of Patent: Dec. 8, 2015

(54) INTERACTIVE INPUT SYSTEM AND METHOD

(71) Applicant: SMART Technologies ULC, Calgary (CA)

(72) Inventors: Robbie Rattray, Calgary (CA); Grant McGibney, Calgary (CA); Rob Barton, Calgary (CA); Cameron Taylor, Calgary (CA); David Holmgren, Calgary (CA); Peter Shivkumar, Calgary (CA); Nicole Martin, Calgary (CA); Dmitry Elman, Calgary (CA); Alexis Guillemin, Calgary (CA); Patrick Marcil, Calgary (CA); Yun Zhang, Calgary (CA)

(73) Assignee: SMART Technologies ULC, Calgary (CA)

( * ) Notice: Subject to any disclaimer, the term of this patent is extended or adjusted under 35 U.S.C. 154(b) by 0 days.

(21) Appl. No.: 13/823,483

(22) PCT Filed: Jan. 11, 2013

(86) PCT No.: PCT/CA2013/000023
§ 371 (c)(1),
(2) Date: Mar. 14, 2013

(87) PCT Pub. No.: WO2013/104061
PCT Pub. Date: Jul. 18, 2013

(65) Prior Publication Data
US 2014/0313166 A1    Oct. 23, 2014

Related U.S. Application Data

(60) Provisional application No. 61/720,378, filed on Oct. 30, 2012, provisional application No. 61/663,443, filed on Jun. 22, 2012, provisional application No. 61/585,252, filed on Jan. 11, 2012.

(51) Int. Cl.
G03B 21/26    (2006.01)
G06K 11/06    (2006.01)
(Continued)

(52) U.S. Cl.
CPC ........... *G06F 3/0425* (2013.01); *F21V 5/04* (2013.01); *F21V 21/14* (2013.01); *G03B 21/134* (2013.01);
(Continued)

(58) Field of Classification Search
CPC ........... G03B 21/134; G03B 21/2046; G03B 21/132; G03B 21/13; G03B 21/26; H04N 9/3194; H04N 9/3129; G06F 3/0421; G06F 3/0423; G06F 3/042; G06F 3/0425
USPC ............... 353/122, 121, 29; 178/18.11, 18.09
See application file for complete search history.

(56) References Cited

U.S. PATENT DOCUMENTS 5,448,263 A    9/1995  Martin
6,141,000 A    10/2000 Martin
(Continued)

FOREIGN PATENT DOCUMENTS

CN     102375622 A      3/2012
WO     20041072843 A1   8/2004

OTHER PUBLICATIONS

Stephen Boyd and Lieven Vandenberghe, "Convex Optimization", Cambridge University Press, 2004.
(Continued)

*Primary Examiner* — William C Dowling
*Assistant Examiner* — Ryan Howard
(74) *Attorney, Agent, or Firm* — Katten Muchin Rosenman LLP

(57) ABSTRACT

A method for adjusting the position of a light curtain emitted by an illumination assembly over a surface, comprises determining a position of the light curtain; calculating a difference between the determined position of the light curtain and a desired position of the light curtain; and adjusting the position of the illumination assembly based on the calculated difference.

39 Claims, 66 Drawing Sheets

(51) Int. Cl.
*G06F 3/042* (2006.01)
*G03B 21/134* (2006.01)
*H04N 5/351* (2011.01)
*G06F 3/0354* (2013.01)
*H04N 9/31* (2006.01)
*F21V 5/04* (2006.01)
*F21V 21/14* (2006.01)
*G06F 3/038* (2013.01)
*G06F 3/041* (2006.01)

(52) U.S. Cl.
CPC ............ *G06F 3/0354* (2013.01); *G06F 3/0386* (2013.01); *G06F 3/03542* (2013.01); *G06F 3/042* (2013.01); *G06F 3/0416* (2013.01); *G06F 3/0418* (2013.01); *H04N 5/351* (2013.01); *H04N 9/3179* (2013.01); *H04N 9/3194* (2013.01)

(56) References Cited

U.S. PATENT DOCUMENTS

| | | | |
|---|---|---|---|
| 6,281,878 B1 | 8/2001 | Montellese | |
| 6,337,681 B1 | 1/2002 | Martin | |
| 6,421,042 B1* | 7/2002 | Omura et al. | 345/157 |
| 6,540,366 B2 | 4/2003 | Keenan et al. | |
| 6,747,636 B2 | 6/2004 | Martin | |
| 6,803,906 B1 | 10/2004 | Morrison et al. | |
| 7,176,904 B2 | 2/2007 | Satoh | |
| 7,232,986 B2 | 6/2007 | Worthington et al. | |
| 7,236,162 B2 | 6/2007 | Morrison et al. | |
| 7,268,774 B2 | 9/2007 | Pittel et al. | |
| 7,274,356 B2 | 9/2007 | Ung et al. | |
| 7,307,661 B2 | 12/2007 | Lieberman et al. | |
| 2004/0179001 A1 | 9/2004 | Morrison et al. | |
| 2005/0264772 A1* | 12/2005 | Masukawa | 353/122 |
| 2007/0086085 A1 | 4/2007 | Kitaoka et al. | |
| 2010/0079385 A1 | 4/2010 | Holmgren et al. | |
| 2010/0201812 A1* | 8/2010 | McGibney et al. | 348/143 |
| 2011/0080344 A1 | 4/2011 | Dura et al. | |
| 2011/0242054 A1 | 10/2011 | Tsu | |

OTHER PUBLICATIONS

Transmittal; International Search Report; and the Written Opinion of the International Searching Authority for International Application No. PCT/CA2013/000023.

* cited by examiner

1502

INTERACTIVE INPUT SYSTEM AND METHOD

FIELD OF THE INVENTION

The present invention relates to an interactive input system and method.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire disclosures of which are incorporated by reference; touch systems comprising touch panels employing electromagnetic, capacitive, acoustic or other technologies to register pointer input; tablet and laptop personal computers (PCs); smartphones, personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

In some interactive input systems, conventional projection units are employed to project a computer-generated image onto a surface with which a user interacts. For example, U.S. Pat. No. 6,540,366 to Keenan et al., assigned to SMART Technologies ULC, discloses an overhead projection system comprising an overhead projector support assembly extending generally horizontally from a generally vertical support surface. A touch-sensitive display screen having a display surface is mounted on the support surface beneath the projector support assembly. A projector is mounted on the projector support assembly adjacent to its distal end and is aimed to project images onto the display surface of the touch-sensitive display screen. The touch-sensitive display screen outputs control signals in response to contacts made thereon. The control signals are then conveyed to a personal computer, which uses the control signals to update the application program being executed and to update the image projected onto the touch-sensitive display surface by the projector.

U.S. Pat. No. 6,281,878 to Montellese discloses an input device for detecting input with respect to a reference plane. The input device includes a light source, a light sensor and a processor. The light source provides a plane of light adjacent to a reference plane, such as a solid surface of a desktop, on which an input template image of a keyboard is projected by a projector. The light sensor having an acute angle with respect to the reference plane, senses light reflected by an object, such as a finger close to the plane of light and generates a signal indicative of sensed light. The processor determines a position of the object with respect to the reference plane based on response of the sensor.

U.S. Pat. No. 7,268,774 to Pittel et al. discloses a writing instrument and a method of tracking motion of the writing instrument. Light emitted by the writing instrument is detected by two spaced sensors clipped to the edge of a writing surface such as a piece of paper. Locations of the moving writing instrument are determined based on the sensor signals and stored in the writing instrument. Handwriting is then automatically reconstructed when the stored information is downloaded into a computer.

U.S. Pat. No. 7,307,661 to Lieberman et al. discloses an electronic camera including an imaging sensor. In one embodiment, the electronic camera includes a projection subsystem for projecting an image of a keyboard on a projection surface such as a desktop and an illumination subsystem for directing an illumination pattern parallel to the projection surface. Light scattered or reflected by a data entry object, such as a user's finger, a stylus or other implement close to the keyboard is detected by the imaging sensor. Location of the data entry object is determined by a detection subsystem employing the imaging sensor and is used to indicate which key of the keyboard is being engaged.

U.S. Patent Application Publication No. 2011/0242054 to Tsu discloses a projection system including an image projector, an invisible light transmitter and an invisible light sensor. The image projector is used for projecting a projection image on a physical plane. The invisible light transmitter is used for generating an invisible light plane, which is parallel with the physical plane. The invisible light sensor is in communication with the image projector. When a pointing object is placed on a touching point, an invisible light beam reflected from the pointing object is received by the invisible light sensor. According to the invisible light beam, a sensing signal indicative of a spatial coordinate position of the touching point is acquired and transmitted to the image projector. The image projector recognizes and calculates the spatial coordinate position of the touching point according to the sensing signal and performs a controlling action according to the spatial coordinate position.

Chinese Patent Application No. CN201110336523A to Dai et al. discloses a virtual electronic whiteboard device that includes a linear light source and an image information processing device. The linear light source is provided with a camera and is placed at a display surface such that the light emitted by the light source forms a light touch surface and is parallel to, and infinitely close but without touching the display plane. Images captured by the camera are processed by the image information processing device. When light of the light touch surface is blocked by a touch object to form a touch point, the information processing device processes the images obtained by the camera and determines the position and state of the touch point.

Adjustable light sources have also been developed for many optical devices such as for example laser printers and facsimile machines. For example, U.S. Patent Application Publication No. 2007/0086085 to Kitaoka et al. discloses a light source apparatus that includes a light source unit in which a light source and a light source supporting member having elasticity in an optical axis direction are coupled together, and a collimating lens base member on which a collimating lens is supported. An optical axis direction adjusting member is positioned between the light source unit and the collimating lens base member. A position of the light source unit can be adjusted within a plane approximately perpendicular to the optical axis, and the light source unit can thereafter be secured relative to the collimating lens base member via the light source supporting member. The optical axis direction adjusting member is movable in the optical axis direction, and is disposed such that by its movement it causes the light source supporting member to deform against the elasticity of the light source supporting member, thereby allowing an adjustment of a position of the light source with respect to the collimating lens in the optical axis direction.

Although many different types of interactive input systems exist, improvements are continually being sought. It is therefore an object of the present invention to provide a novel interactive input system and method.

SUMMARY OF THE INVENTION

Accordingly, in one aspect there is provided a method for adjusting the position of a light curtain emitted by an illumination assembly over a surface, comprising determining a position of the light curtain; calculating a difference between the determined position of the light curtain and a desired position of the light curtain; and adjusting the position of the illumination assembly based on the calculated difference.

The adjusting comprises adjusting the position of the illumination assembly until the light curtain is substantially at the desired position. In one embodiment, determining the position of the light curtain comprises adjusting the position of the illumination assembly such that the light curtain intersects with the surface at a first location and capturing a first image frame of the surface; tilting the illumination assembly by a first known angle such that the light curtain intersects with the surface at a second location and capturing a second image frame of the surface; tilting the illumination assembly by a second known angle such that the light curtain intersects with the surface at a third location and capturing a third image frame of the surface; and processing the captured image frames to determine the position of the light curtain. The captured image frames are processed to determine the line of intersection between the light curtain and the surface at each of the first, second and third locations, and the lines of intersection are used to determine the position of the light curtain.

In another embodiment, determining the position of the light curtain comprises measuring the distance between the light curtain and the surface at least at two locations. The calculating comprises comparing the distance between the light curtain and the surface at a first location with the distance between the light curtain and the surface at a second location. The measuring comprises placing a gauge tool adjacent to the surface and processing captured image frames of the gauge tool to determine the distance at least at the two locations. An imaged surface of the gauge tool comprises at least one measurable parameter having a value determined by the distance between the surface and the light curtain.

In another embodiment, the determining comprises capturing image frames of a gauge tool moving across the surface and processing the image frames to obtain a set of data points of light curtain reflections; fitting the data points to a plane represented by a mathematical model to determine the coefficients of the mathematical model; and using the coefficients to determine the required light curtain adjustment. The mathematical model of the plane may be selected assuming the surface is planar in which case the determined light curtain adjustment is the adjustment required to orient the light curtain generally parallel to the surface.

In one form, the data points are fitted to the plane via a least-squares method and the coefficients are solved via singular value decomposition. The data points of the set may be processed to reduce outliers using for example, random consensus fitting.

The method mathematical model of the plane may also be selected assuming the surface is warped or curved in which case, the determined light curtain adjustment is the adjustment required to orient the light curtain so that the minimum separation between the light curtain and any location on the surface is beyond a threshold.

According to another aspect there is provided a gauge tool for an interactive input system comprising a member having a surface to be imaged when the member is brought into contact with a surface and a light curtain over said surface impinges thereon, said surface having at least one measurable parameter having a value determined by the distance between the surface and the light curtain.

According to yet another aspect there is provided an interactive input system comprising an illumination assembly configured to illuminate a light curtain over a surface; an imaging module configured to capture image frames of the surface; and processing structure configured to process captured image frames to determine the location of one or more pointers brought into proximity with said surface and breaking the plane of said light curtain, said processing structure, during calibration, further being configured to perform the above method of adjusting the position of the light curtain relative to said surface.

BRIEF DESCRIPTION OF THE DRAWINGS

Embodiments will now be described more fully with reference to the accompanying drawings in which.

DETAILED DESCRIPTION OF THE EMBODIMENTS

Figure 1:
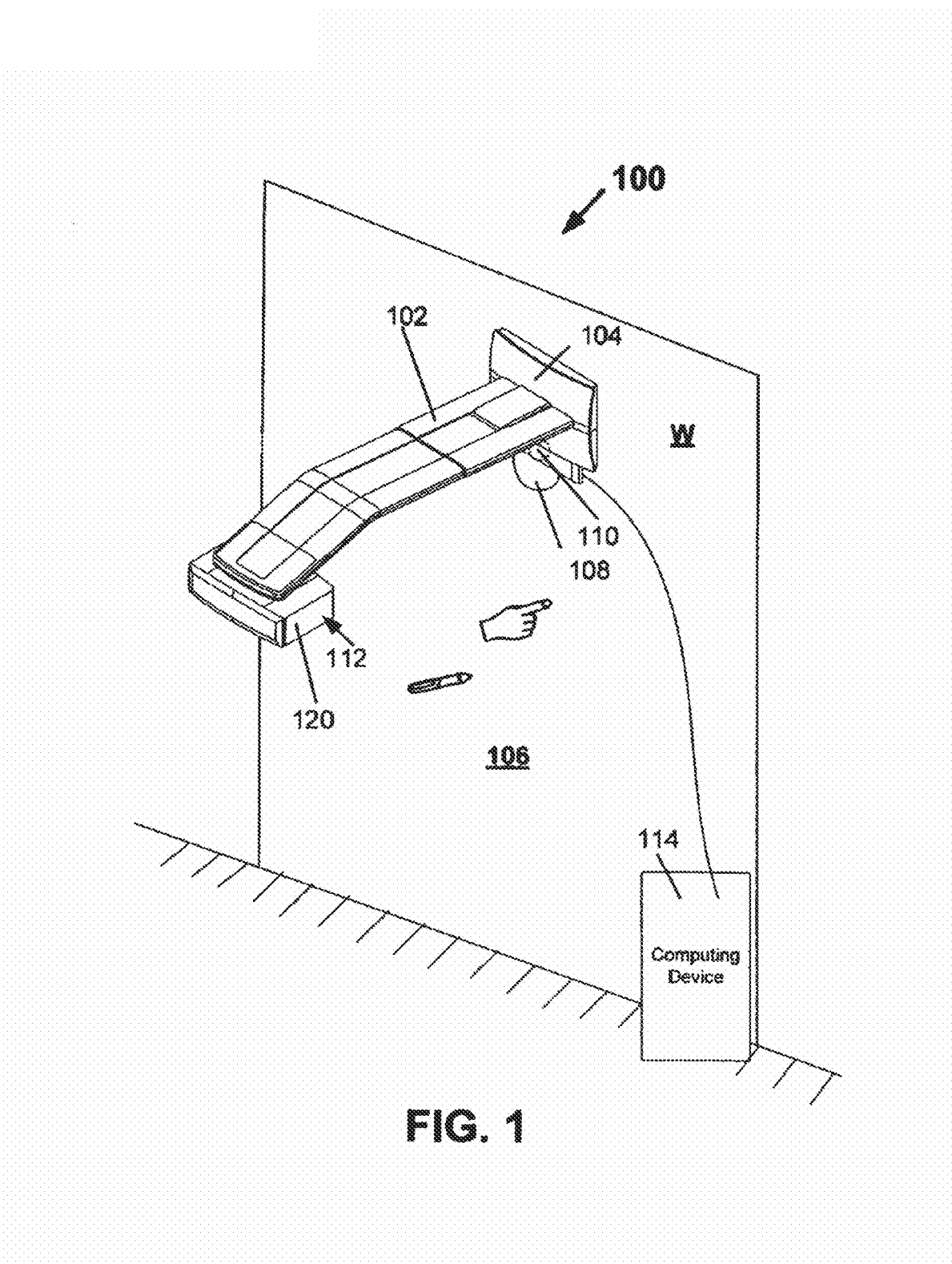
FIG. 1 is a schematic perspective view of an interactive input system.
Figure 2:
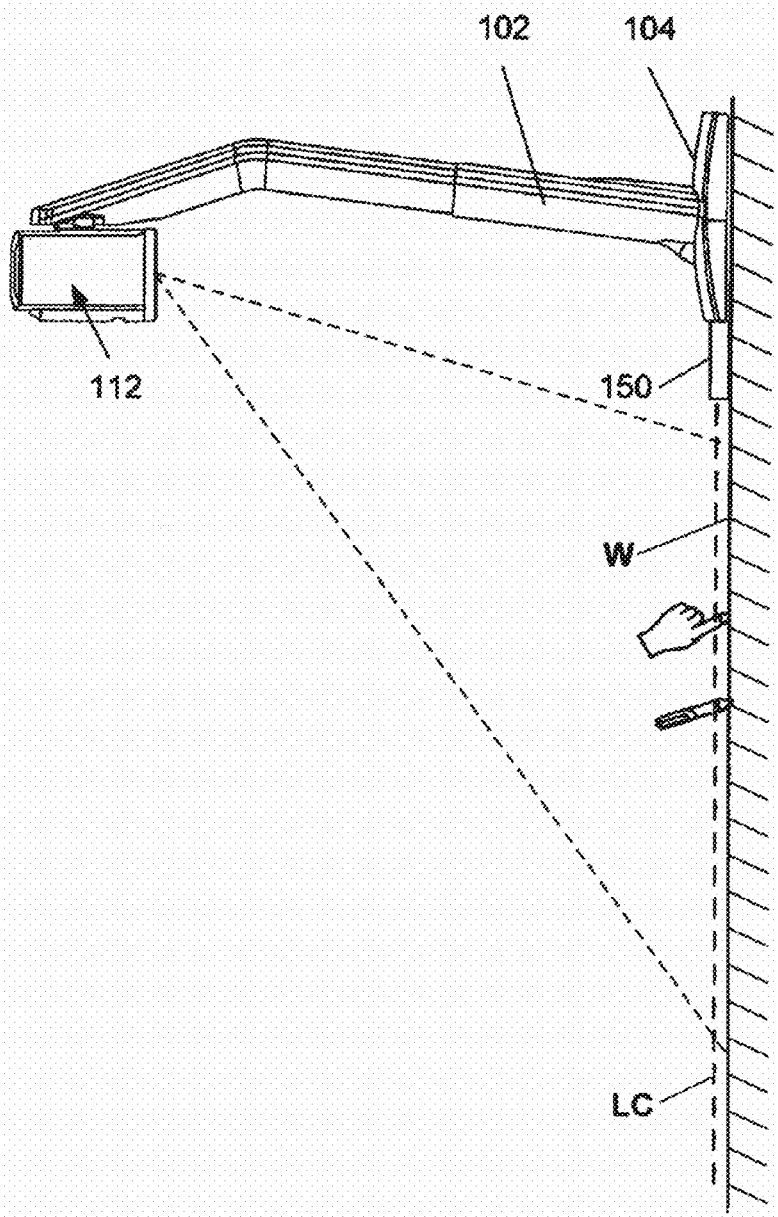
FIG. 2 is a side elevational view of the interactive input system of FIG. 1.
Figure 3:
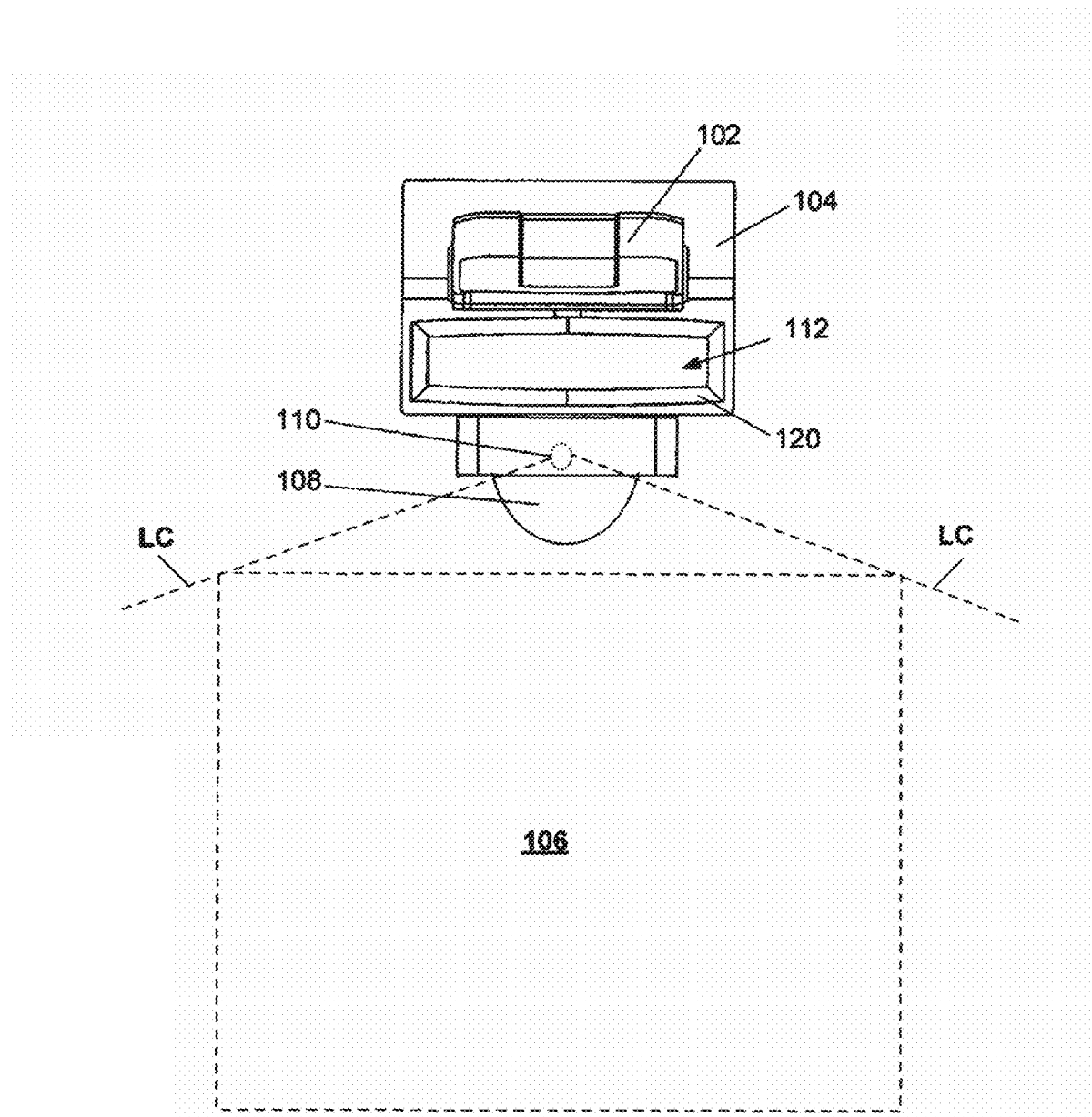
FIG. 3 is a front elevational view of the interactive input system of FIG. 1 showing the upper boundaries of a light curtain and the borders of a region of interest in dotted lines.

Turning now to FIGS. 1 to 3, an interactive input system is shown and is generally identified by reference numeral 100. In this embodiment, interactive input system 100 comprises a support assembly 102 in the form of a boom mounted on a generally upright support surface W such as for example, a wall or the like via a mounting bracket 104. The support assembly 102 is positioned above a region of interest 106 and extends outwardly from the support surface W. An adjustable support 108 that accommodates an illumination assembly 150 (see FIG. 6) is secured to the mounting bracket 104. The illumination assembly 150 is configured to emit a fan-shaped sheet of illumination, referred to as a light curtain LC, over the region of interest 106. An infrared (IR) receiver 110 is positioned above the adjustable support 108. An interactive projector 112 is supported by the support assembly 102 adjacent its distal end and communicates with a general purpose computing device 114. The interactive projector 112 in response to video or image data received from the general purpose computing device 114 projects an image onto the support surface W at least within the region of interest 106 so that the portion of the support surface W within the region of interest defines a display surface. The interactive projector 112 is also configured to detect pointer interaction within the region of interest 106 using one or more pointers and in response to convey pointer data to the general purpose computing device 114. When pointer activity occurs within the region of interest 106, the general purpose computing device 114, in response to received pointer data, adjusts video data that is output to the interactive projector 112, if appropriate, so that the image presented on the display surface reflects pointer activity. In this manner, the interactive projector 112 and the general purpose computing device 114 allow pointer activity within the region of interest 106 proximate to the display surface to be recorded as writing or drawing or used to control execution of one or more application programs executed by the general purpose computing device 114.

Figure 4:
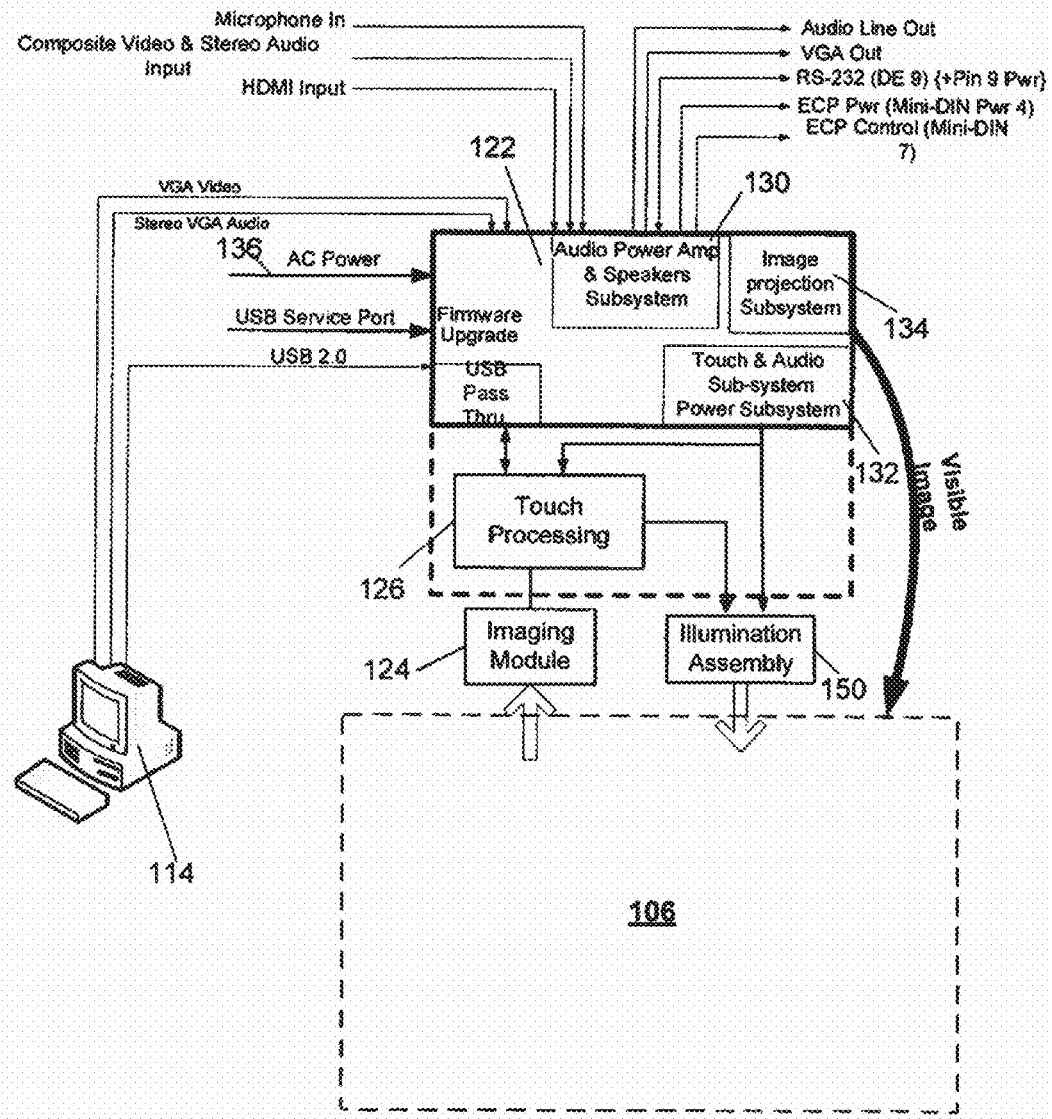
FIG. 4 is a block diagram of an interactive projector and general purpose computing device forming part of the interactive input system of FIG. 1.

The interactive projector 112 comprises a housing 120 that accommodates three main modules, namely a projection module 122, an imaging module 124 and a touch processing module 126 as shown in FIG. 4. The projection module 122 receives video and audio data output by the general purpose computing device 114 and in response displays the image onto the support surface W within the region of interest 106 and broadcasts accompanying audio, if any. The imaging module 124 is configured to capture image frames of the region of interest 106. The touch processing module 126 is configured to process image frames captured by the imaging module 124 and to generate pointer data that is conveyed to the general purpose computing device 114 when pointer activity occurs within the region of interest 106.

In this embodiment, the projection module 122 comprises an audio power amplifier and speaker subsystem 130, a touch processing module power subsystem 132 and an image projection subsystem 134. Power for the interactive projector 112 is supplied by a power cable 136 that runs through the support assembly 102 and connects the projection module 122 to an AC mains or other suitable power supply. The projection module 122 also comprises a plurality of input ports and output ports. In particular, the projection module 122 comprises VGA video and stereo VGA audio ports that receive video and audio data output by the general purpose computing device 114. The image projection subsystem 134 is responsive to video data received from the general purpose computing device 114 and is configured to project the image onto the support surface W within the region of interest 106. The audio power amplifier and speaker subsystem 130 is responsive to audio data received from the general purpose computing device 114 and is configured to broadcast audio that accompanies the video image projected onto the support surface W within the region of interest 106. The touch processing module power subsystem 132 provides power to the touch processing module 126 and to the illumination assembly 150.

The general purpose computing device 114 is also connected to a USB pass-through port 138 of the projection module 122 that allows the general purpose computing device 114 to communicate with the touch processing module 126. The projection module 122 further comprises microphone in, composite video and stereo audio, HDMI, USB service and RS-232 input ports as well as audio, VGA, ECP power and ECP control output ports.

The imaging module 124 in this embodiment comprises an image sensor (not shown) having a resolution of 752×480 pixels, such as that manufactured by Micron under model No. MT9V034 fitted with an optical imaging lens. The lens of the image sensor has an IR-pass/visible light blocking filter thereon and provides the image sensor with a 118 degree field of view so that the field of view of the image sensor at least encompasses the entire region of interest 106. As a result, the field of view of the image sensor covers an area ranging from 67 inches up to 100 inches diagonal in any of 16:9, 16:10 or 4:3 aspect ratios. In this manner, any pointer such as a user's finger F, a passive pen tool, an active pen tool or other suitable object that is brought into the region of interest 106 in proximity with the display surface appears in the field of view of the image sensor and thus, is captured in image frames acquired by the image sensor.

Figure 5:
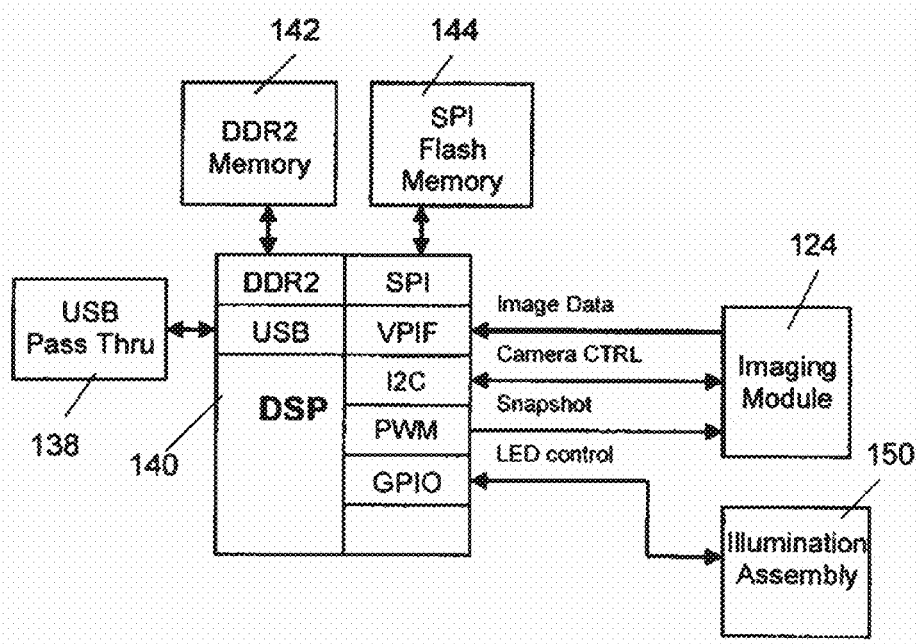
FIG. 5 is a block diagram of a touch processing module forming part of the interactive projector of FIG. 4.

Turning now to FIG. 5, the touch processing module 126 is better illustrated. In this embodiment, the touch processing module 126 comprises a digital signal processor (DSP) 140 having a plurality of ports, namely a USB port, a double data rate memory (DDR2) port, a serial peripheral interface (SPI) port, a video interface (VPIF) port, an inter-integrated circuit (I2C) port, a pulse width modulation (PWM) port and a general purpose input/output (GPIO) port. The DSP 140 is connected to the USB pass-through port 138 of the projection module 122 via its USB port allowing the DSP 140 to communicate with the general purpose computing device 114. The DDR2 port connects the DSP 140 to a DDR2 memory 142 that stores program code in a data buffer. The SPI port connects the DSP 140 to an SPI flash memory 144 that stores the firmware required for the DSP 140. The VPIF port is connected to the image sensor of the imaging module 124 allowing image frames captured by the image sensor of the imaging module 124 to be conveyed to the DSP 140. The DSP 140 sends commands to the image sensor via its PWM I2C port to configure the image sensor, such as for example, to adjust the exposure time of the image sensor. The DSP 140 provides synchronization signals to the image sensor via its PWM port to control the timing of image frame capture. The DSP 140 also provides synchronization signals to the illumination assembly 150 via its GPIO port to control switching of the illumination assembly 150 as will be described.

The general purpose computing device 114 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computing device components to the processing unit. The general purpose computing device 114 may also comprise networking capabilities using Ethernet, WiFi, and/or other network formats, to enable access to shared or remote drives, one or more networked computers, or other networked devices.

Figure 6:
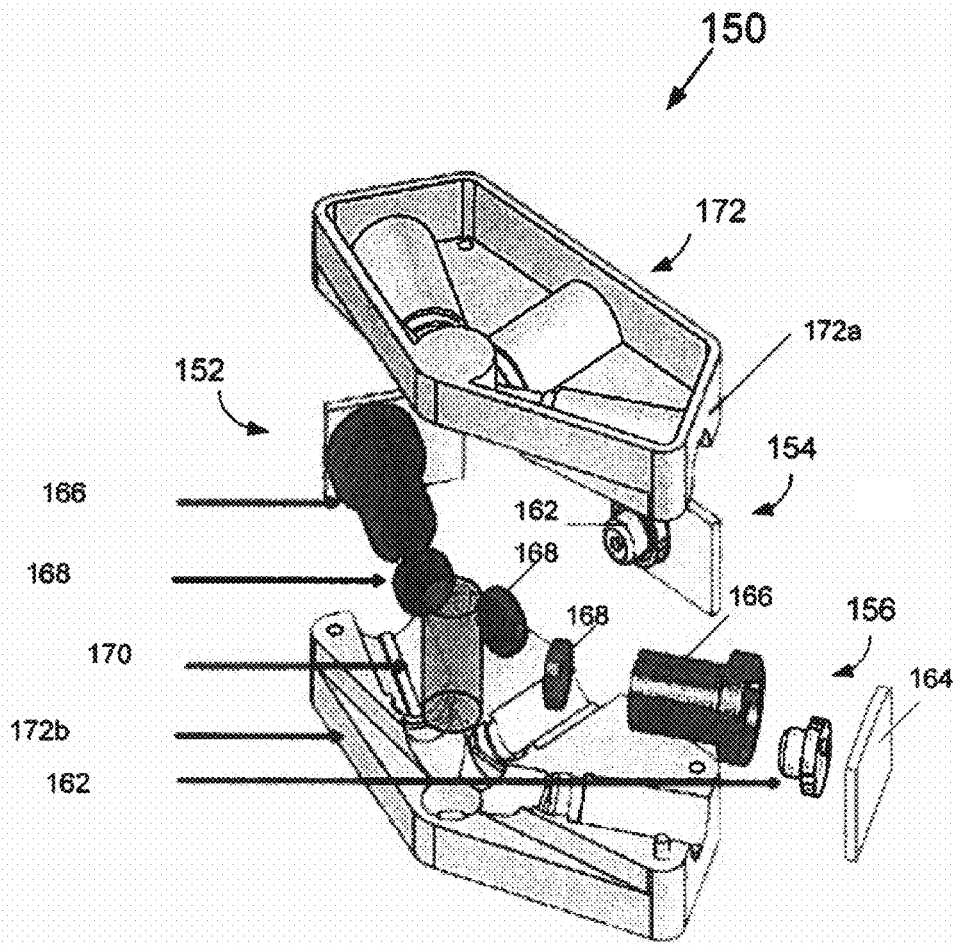
FIG. 6 is an exploded perspective view of an illumination assembly forming part of the interactive input system of FIG. 1 for generating the light curtain.

Turning now to FIG. 6, the illumination assembly 150 is better illustrated. As can be seen, the illumination assembly 150 comprises a plurality of illumination units, in this embodiment, three (3) illumination units 152, 154 and 156. Each illumination unit comprises an illumination source comprising for example, an infrared (IR) laser diode 162 mounted on a control board 164. The IR laser diode 162 is fitted into one end of a focusing barrel 166. The opposite end of the focusing barrel 166 supports a focusing lens 168, such as for example, a plano-convex lens. The illumination units 152, 154 and 156 are arranged at circumferentially spaced locations about a cylindrical collimating lens 170. In this embodiment, the illumination units 152, 154 and 156 are arranged at approximately 60° intervals about the cylindrical collimating lens 170. The optical components of the illumination assembly 150 are accommodated by a housing 172 that comprises a pair of mating housing parts 172a and 172b. The facing surfaces of the housing parts 172a and 172b are molded with formations complimentary to the configurations of the optical components of the illumination assembly 150 to inhibit shifting of the optical components and thereby maintain their optical alignment.

During operation, when the illumination units 152, 154 and 156 are powered, the IR laser diodes 162 emit infrared illumination that travels down confined paths defined by the focusing barrels 166. The infrared illumination exiting the focusing barrels 166 is focused onto the cylindrical collimating lens 170 by the focusing lenses 168. The cylindrical collimating lens 170 in turn emits the fan-shaped sheet of IR illumination or light curtain LC over the entire region of interest 106.

Figure 7:
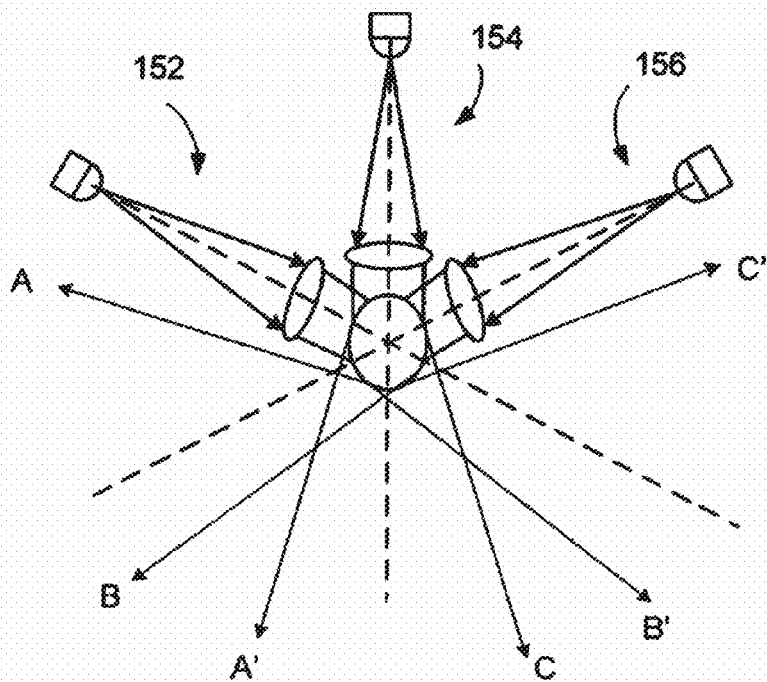
FIG. 7 is a schematic front elevational illustration showing optical components of the illumination assembly of FIG. 6.
Figure 8:
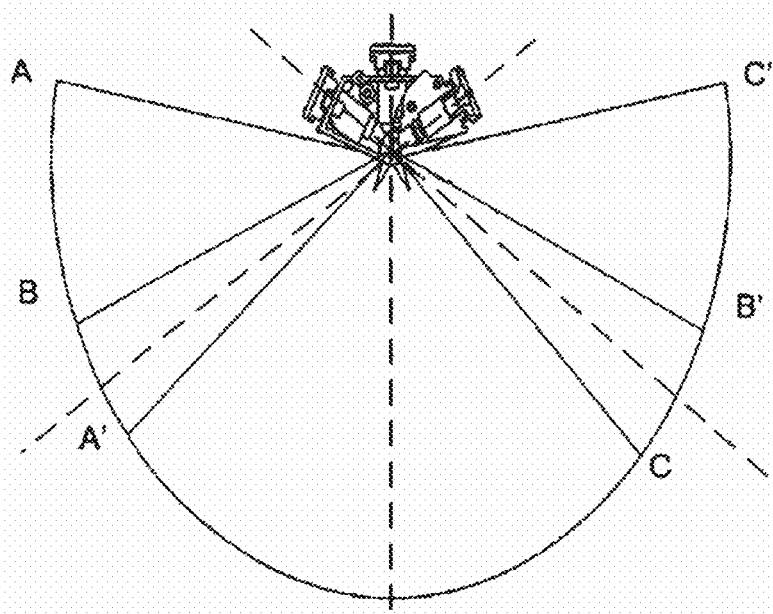
FIG. 8 is a schematic front elevational view of the illumination assembly of FIG. 6 showing its illumination footprint.
Figure 9:
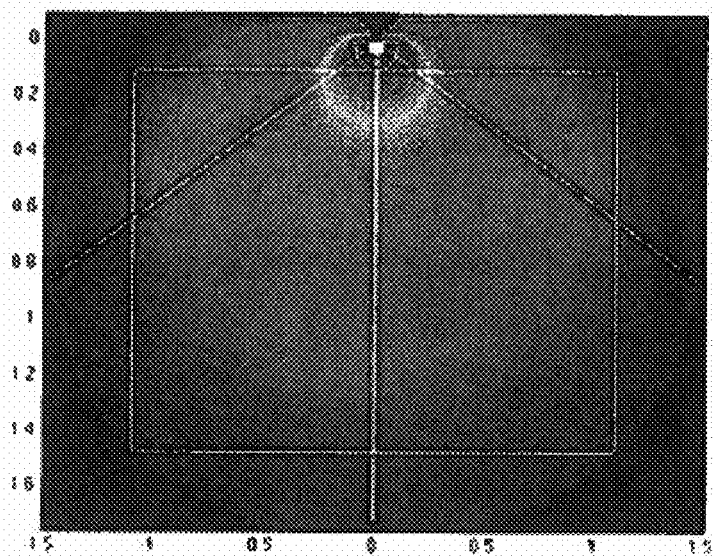
FIG. 9 is an image showing the intensity distribution of illumination emitted by the illumination assembly of FIG. 6.
Figure 10:
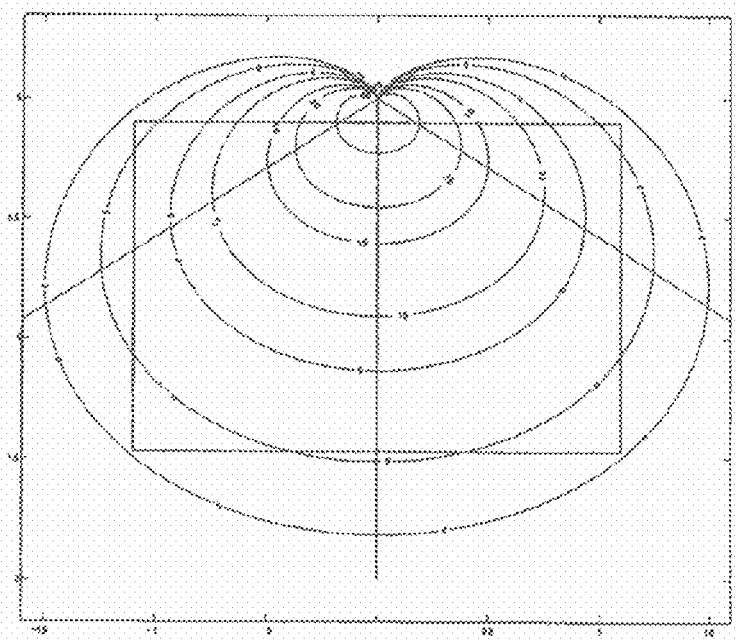
FIG. 10 is a plot of the intensity distribution of illumination emitted by the illumination assembly of FIG. 6.
Figure 11A:
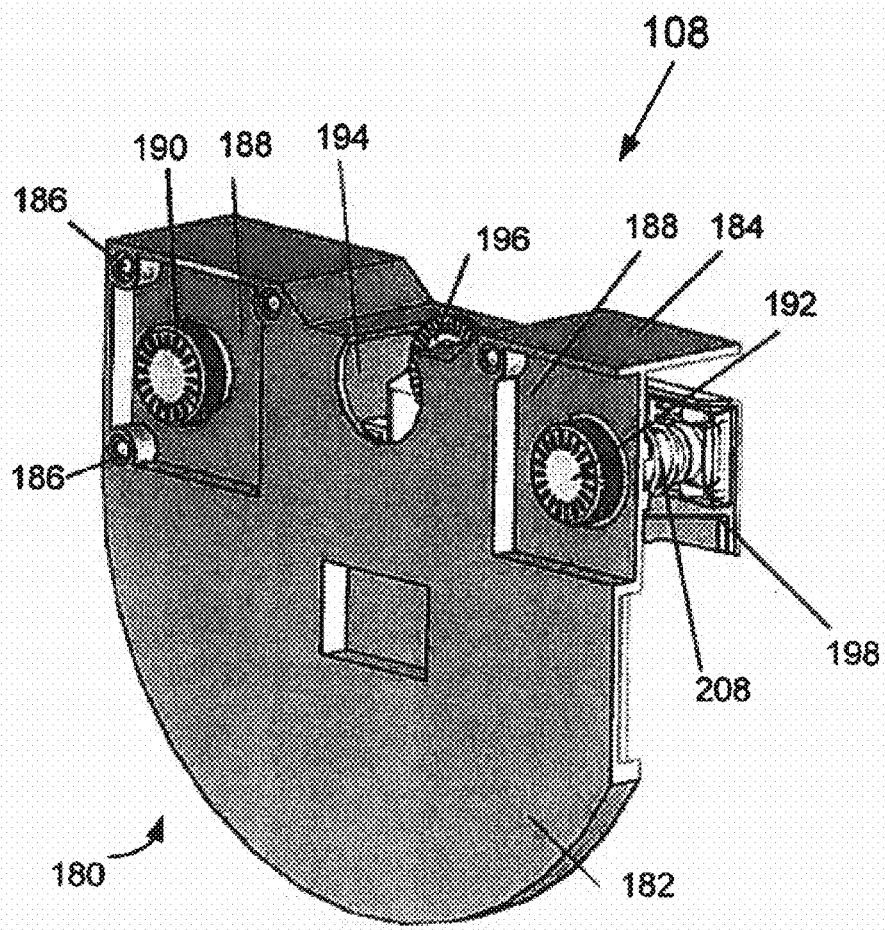
FIG. 11A is a perspective view of an adjustable support for the illumination assembly of FIG. 6.
Figure 11B:
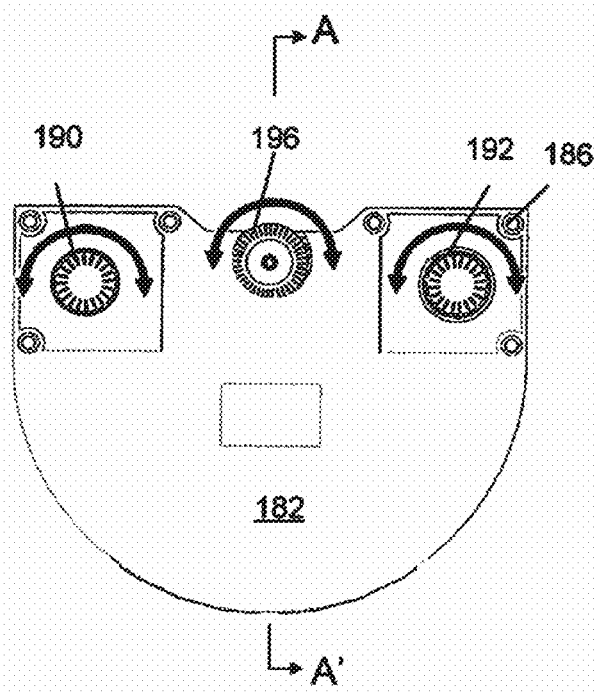
FIG. 11B is a front elevational view of the adjustable support of FIG. 11A.
Figure 11C:
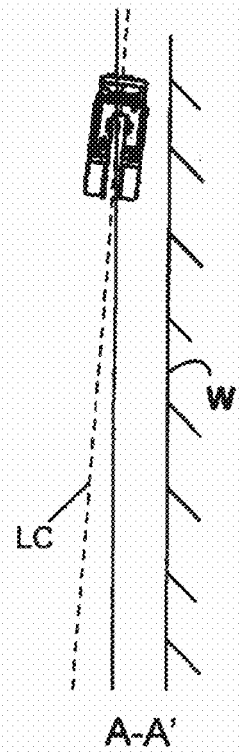
FIG. 11C is a side cross-sectional view of the adjustable support of FIG. 11A.
Figure 11D:
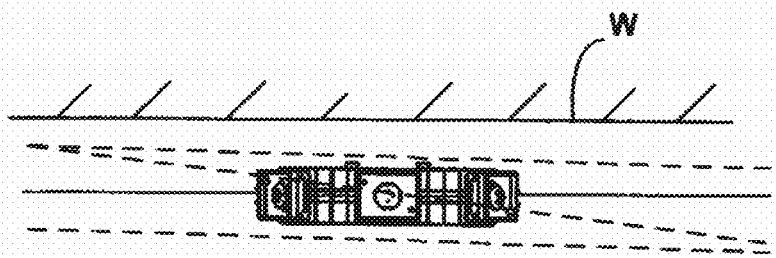
FIG. 11D is a top plan view of the adjustable support of FIG. 11A.
Figures 11E, 11F:
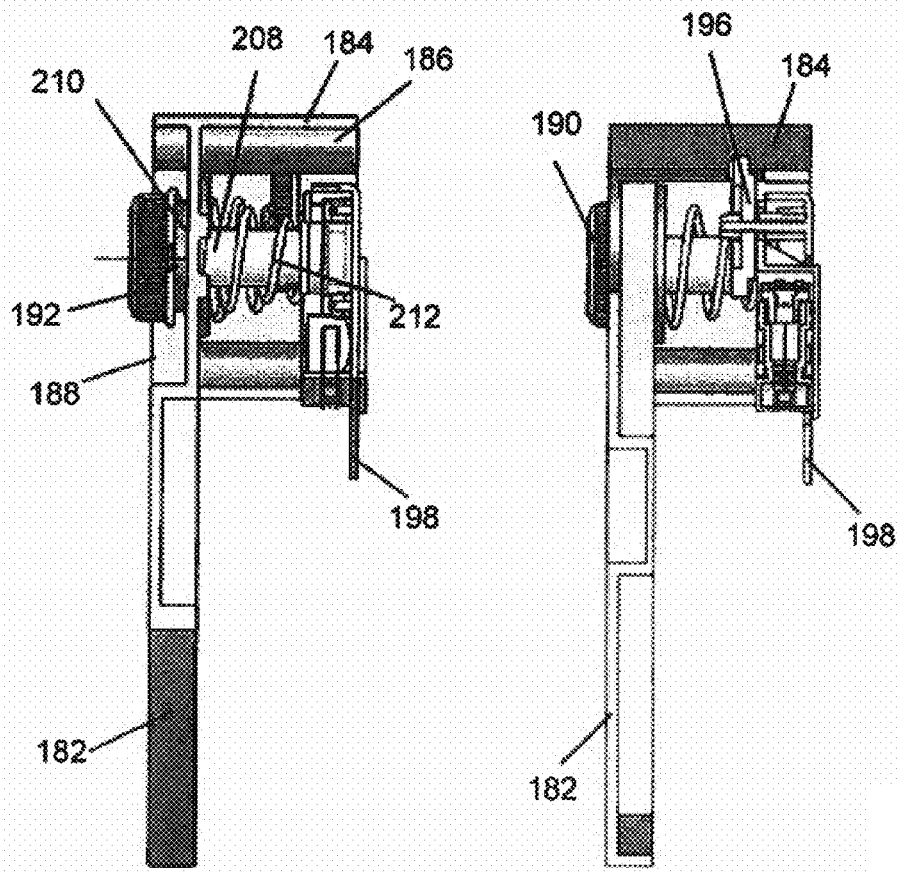
FIGS. 11E and 11F are side cross-sectional views of the adjustable support of FIG. 11A.

Each illumination unit 152, 154 and 156 is responsible for providing the IR illumination for an associated sector of the light curtain LC. The circumferential spacing of the illumination units 152, 154 and 156 and the configuration of the cylindrical collimating lens 170 are selected so that adjacent sectors overlap. As can be seen in FIGS. 7 and 8, illumination unit 152 is responsible for providing the IR illumination for sector C'C of the light curtain LC. Illumination unit 154 is responsible for providing the IR illumination for sector B'B of the light curtain LC and illumination unit 156 is responsible for providing the IR illumination for sector A'A of the light curtain LC. Illumination sectors C'C and A'A partially overlap with opposite sides of illumination sector B'B. The overlapping portions of the illumination sectors correspond to areas of the region of interest 106 that extend furthest from the illumination assembly 150 thereby to boost IR illumination to these areas and ensure that the entire region of interest 106 is generally evenly illuminated by the illumination assembly 150. FIG. 9 is an image showing the light curtain LC emitted by the illumination assembly 150 and FIG. 10 is a plot of the intensity distribution of the light curtain LC. As will be appreciated, the light curtain LC covers a wide range and has a generally even intensity distribution.

Turning now to FIGS. 11A to 11F, the adjustable support 108 for the illumination assembly 150 is better illustrated. As can be seen, the adjustable support 108 comprises a housing 180 having a front face plate 182 and a top plate 184. Through passages 186 are provided in the front face plate 182 to accommodate fasteners (not shown) used to fasten the support 108 to the mounting bracket 104. Laterally spaced recesses 188 are formed in the front face plate 182 and accommodate left and right rotatable adjustment knobs 190 and 192, respectively. A central opening 194 is provided in the front face plate 182 and the top plate 184 to expose a central rotatable adjustment knob 196. A back plate 198, positioned behind the front face plate 182 and adjacent the adjustment knobs, is coupled to the front face plate 182 via adjustment mechanisms 200, 202 and 204, each of which is associated with a respective one of the adjustment knobs 190, 192 and 196, respectively.

Each adjustment mechanism 200 and 202 comprises a spindle 208 that is affixed to its respective adjustment knob 190 or 192 and that passes through a washer 210 and a passage in the front face plate 182. The distal end of the spindle 208 threadably engages a threaded hole in the back plate 198. A coil spring 212 surrounds the spindle 208 and bears against the front face plate 182 and the back plate 198. Rotation of an adjustment knob 190, 192 in one direction imparts rotation of the spindle 208 causing the spindle 208 to advance into the threaded hole in the back plate 198. As the spindle 208 is fixed relative to the front face plate 182, this action results in the back plate 198 being pulled towards the front face plate 182 against the bias of the spring 212. As a result, the illumination assembly 150, which is mounted to the back plate 198, is moved away from the plane of the region of interest 106. Rotation of the adjustment knob 190, 192 in the other direction causes the spindle 208 to retreat from the threaded hole in the back plate 198 resulting in the back plate being pushed away from the front face plate 182. As a result, the illumination assembly 150 is moved towards the plane of the region of interest 106. Thus, by rotating the adjustment knobs 190 and 192, the plane of the light curtain LC can be adjusted so that it is parallel to the plane of the region of interest 106 in the horizontal dimension. The plane of the light curtain LC can also be adjusted to increase its distance from or decrease its distance to the plane of the region of interest 106 by rotating the adjustment knobs 190 and 192.

When the adjustment knob 196 is rotated in one direction, rotation of the adjustment knob causes the adjustment mechanism 204 to tilt the back plate 198 so that the back plate upwardly angles away from the front face plate 182. When the adjustment knob 196 is rotated in the other direction, rotation of the adjustment knob causes the adjustment mechanism 204 to tilt the back plate 198 so that the back plate upwardly angles towards the front plate. Thus, by rotating the adjustment knob 196, the plane of the light curtain LC can be adjusted so that it is parallel to the plane of the region of interest 106 in the vertical dimension.

In this embodiment, the IR receiver 110 comprises a pass filter so that only IR signals on a carrier having a frequency within the limits of the pass filter are detected. The limits of the pass filter are set so that IR signals generated by IR remote controls of conventional consumer electronic devices are blocked thereby to avoid interference from such IR remote controls. The IR receiver 110 communicates with the DSP 140 of the touch processing module 126.

Figure 12:
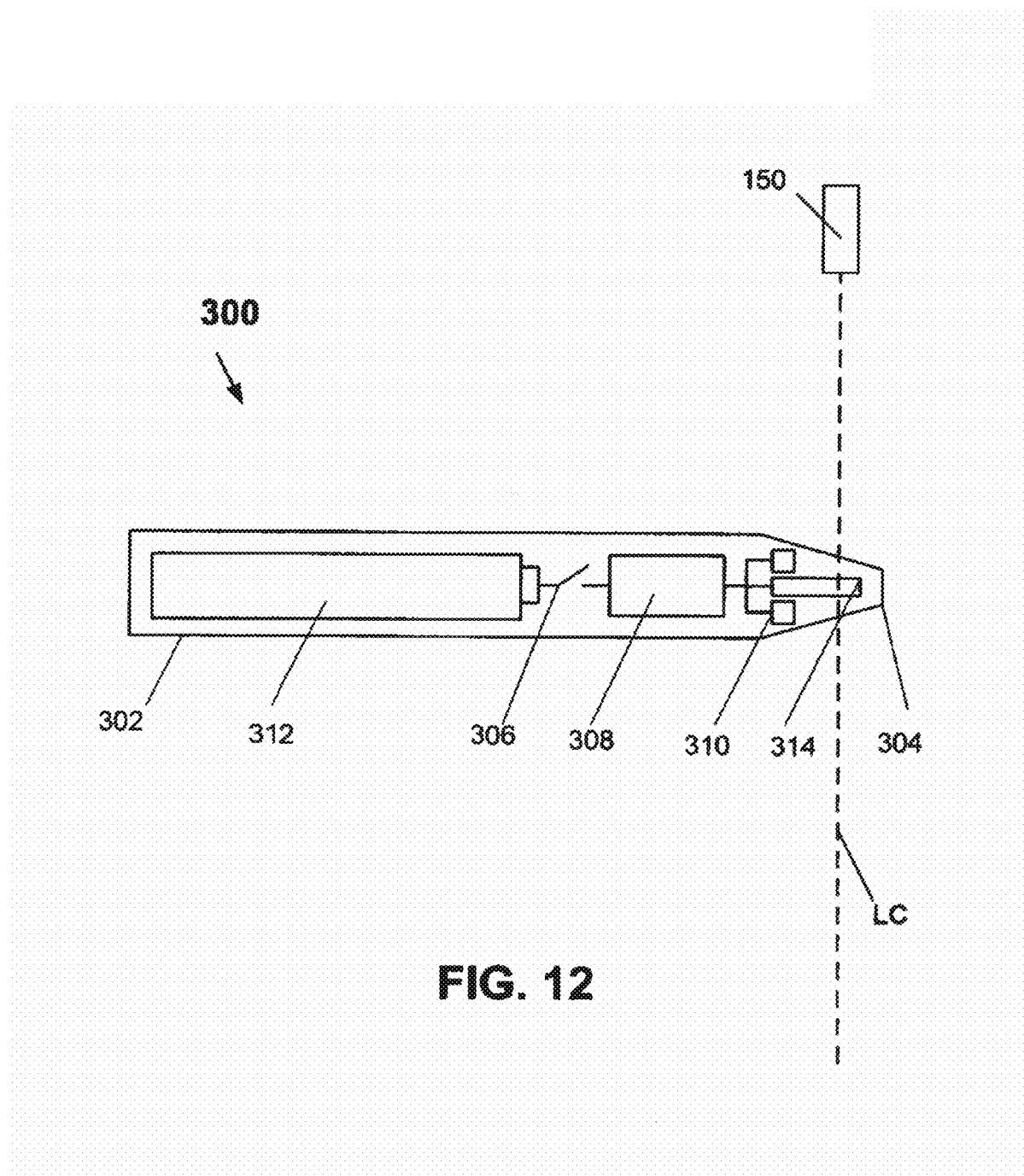
FIG. 12 is a schematic side cross-sectional view of an exemplary active pen tool used in the interactive input system of FIG. 1.

The interactive input system 100 allows a user to interact with the region of interest 106 using both passive pointers and active pointers. As mentioned above, passive pointers may comprise fingers, passive pen tools or other suitable objects. FIG. 12 shows an exemplary active pointer in the form of a pen tool used in the interactive input system 100, and which is generally identified by reference numeral 300. The pen tool 300 comprises a hollow body 302 having a tip 304 at one end which is used to contact the support surface W within the region of interest 106. A tip switch 306 is accommodated by the body 302 and is triggered when pressure is applied to the tip 304 as a result of contact with the support surface W that is above an activation threshold. The hollow body 302 also houses a printed circuit board (not shown) with a microcontroller 308 thereon. An illumination source comprising, for example, one or more infrared light emitting diodes (LEDs) 310 is connected to the microcontroller 308 and is configured to provide illumination to the tip 304 when powered. Power to the printed circuit board is provided by a power source 312 such as for example one or more batteries. The power source 312 is coupled to the printed circuit board via the tip switch 306, such that battery resources are conserved when the pen tool 300 is inactive. The pen tool 300 may also comprise an IR receiver 314 connected to the microcontroller 308 for detecting a modulated signal from the illumination assembly 150.

When the tip 304 of the active pen tool 300 is brought into contact with the support surface W with a force exceeding the activation threshold, the tip switch 306 is triggered. As a result, power from the power source 312 is supplied to the printed circuit board. In response, the microcontroller 308 drives the LEDs 310 causing the LEDs to turn on and provide infrared illumination to the tip 304. During driving of the LEDs 310, the microcontroller 308 pulses supply power to the LEDs causing the LEDs 310 to switch on and off at a rate equal to the frame rate of the image sensor, in this example, 120 frames per second (fps). When the LEDs 310 are turned on, the illumination output by the LEDs 310 is modulated by a carrier having a frequency within the limits of the pass filter of the IR receiver 110.

Figure 13:
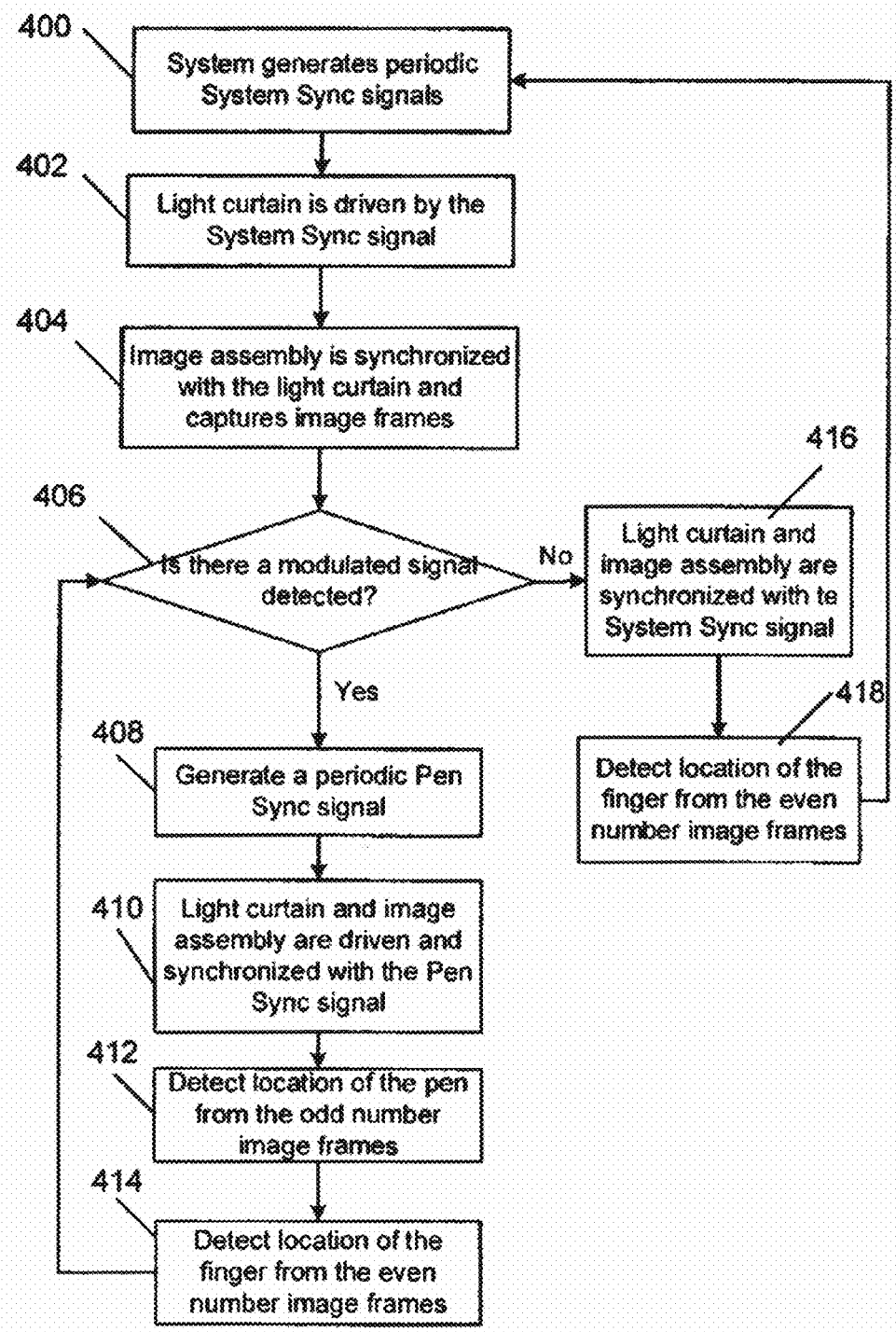
FIG. 13 is a flowchart of an image processing method used by the interactive input system of FIG. 1.

The operation of the interactive input system 110 will now be described with particular reference to FIGS. 13 and 14. With the interactive input system 100 powered, the general purpose computing device 114 provides video data and accompanying audio data, if any, to the projection module 122 of the interactive projector 112. The image projection subsystem 134 in turn projects an image onto the display surface. If accompanying audio data is received, the audio power amplifier and speaker subsystem 130 broadcasts the accompanying audio. At the same time, the DSP 140 of the touch processing module 126 generates periodic system synchronization signals 434 (step 400) and outputs the synchronization signals to the illumination assembly 150 via its GPIO port (step 402). In response to the system synchronization signals 434, the illumination assembly 150 is driven in a manner that results in the light curtain LC emitted by the illumination assembly 150 being turned on and off periodically (step 402). The DSP 140 also outputs the system synchronization signals 434 to the image sensor of the imaging module 124 via its TMR port. In response to the system synchronization signals, the image sensor is conditioned to capture image frames in synchronization with the on/off switching of the illumination assembly 150 (step 404). In particular, for each operation cycle of the image sensor, the image sensor is conditioned to capture a pair of image frames. The first image frame of the pair is captured with the illumination assembly 150 turned off and the second image frame is captured with illumination assembly 150 turned on. The image frames that are captured with the illumination assembly 150 turned off are processed to detect touch input made using the active pen tool 300. The image frames that are captured with the illumination assembly 150 turned on are processed to detect touch input made using a finger or other passive pointer.

In particular, when a passive pointer such as a finger is within the region of interest 106 in proximity to the display surface and the illumination assembly 150 is turned on, the finger is illuminated by the light curtain LC and reflects IR illumination. As a result, the illuminated finger appears as a bright region on an otherwise dark background in image frames captured by the image sensor of imaging module 124. When the active pen tool 300 is within the region of interest and brought into contact with the display surface such that the active pen tool 300 is conditioned to emit modulated illumination via its tip 304 and when the illumination assembly 150 is turned off, the active pen tool 300 appears as a bright region on an otherwise dark background in image frames captured by the imaging module 124. The touch processing module 126 receives and processes the captured image frames to detect the coordinates and characteristics of bright regions in the captured image frames, as described in U.S. Patent Application Publication No. 2010/0079385 entitled "METHOD FOR CALIBRATING AN INTERACTIVE INPUT SYSTEM AND INTERACTIVE INPUT SYSTEM EXECUTING THE CALIBRATION METHOD" to Holmgren et al. and assigned to SMART Technologies ULC, the disclosure of which is incorporated herein by reference in its entirety. The detected coordinates are then mapped to display coordinates and provided to the general purpose computing device 114 via the projection module 122.

In order to yield a strong signal or bright region representing an active pen tool 300 in captured image frames and overcome ambient light interference (i.e. increase the signal to noise ratio and improve the robustness of active pen tool detection), it is desired to synchronize illumination of the active pen tool 300 with the exposure timing of the image sensor. In this embodiment, to achieve such synchronization, the modulated illumination output by the active pen tool 300 is used to generate a synchronization signal that in turn is used to synchronize image sensor exposure timing and illumination assembly switching with the active pen tool illumination as will be described.

When the tip 304 of the active pen tool 300 is illuminated, the IR receiver 110 detects the modulated illumination output by the active pen tool 300 due to the fact that the carrier has a frequency within the limits of its pass filter. The IR receiver 110 removes the carrier from the detected modulated illumination to isolate the periodic IR signals output by the active pen tool 300 at the image sensor frame rate. The IR receiver 110 in turn outputs corresponding modulated signals to the DSP 140. The DSP 140 continually monitors the IR receiver 110 to determine if modulated signals are being output (step 406). If modulated signals are detected by the DSP 140, the DSP 140 terminates generation of the system synchronization signals 434 and in turn generates periodic pen tool synchronization signals 432 (step 408). The DSP 140 in turn conveys the pen tool synchronization signals 432 to the image sensor via its PWM port to synchronize the timing of image frame capture to the on/off switching of the active pen tool modulated illumination and also provides the pen tool synchronization signals 432 to the illumination assembly 150 via its GPIO port to similarly synchronize on/off switching of the illumination assembly 150 (step 410). As will be appreciated, the switching of the illumination assembly 150 is controlled such that the light curtain LC is turned off when the LEDs 310 of the active pen tool 300 are powered, and the light curtain LC is turned on when the LEDs 310 of the active pen tool 300 are turned off.

The image frames that are captured by the image sensor of the imaging module 124 are conveyed to the DSP 140 and processed in the manner described above. Image frames captured by the image sensor while the illumination assembly 150 is turned off are processed by the DSP 140 to detect the bright region therein corresponding to the illuminated pen tool tip 304 (step 412). Image frames captured by the image sensor while the illumination assembly 150 is turned on are processed by the DSP 140 to detect a bright region therein corresponding to a finger or other passive pointer within the region of interest 106 and proximate to the display surface that is illuminated by the light curtain LC (step 414).

As mentioned above, the DSP 140 continually monitors the IR receiver 110 to determine if it is outputting modulated signals (step 406). If the DSP 140 does not detect modulated signals for a threshold period of time, the DSP 140 terminates the pen tool synchronization signals 432 and regenerates the system synchronization signals 434, which are then used by the DSP 140 to control the timing of image frame capture and illumination assembly switching in the manner described above (step 416). In this case, only image frames captured by the image sensor while the illumination assembly 150 is turned on are processed by the DSP 140 to detect a bright region therein corresponding to a finger or other passive pointer within the region of interest 106 and proximate to the display surface that is illuminated by the light curtain LC (step 418).

Following step 404, if the DSP 140 does not detect modulated signals, the process proceeds to step 418 so that the DSP 140 only processes image frames captured by the image sensor while the illumination assembly 150 is turned on.

Figure 14:
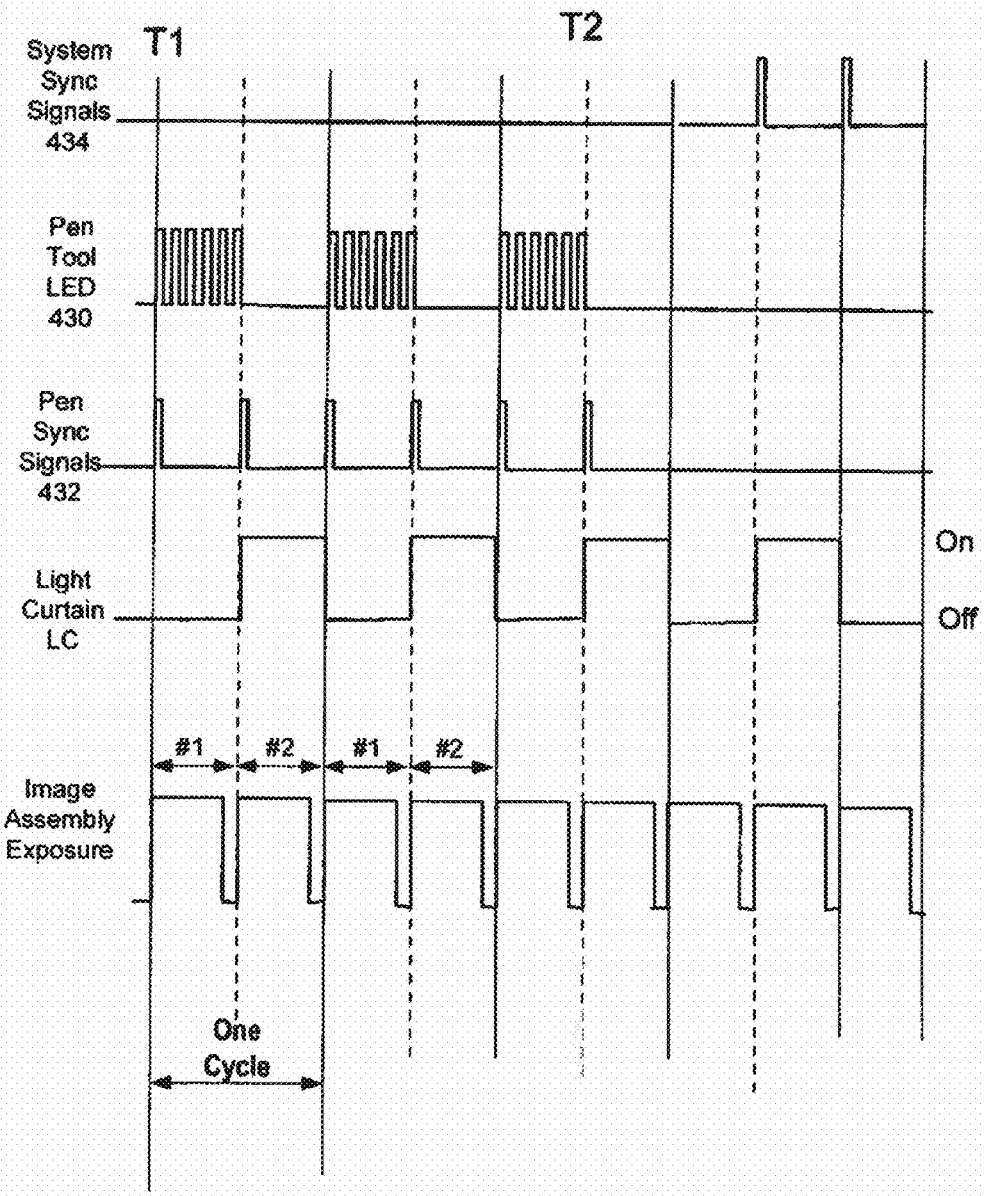
FIG. 14 is a graphical plot of time sequences used by the interactive input system of FIG. 1 during the image processing method of FIG. 13.

FIG. 14 shows timing sequences of the interactive input system 100 beginning at time $T_1$ when the active pen tool 300 is conditioned to output periodic modulated illumination 430 via its tip 304. As a result, the DSP 140 generates pen tool synchronization signals 432 at the image sensor frame rate. The illumination assembly 150 is also driven by the pen tool synchronization signals 432 resulting in the light curtain LC being turned off for the first half of each image sensor exposure cycle and being turned on for the second half of each image sensor exposure cycle. Image frames are captured during each half of the image sensor exposure cycle. At time $T_2$, the modulated illumination 430 of the active pen tool 300 ends resulting in the pen tool synchronization signals 432 being replaced with system synchronization signals 434.

If desired, the modulated illumination output by the active pen tool 300 can be embedded with additional codes, data or information representing active pen tool attribute information such as pen tool color and/or pen tool function information to allow the interactive input system 100 to support different functions such as left click, right click and erase, etc.

As will be appreciated, the above methodology provides advantages in that misidentification of the active pen tool 300 as a finger or other passive pointer before contact with the display surface can be avoided since the light curtain LC is not turned on during active pen tool detection. In addition, the image sensor, illumination assembly 150 and active pen tool 300 can be configured to have a long integration time in the finger detection mode (i.e. when the illumination assembly 150 is turned on) and a short exposure time in the active pen tool detection mode (i.e. when the illumination assembly 150 is turned off). In this manner, the interactive input system 100 will maximize the intensity of the pointer in captured image frames and eliminate ambient light interference as much as possible.

Figure 15:
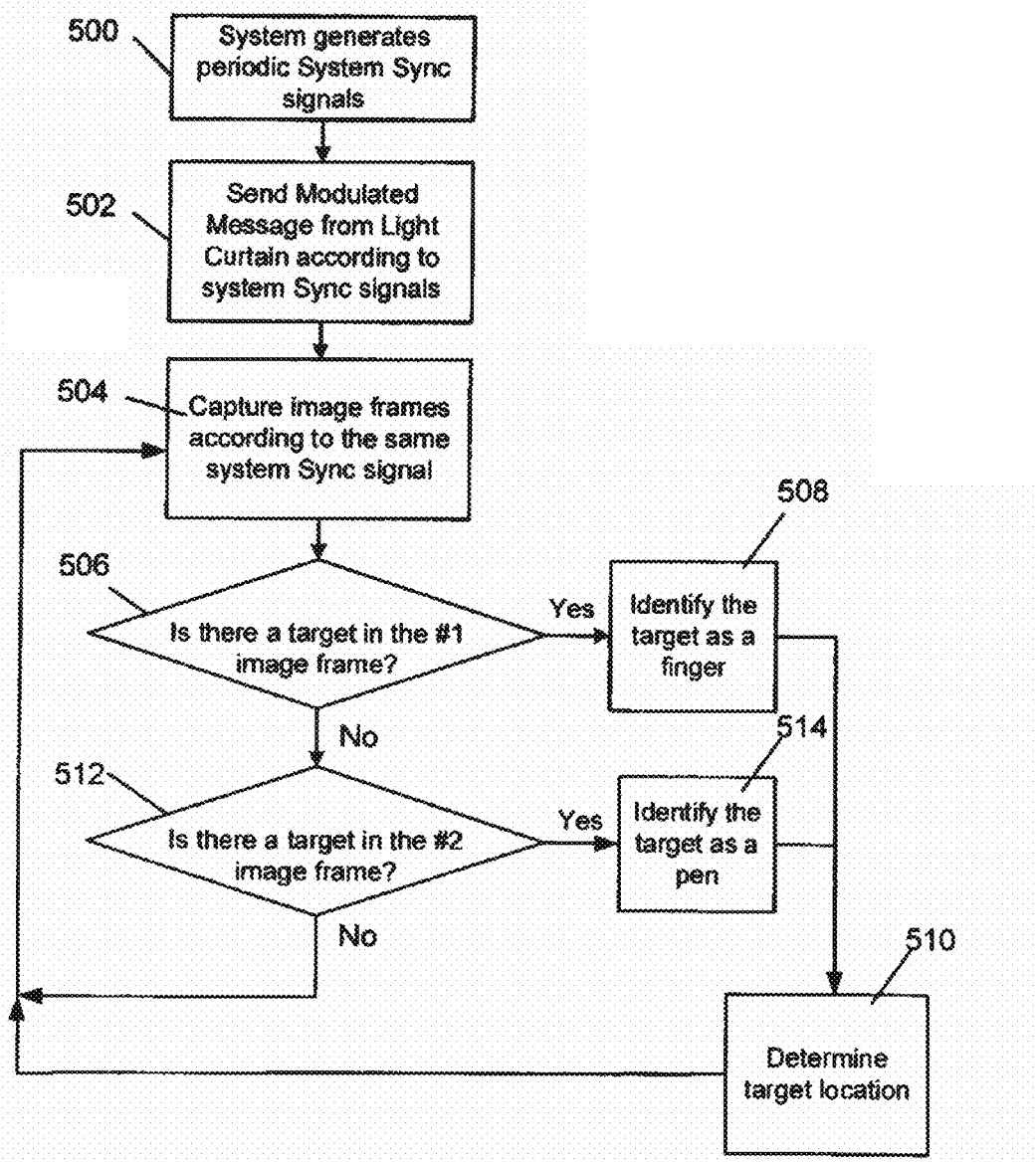
FIG. 15 is a flowchart of an alternative image processing method used by the interactive input system of FIG. 1.

The methodology described above supports detection of a single active pen tool 300 within the region of interest 106. In certain environments, the ability to detect multiple active pen tools is desired. An embodiment of the interactive input system 100 that provides this functionality will now be described with particular reference to FIGS. 15 and 16.

In this embodiment, rather than using the modulated illumination output by the active pen tool 300 to generate a synchronization signal that is used to synchronize image sensor exposure timing and illumination assembly switching with the active pen tool illumination, the light curtain LC is modulated. The IR receiver 110 in this case is not used. Instead, the IR receiver 314 in the active pen tool 300 is used.

Similar to the previous embodiment, with the interactive input system 100 powered, the general purpose computing device 114 provides video data and accompanying audio data, if any, to the projection module 122 of the interactive projector 112. The image projection subsystem 134 in turn projects an image onto the display surface. If accompanying audio data is received, the audio power amplifier and speaker subsystem 130 broadcasts the accompanying audio. At the same time, the DSP 140 of the touch processing module 126 generates periodic system synchronization signals 530 (step 500) and outputs the system synchronization signals to the illumination assembly 150 via its GP10 port. In response to the system synchronization signals 530, the illumination assembly 150 is driven in a manner that results in the light curtain LC being turned on and off periodically (step 502). When the illumination assembly 150 is turned on, the DSP 140 signals the control boards 164 of the illumination units to modulate the illumination emitted by the IR laser diodes 162. As a result, the IR illumination of the light curtain LC is modulated by a carrier having a frequency significantly different than the typical frequencies of conventional IR remote controls. The frequency of the carrier is also sufficiently high such that when the illumination assembly 150 is turned on, the light curtain LC appears continuously on to the image sensor.

The DSP 140 also outputs the system synchronization signals 530 to the image sensor of the imaging module 124 via its PWM port. In response to the system synchronization signals, the image sensor is conditioned to capture image frames in synchronization with the on/off switching of the illumination assembly 150 (step 504). Again, for each operation cycle of the image sensor, the image sensor is conditioned to capture a pair of image frames. The first image frame is captured with the illumination assembly 150 turned on and the second image frame is captured with the illumination assembly 150 turned off.

When a passive pointer such as a finger is within the region of interest 106 and proximate to the display surface and the illumination assembly 150 is turned on, the finger is illuminated by the light curtain LC and reflects IR illumination. As a result, the illuminated finger appears as a bright region on an otherwise dark background in captured image frames. When the active pen tool 300 is brought into proximity of the region of interest 106, the IR receiver 314 adjacent the tip 304 detects the modulated light curtain LC. In response, the IR receiver 314 activates the microcontroller 308 and generates signals 532 that are synchronized with the operation cycle of the image sensor. When the tip 304 of the active pen tool 300 is brought into contact with the display surface with a force above the threshold activation source, the microcontroller 308 uses the signals 532 so that the LEDs 310 are powered only when the light curtain LC is turned off so that the illuminated tip 304 of the active pen tool 300 appears as a bright region in captured image frames.

For each pair of captured image frames, the first image frame that is captured while the illumination assembly 150 is turned on is processed by the DSP 140 to determine if a bright region exists therein representing a pointer (step 506). If so, the bright region is identified as a finger (step 508) and the location of the finger is determined in the manner described previously (step 510). If no bright region is detected in the first image frame at step 506, the second image frame is processed by the DSP 140 to determine if a bright region exists therein representing the active pen tool 300 (step 512). If so, the bright region is identified as the active pen tool (step 514) and the location of the active pen tool 300 is determined in the manner described previously (step 510).

Figure 16:
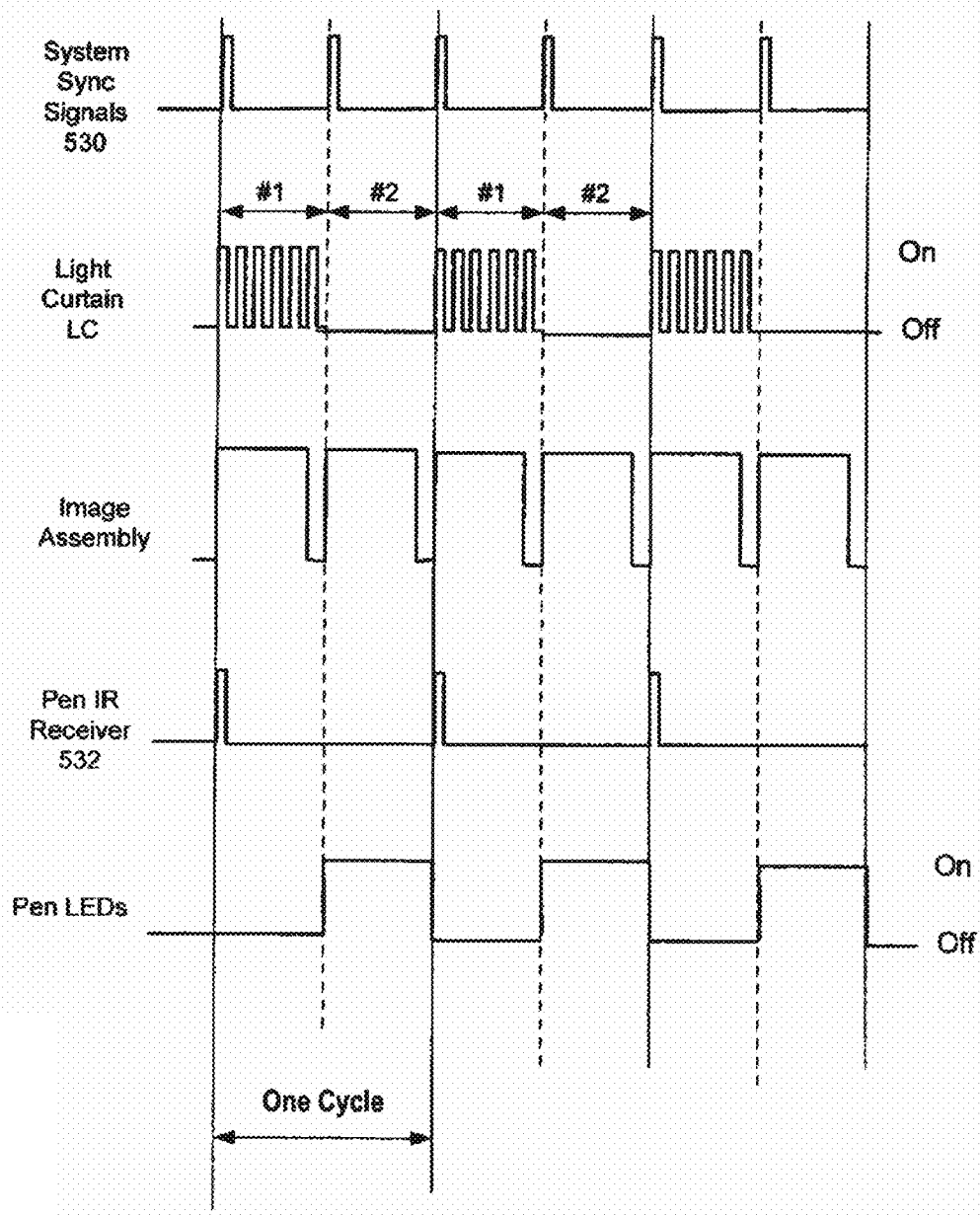
FIG. 16 is a graphical plot of time sequences used by the interactive input system of FIG. 1 during the image processing method of FIG. 15.

Although the time sequences in FIG. 16 show that the light curtain LC is modulated during its entire on phase, it will be appreciated by those of skill in art that the light curtain LC need only be modulated during a portion of its on phase. As a result, the efficiency of the illumination assembly 150 can be improved by shortening the off time during modulation.

Figure 17:
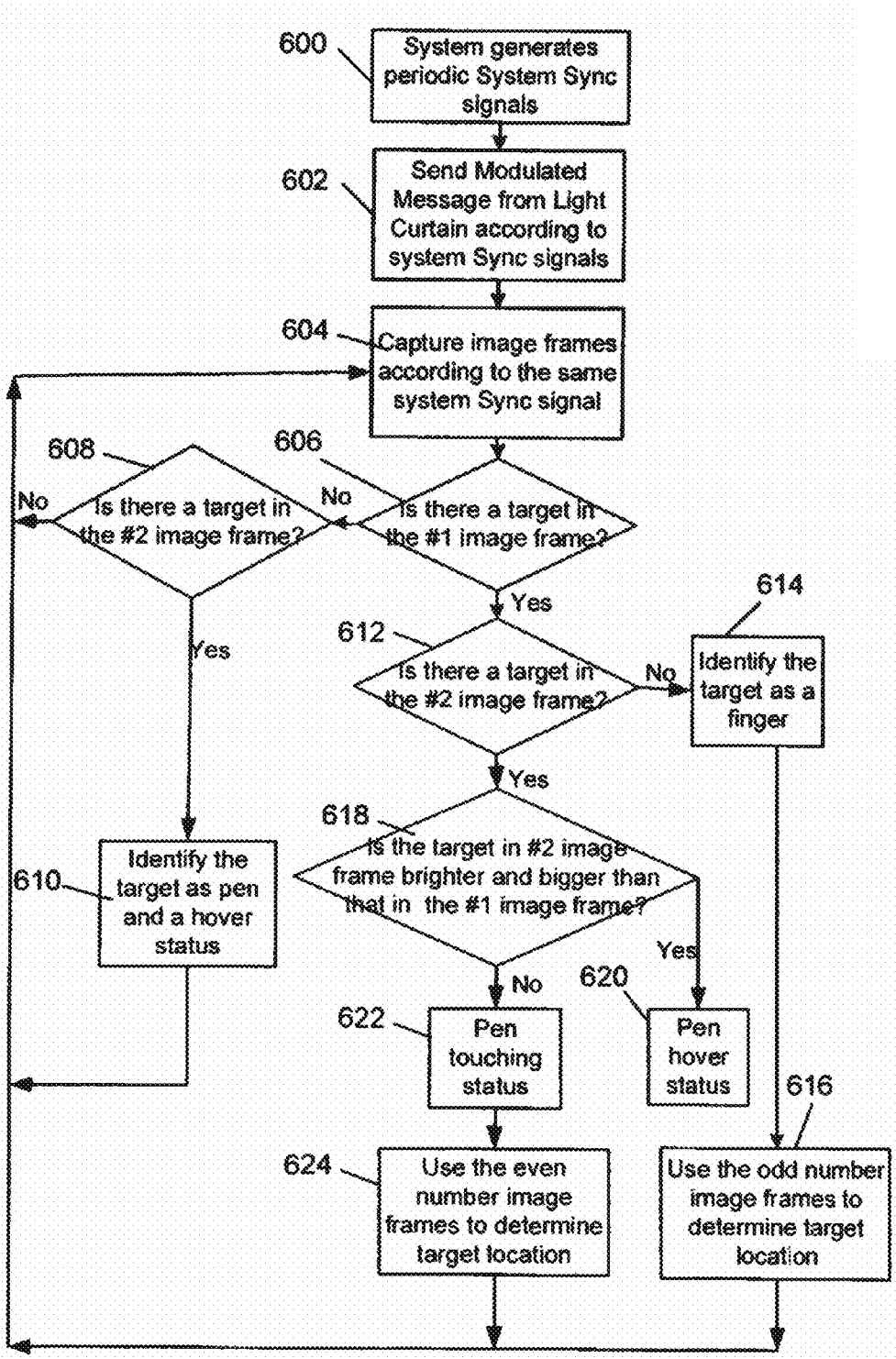
FIG. 17 is a flowchart of yet another image processing method used by the interactive input system of FIG. 1.
Figure 18:
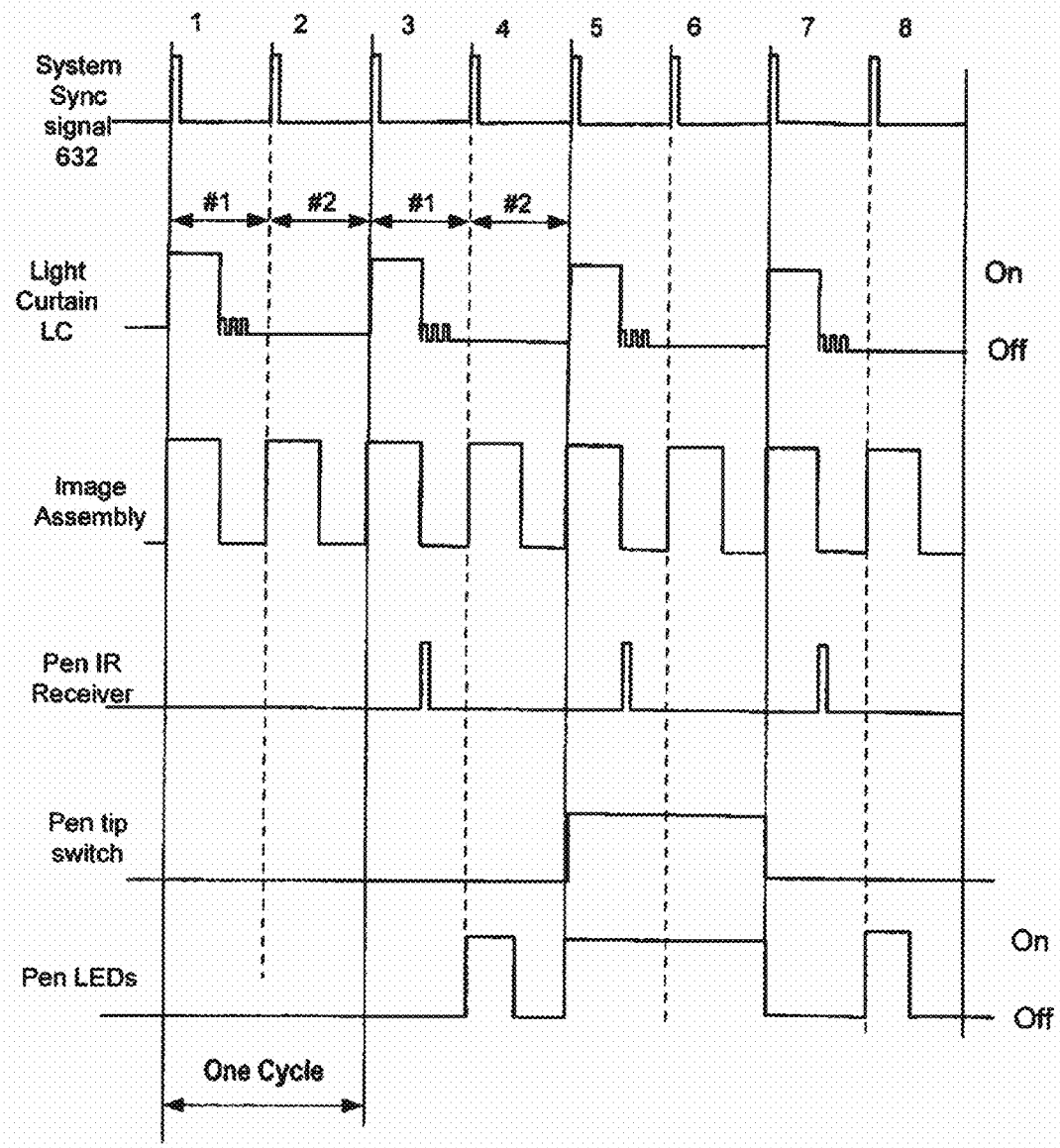
FIG. 18 is a graphical plot of time sequences used by the interactive input system of FIG. 1 during the image processing method of FIG. 17.

Referring now to FIGS. 17 and 18, an alternative embodiment of the interactive input system 100 that also provides the ability to detect multiple active pen tools 300 by modulating the light curtain LC is shown. Similar to the embodiment of FIGS. 15 and 16, during operation, the DSP 140 of the touch processor module 126 generates periodic system synchronization signals 632 (step 600) and outputs the system synchronization signals to the illumination assembly 150 via its GPIO port. In response to the system synchronization signals 632, the illumination assembly 150 is driven in a manner that results in the light curtain LC being turned on and off periodically (step 602). In this embodiment, the on phase of the light curtain LC has a duration that is approximately equal to one-half of that of the previous embodiment. Also, following each on phase, the light curtain LC is not immediately turned off but rather is conditioned to emit low intensity IR illumination that is modulated with the high frequency carrier.

The DSP 140 also outputs the system synchronization signals 632 to the image sensor of the imaging module 124 via its PWM port. In response to the system synchronization signals 632, the image sensor is conditioned to capture image frames (step 604). During image frame capture, the exposure time of the image sensor is the same as the duration of the on phase of the light curtain LC. For each operation cycle of the image sensor, the image sensor is conditioned to capture a pair of image frames. The first image frame is captured with the illumination assembly 150 turned on and the second image frame is captured with the illumination assembly 150 turned off. The shortened image sensor exposure allows each image frame to be processed by the DSP 140 before the next image frame is captured.

When a passive pointer such as a finger is within the region of interest 106 and proximate to the display surface and the illumination assembly 150 is turned on, the finger is illuminated by the light curtain LC and reflects IR illumination. As a result, the illuminated finger appears as a bright region on an otherwise a dark background in captured image frames. When the active pen tool 300 is brought into the region of interest 106, the IR receiver 314 adjacent the tip 304 detects the modulated low intensity IR illumination. In response, the IR receiver 314 activates the microcontroller 308. The microcontroller 308 in turn powers the LEDs 310 when the light curtain LC is turned off so that the illuminated tip 304 of the active pen tool 300 appears as a bright region in captured image frames allowing active pen tool hover to be detected. When the tip 304 of the active pen tool 300 is brought into contact with the display surface with a force above the threshold activation force, the microcontroller 308 powers the LEDs 310 irrespective of whether the light curtain LC is turned on or off.

Figure 19A:
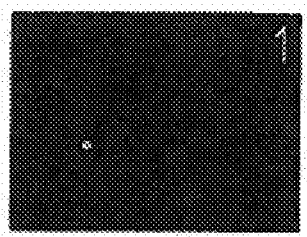
FIGS. 19A to 19L show exemplary captured image frames and corresponding target contact statuses.
Figure 19B:
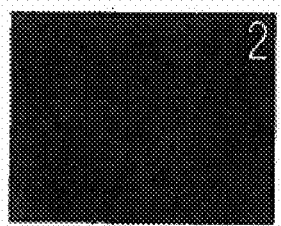
Figure 19C:
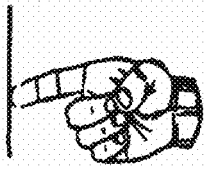
Figure 19D:
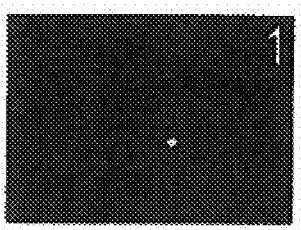
Figure 19E:
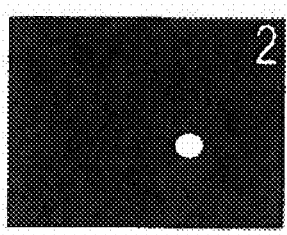
Figure 19F:
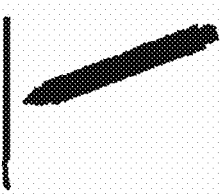
Figure 19G:
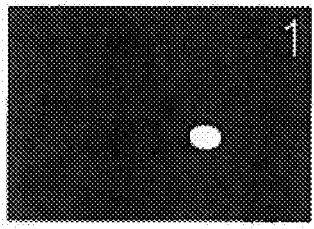
Figure 19H:
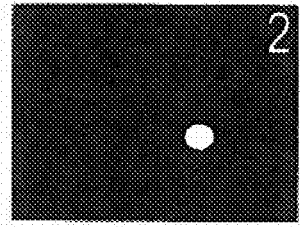
Figure 19I:
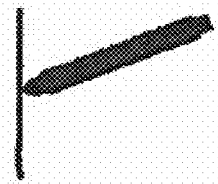
Figure 19J:
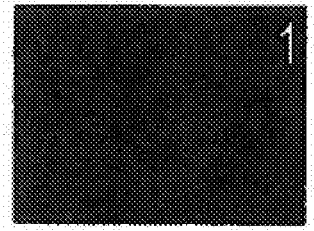
Figure 19K:
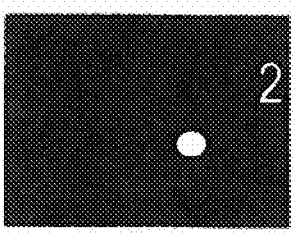
Figure 19L:
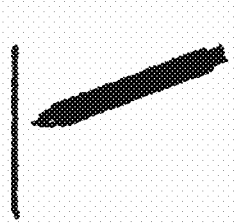

For each pair of captured image frames, the first image frame is processed by the DSP 140 to determine if a bright region exists therein representing a pointer (step 606). If no bright region is detected in the first image frame, the second image frame is processed by the DSP 140 to determine if a bright region exists therein representing a pointer (step 608). If so, the bright region is identified as an active pen tool 300 that is approaching the display surface but has not yet contacted the display surface or that is hovering in front of the support surface W (step 610). This scenario is represented by FIGS. 19J, 19K and 19L. The location of the active pen tool 300 is determined in the manner described previously.

At step 606, if a bright region is detected in the first image frame, the DSP 140 processes the second image frame to determine if a bright region also exist therein (step 612). If no bright region is detected in the second image frame, the bright region in the first image frame is identified as a finger or other passive pointer (step 614). This scenario is represented by FIGS. 19A, 19B and 19C. The first image frames of each pair of image frames are then processed by the DSP 140 in the manner described previously to determine the location of the finger (step 616).

As will be appreciated, when a bright region exists in only one of the first and second image frames pointer detection is relatively easy. However, when a bright region exists in both of the first and second image frames, pointer ambiguity may arise. To resolve pointer ambiguity, the intensity and size of the bright regions in the first and second image frames are examined as will now be described. At step 612, if a bright region also exists in the second image frame, the DSP 140 compares the intensity and size of the bright region in the first and second image frames to determine if the bright region in the second image frame is brighter and bigger than that in the first image frame (step 618). If so, the bright region is identified as an active pen tool 300 that is hovering over the display surface (step 620) and its location is determined in the manner previously described. This scenario is represented by FIGS. 19D, 19E and 19F. At step 618, if the bright region in the second image frame is not brighter and bigger than that in the first image frame, the bright region is identified as an active pen tool 300 in contact with the display surface (step 622). This scenario is represented by FIGS. 19G, 19H and 19I. The second image frames of each pair are than processed by the DSP 140 in the manner described previously to determine the location of the active pen tool (step 624).

Although the illumination assembly 150 is described as emitting modulated low intensity IR illumination following each on phase of the light curtain, it will be appreciated that the emission of modulated low intensity IR illumination can precede each on phase of the light curtain. Also, although the size and intensity of bright regions in a pair of image frames are compared, when an active pen tool is proximate the light curtain LC, to distinguish between pen tool hover and pen tool contact conditions, alternatives are available. For example, the tip of the active pen tool 300 may be coated with an IR anti-reflection material such that the active pen tool does not reflect IR illumination.

Figure 20:
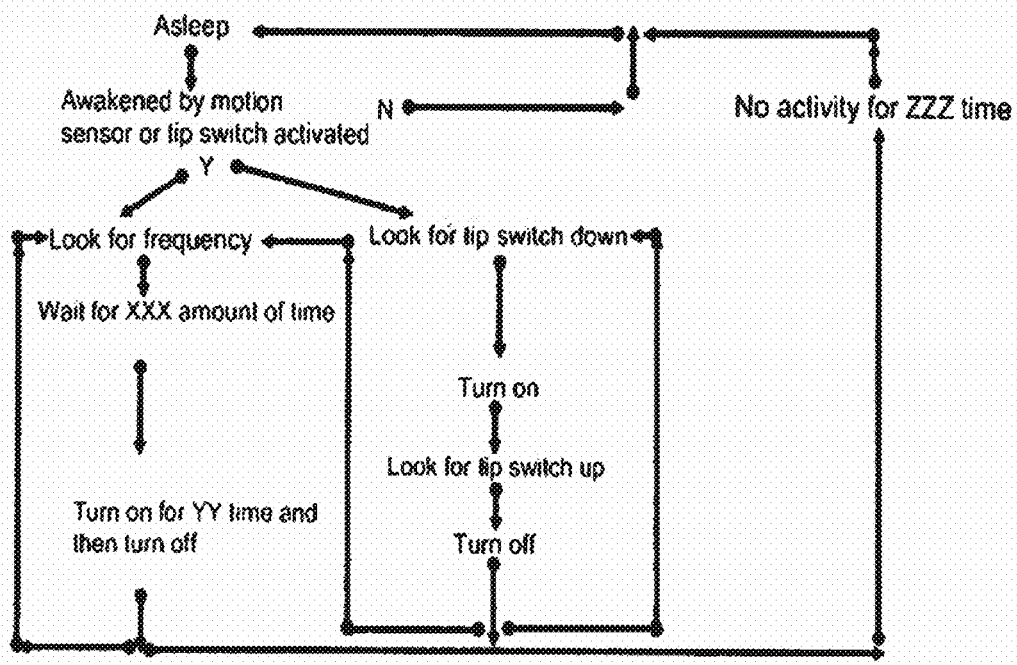
FIG. 20 is a flowchart of an active pen tool processing method used by the active pen tool of FIG. 12.

FIG. 20 shows logic employed by the active pen tool 300. When the active pen tool 300 is not in use, the microcontroller 308 is conditioned to a sleep mode. A tilt sensor or other type of motion sensor may be provided in the active pen tool and connected to the microcontroller 308 for detecting motion of the active pen tool. In this case, when active pen tool movement is detected by the sensor, the sensor signals the microcontroller 308 to condition it to an active mode. The microcontroller 308 is also conditioned to the active mode when the tip switch 306 is activated. With the microcontroller 308 in the active mode, if the IR receiver 314 detects the modulated low intensity IR illumination, the LEDs 310 are turned on for a period of time and then turned off. This action repeats for as long as the modulated low intensity IR illumination is detected. If the active pen tool 300 is brought into contact with the display surface and the tip switch 306 is triggered, the LEDs 310 are turned on immediately. If the tip switch 306 remains untriggered and if no modulated low intensity IR illumination is detected for a period of time exceeding a threshold, the microcontroller 308 returns to the sleep mode.

As described above, the illumination assembly 150 emits a fan-shaped sheet of IR illumination over the region of interest 106 to facilitate detection of passive pointers brought into the region of interest 106. Since the emitted IR illumination is not visible to human eyes, during installation, it can be difficult for a user to use the adjustable support 108 to adjust the light curtain LC to bring the light curtain LC to its desired position substantially parallel to the plane of the region of interest 106. Methods for adjusting the position of the light curtain LC to bring it substantially to its desired position will now be described.

Following installation, the initial position of the light curtain LC is typically not known. To determine the position of the light curtain LC, in one embodiment the adjustment knobs 190, 192 and 196 are used to orient the position of the light curtain LC such that the light curtain LC intersects the region of interest 106 and impinges on the display surface. When the light curtain LC impinges on the display surface, IR illumination is reflected back towards the adjustable support 108 and appears in image frames captured by the imaging module 124 as a line referred to hereinafter as an "intersection" line. One full rotation of each adjustment knob 190, 192 and 196 will cause the light curtain LC to tilt at a known angle.

The captured image frames are processed by the touch processing module 126 to determine the position of the light curtain LC. The position of the light curtain LC is then compared to the desired position of the light curtain LC, and the amount of adjustment to be made is calculated. As will be described below, at least three captured image frames are required to accurately calculate the amount of adjustment to be made. The user is then prompted to adjust each of the adjustment knobs 190, 192 and 196 until the light curtain LC is positioned at the desired position. In this embodiment, the user is prompted through an image projected on the display surface by the projection module 122. It will be appreciated that the user may be prompted through other types of feedback such as for example, audio feedback through use of the speaker subsystem 130.

Figure 21:
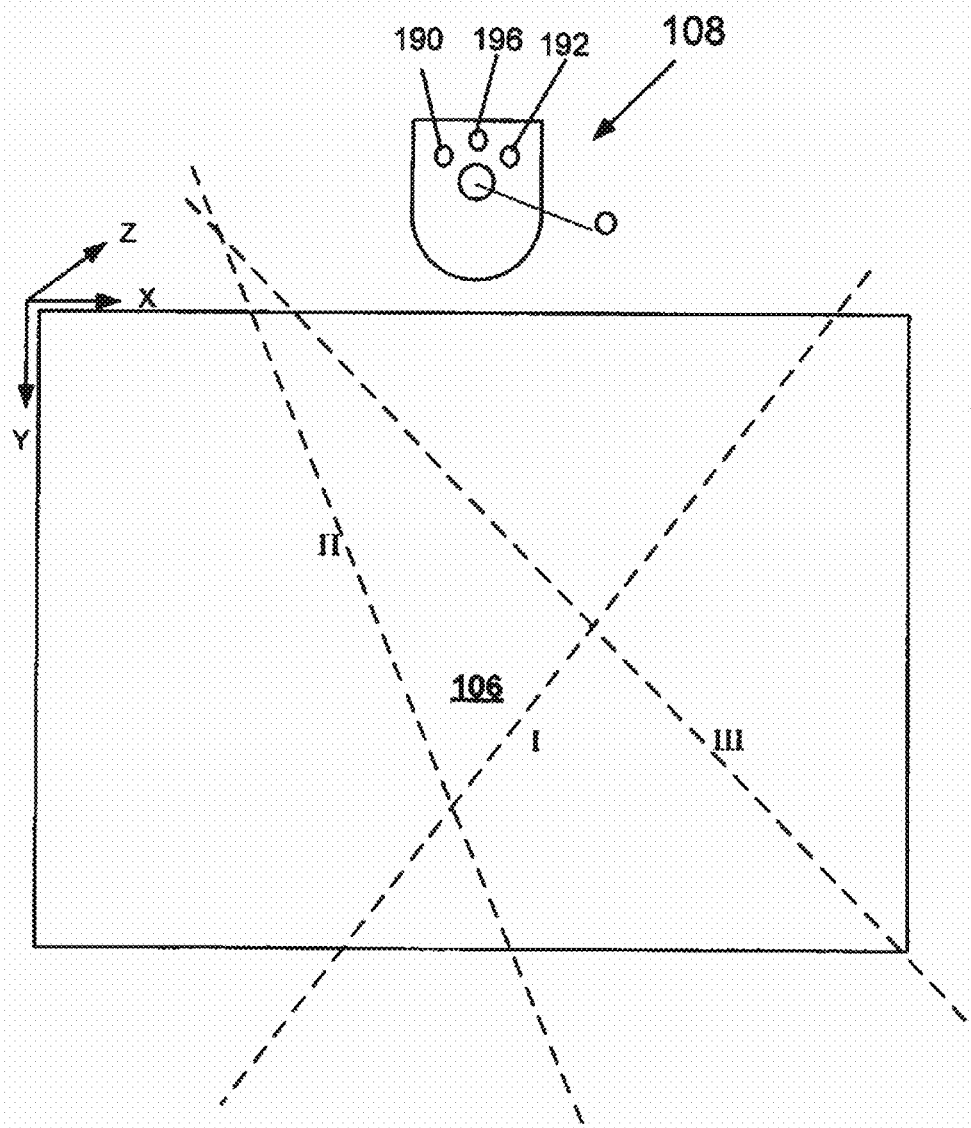
FIG. 21 is a front schematic view of the interactive input system of FIG. 1 showing a coordinate system and three intersection lines.

As shown in FIG. 21, the X, Y, Z coordinate origin (0, 0, 0) of the region of interest 106 is set as the upper left hand corner thereof. The Z axis is directed into the page of FIG. 21. As described above with reference to FIGS. 11C and 11D, the position of the light curtain LC is adjusted by rotating the adjustment knobs 190, 192 and 196. The pivot point O of the light curtain LC is defined as having coordinates $(X_c, Y_c, Z_c)$.

The plane of the light curtain LC is designated as X'-Y'. The rotation angle about the X'-axis is designated as $\theta_x$ and the rotation angle about the Y'-axis is designated as $\theta_y$. As will be appreciated, once the values of angles $\theta_x$ and $\theta_y$ are determined, the interactive input system 100 is able to prompt the user how to adjust the adjustment knobs 190, 192 and 196 such that the X'-Y' plane of the light curtain LC is parallel to the X-Y plane of the region of interest 106. The values of angles $\theta_x$ and $\theta_y$ are determined using an iterative analysis, as will be described.

In this embodiment, one full rotation of each of the adjustment knobs 190 and 192 will cause the light curtain LC to tilt a total of 1.5 degrees about the Y'-axis. One full rotation of adjustment knob 196 will cause the light curtain LC to tilt a total of 1.5 degrees about the X'-axis. It will be appreciated by those of skill in that the adjustment knobs may be calibrated to cause different amounts of tilt when rotated. For example, one full rotation of an adjustment knob may cause the light curtain LC to a tilt a total of 0.75 degrees or 3.0 degrees about a respective axis.

Figure 22:
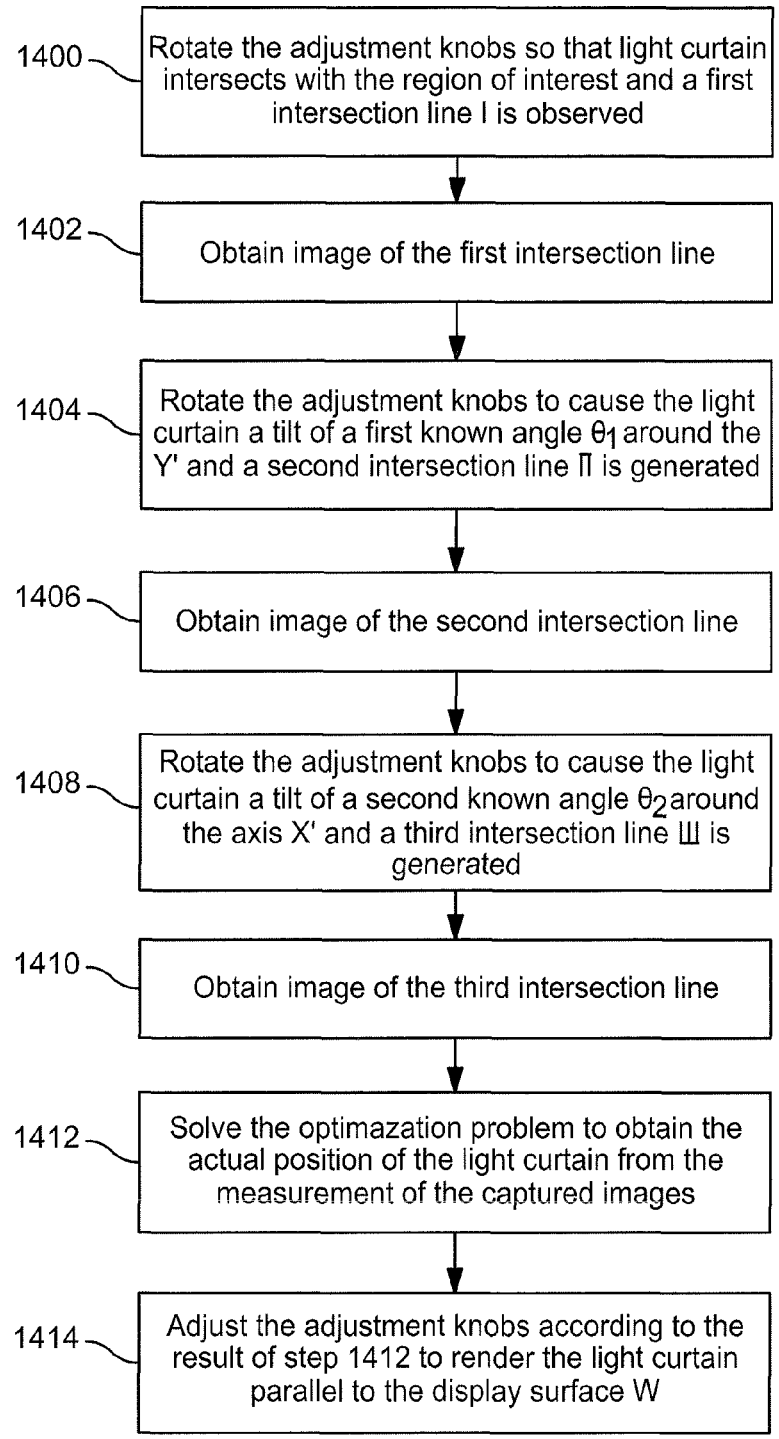
FIG. 22 is a flowchart showing a method for adjusting the position of the light curtain generated by the illumination assembly of FIG. 6.

Turning now to FIG. 22, the steps performed during adjustment of the position of the light curtain LC are shown. Initially, the position of the light curtain LC is adjusted by rotating the adjustment knobs 190, 192 and 196 such that the light curtain LC intersects the region of interest 106 and impinges on the display surface at a first intersection line (step 1400) as mentioned previously. In this embodiment, the adjustment knob 196 is rotated in the clockwise direction to cause the light curtain LC to rotate about the X'-axis and intersect with the display surface. As will be appreciated, the rotation of adjustment knob 196 does not cause the light curtain LC to rotate about the Y'-axis. In the event the first intersection line does not appear in a captured image frame, the adjustment knobs 190 and 192 may be rotated to locate the first intersection line at a position nearer to the center of the region of interest 106 such that the first intersection line appears in captured image frames. An exemplary first intersection line I is shown in FIG. 21. When the first intersection line I is captured in an image frame by the imaging module 124, the captured image frame is communicated to the touch processing module 126 for processing (step 1402). One of the adjustment knobs 190 and 192 is then rotated to cause the light curtain LC to rotate about the Y'-axis at a first known angle $\theta 1$ such that the light curtain LC intersects the region of interest 106 and impinges on the display surface at a second intersection line (step 1404). An exemplary second intersection line II is shown in FIG. 21. When the second intersection line II is captured in an image frame by the imaging module 124, the captured image frame is communicated to the touch processing module 126 for processing (step 1406). Adjustment knob 196 is then rotated to cause the light curtain LC to rotate about the X'-axis at a second known angle $\theta 2$ such that the light curtain LC intersects the region of interest 106 and impinges on the display surface at a third intersection line (step 1408). An exemplary third intersection line III is shown in FIG. 21. When the third intersection line III is captured in an image frame by the imaging module 124, the captured image frame is communicated to the touch processing module 126 for processing (step 1410). The touch processing module 126 in turn processes the three captured image frames to determine the position of the light curtain LC (step 1412), the specifics of which are further described below. Once the position of the light curtain LC is known, the position of the light curtain LC is compared to the desired position of the light curtain LC, and the amount of adjustment required to bring the plane of light the curtain LC generally parallel to the plane of the region of interest 106 is communicated to the user (step 1414). The user is then prompted to adjust adjustment knobs 190, 192 and 196 thereby adjusting the light curtain LC so that it assumes its desired position.

Figure 23A:
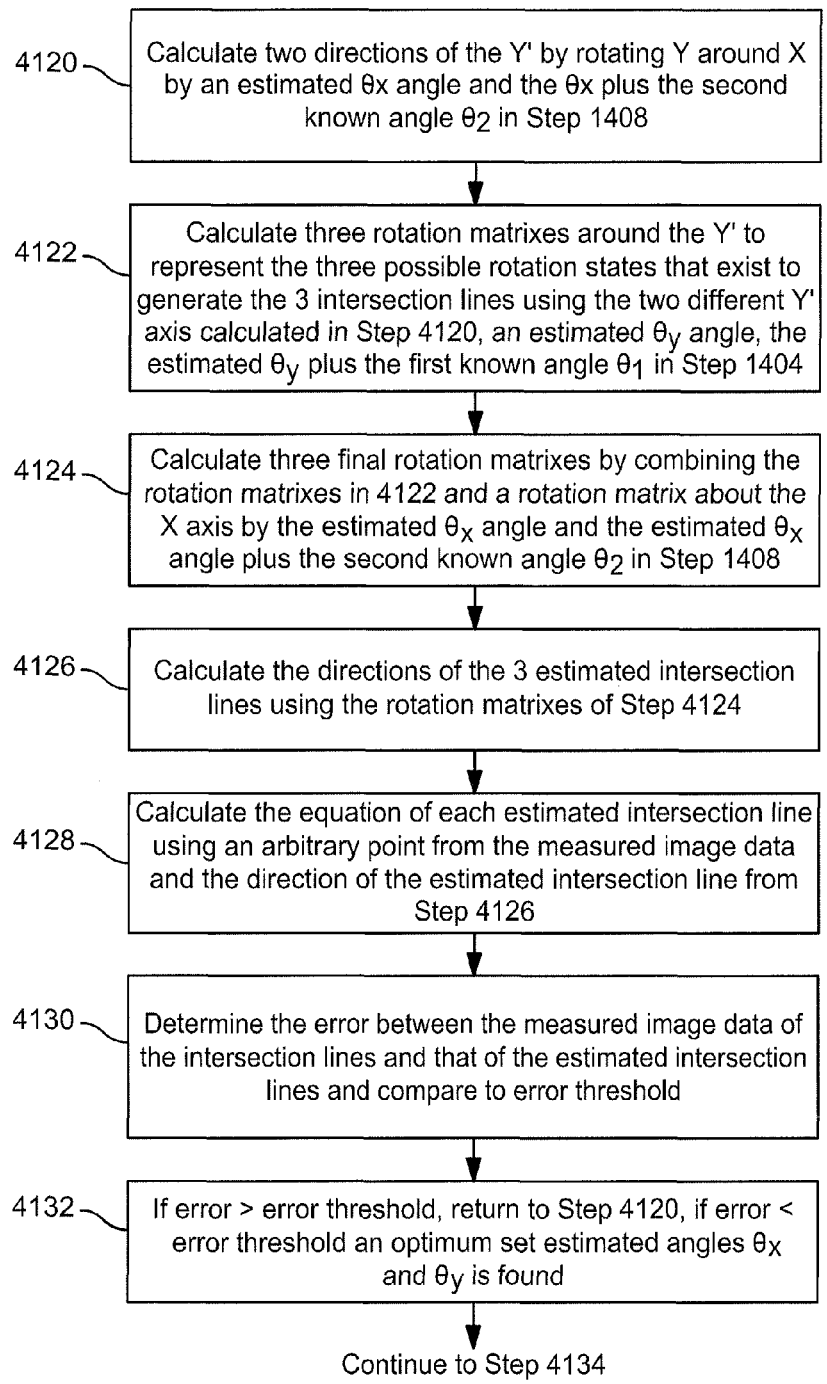
FIGS. 23A and 23B are flowcharts showing further steps of the method of FIG. 22.
Figure 23B:
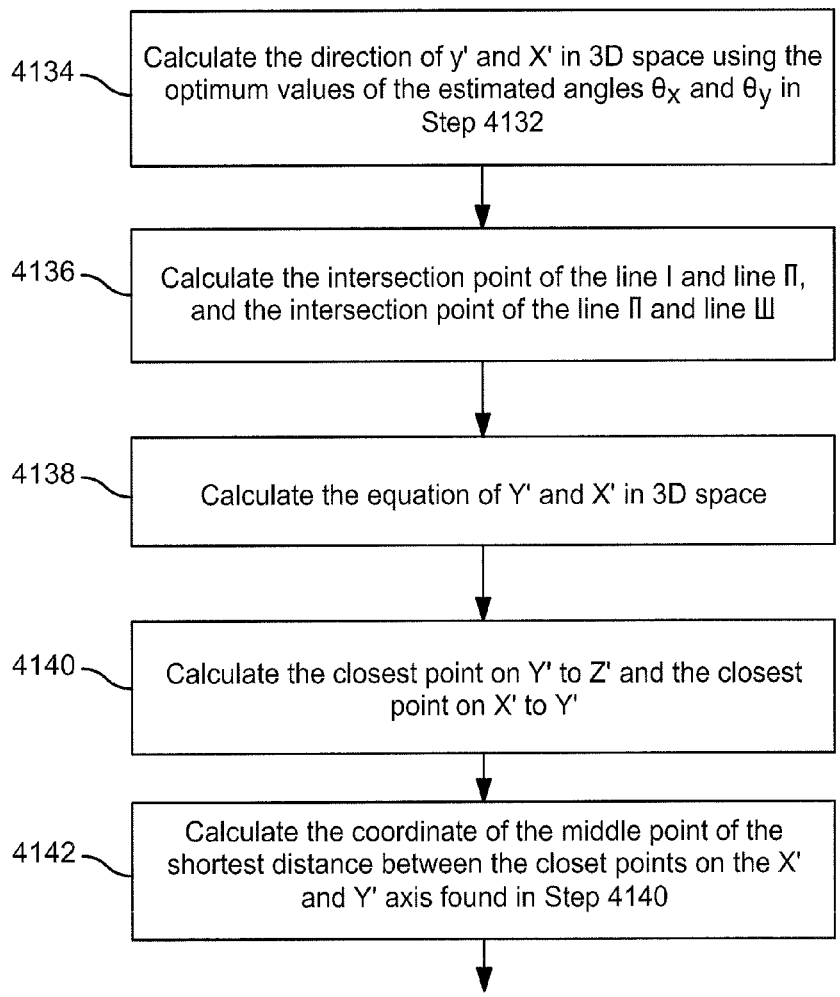

Turning now to FIGS. 23A and 23B, the steps performed during processing of the three captured image frames at step 412 are shown. As mentioned above, the initial position of the light curtain LC is not known. The values of angles $\theta_x$ and $\theta_y$ are determined using computing by optimization. To adjust the light curtain LC to its desired position, wherein the plane X'-Y' of the light curtain LC is parallel to the plane X-Y of the region of interest 106, the user rotates the adjustment knobs 190, 192 and 196 to rotate the light curtain LC about the X'-axis a total angle of $-(\theta_x+\theta_2)$ and about the Y'-axis a total angle of $-(\theta_y+\theta_1)$.

The values of the angles $\theta_x$ and $\theta_y$ are calculated by fitting data of the intersection lines to solve a convex optimization problem as shown in FIG. 23A. The coordinates $(X_c, Y_c, Z_c)$ of the pivot point O of the light curtain LC are then calculated as shown FIG. 23B.

Two positions of the Y'-axis are calculated by rotating the light curtain LC about the X'-axis by angle $\theta_x$ and angle $\theta_x+\theta_2$, wherein angle $\theta_2$ is obtained at step 408 above (step 4120). Three rotation matrices are calculated about the Y'-axis to represent three possible orientations of the light curtain LC that result in the generation of the three intersection lines (step 4122). The first possible orientation is represented by the light curtain LC rotated about the first position of the Y'-axis at angle $\theta_y$. The second possible orientation is represented by the light curtain LC rotated about the first position of the Y'-axis at angle $\theta_y+\theta_1$. The third possible orientation is represented by the light curtain LC rotated about the second position of the Y'-axis at angle $\theta_y+\theta_1$. Three final rotation matrices are calculated by combining the rotation matrices calculated in step 4122 with a rotation matrix calculated about the X'-axis at the angle $\theta_x$ and the angle $\theta_x+\theta_2$ (step 4124). The direction of each estimated intersection line resulting from the intersection of the light curtain LC and the display surface is calculated using the rotation matrices obtained in step 4124 (step 4126). The equation of each estimated intersection line is calculated using an arbitrary point from the captured image frames and the direction of the estimated intersection line obtained in step 4126 (step 4128). The error between the intersection lines measured from the captured image frames and the estimated intersection lines is calculated using convex optimization techniques such as that described in the publication entitled "Convex Optimization" authored by Stephen Boyd and Lieven Vandenberghe and published by Cambridge University in 2004 (step 4130). The error is compared to an error threshold and if the error is greater than the threshold, the method returns to step 4120 using a new estimated value for angles $\theta_x$ and $\theta_y$ (step 4132). Once the error is less than the error threshold, the values of angles $\theta_x$ and $\theta_y$ are determined and the method continues to step 4134.

Once the values of angles $\theta_x$ and $\theta_y$ are determined, the coordinates $(X_c, Y_c, Z_c)$ of the pivot point O of the light curtain LC are calculated according to the method shown in FIG. 23B. The directions of the X'-axis and the Y'-axis in three dimensional (3D) space are calculated using the values of angles $\theta_x$ and $\theta_y$ (step 4134). The intersection point A between the first intersection line I and the second intersection line II is calculated, and the intersection point B between the second intersection line II and the third intersection line III is calculated (step 4136). The equations of the X'-axis and Y'-axis are calculated in 3D space (step 4138). The closest point on the Y'-axis to the X'-axis is determined and the closest point on the X'-axis to the Y'-axis is determined (step 4140). The coordinates of the mid-point between the two closest points are determined (step 4142). As will be appreciated, the mid-point is the pivot point O of the light curtain and as such, the coordinates $(X_c, Y_c, Z_c)$ of the pivot point O of the light curtain LC are determined.

Using the values of angles $\theta_x$ and $\theta_y$ and the coordinates $(X_c, Y_c, Z_c)$ of the pivot point O of the light curtain LC, the adjustment required to adjust the light curtain LC to its desired position is calculated. As will be appreciated, once angles $\theta_x$ and $\theta_y$ are determined, the light curtain LC is adjusted by the negative of angle $\theta_x+\theta_2$ and angle $\theta_y+\theta_1$. Once the required adjustment is calculated the amount of adjustment required is communicated to the user (step 414).

Figure 24:
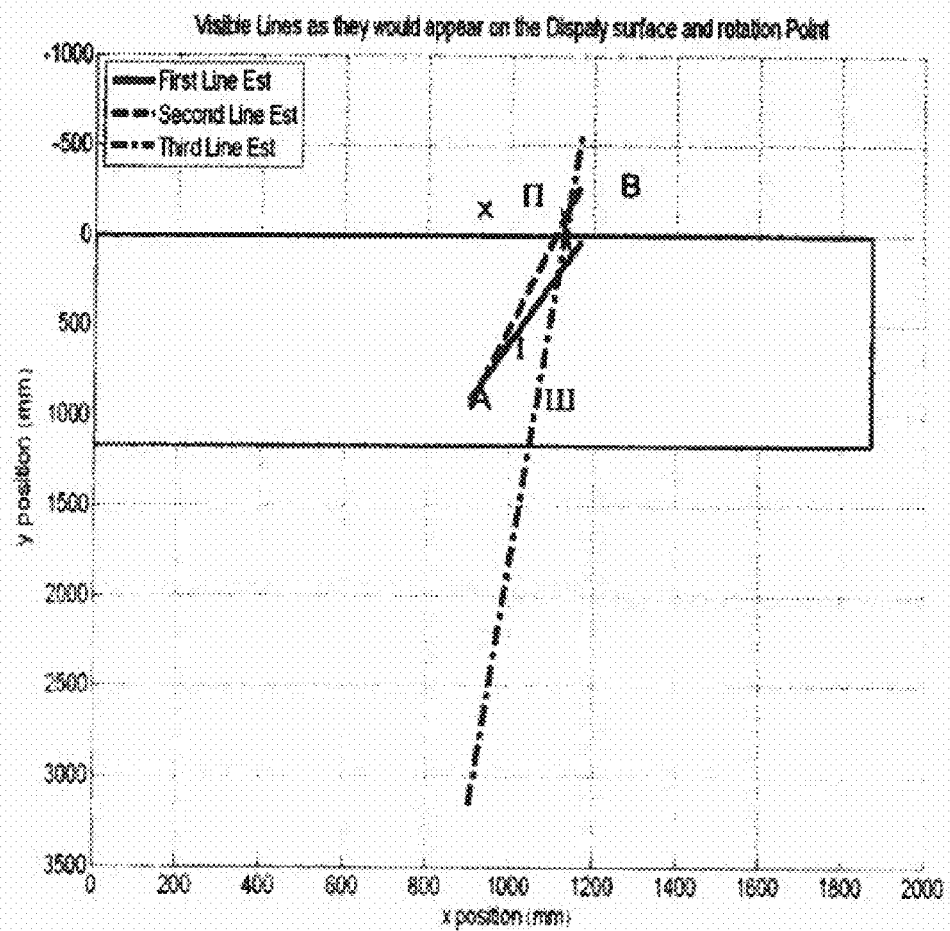
FIG. 24 is a Matlab simulation plot of three intersection lines used during the method of FIG. 22.

FIGS. 24 to 28 show simulation results of the method for adjusting the position of the light curtain LC. In particular, FIG. 24 shows the three intersection lines I, II and III and their intersection points A and B as well as the region of interest 106.

Figure 25A:
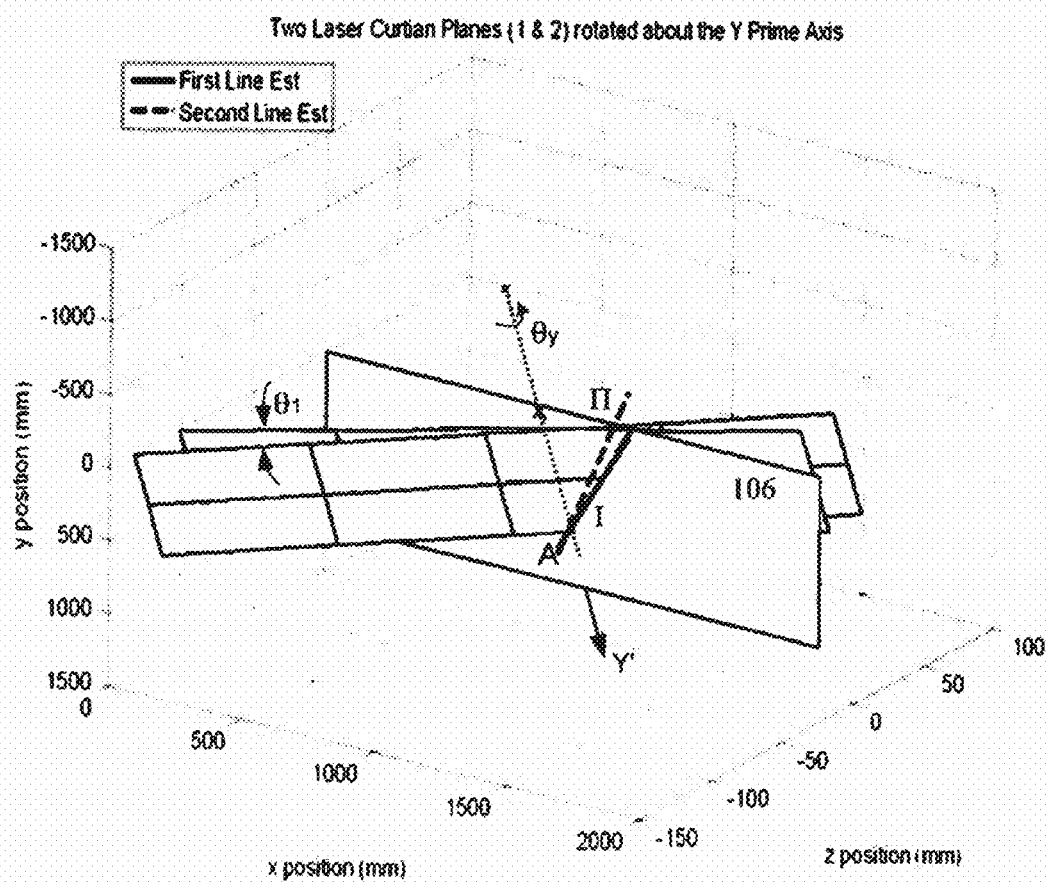
FIGS. 25A and 25B are Matlab simulation plots showing first and second planes of the light curtain used to generate intersection lines of FIG. 24.
Figure 25B:
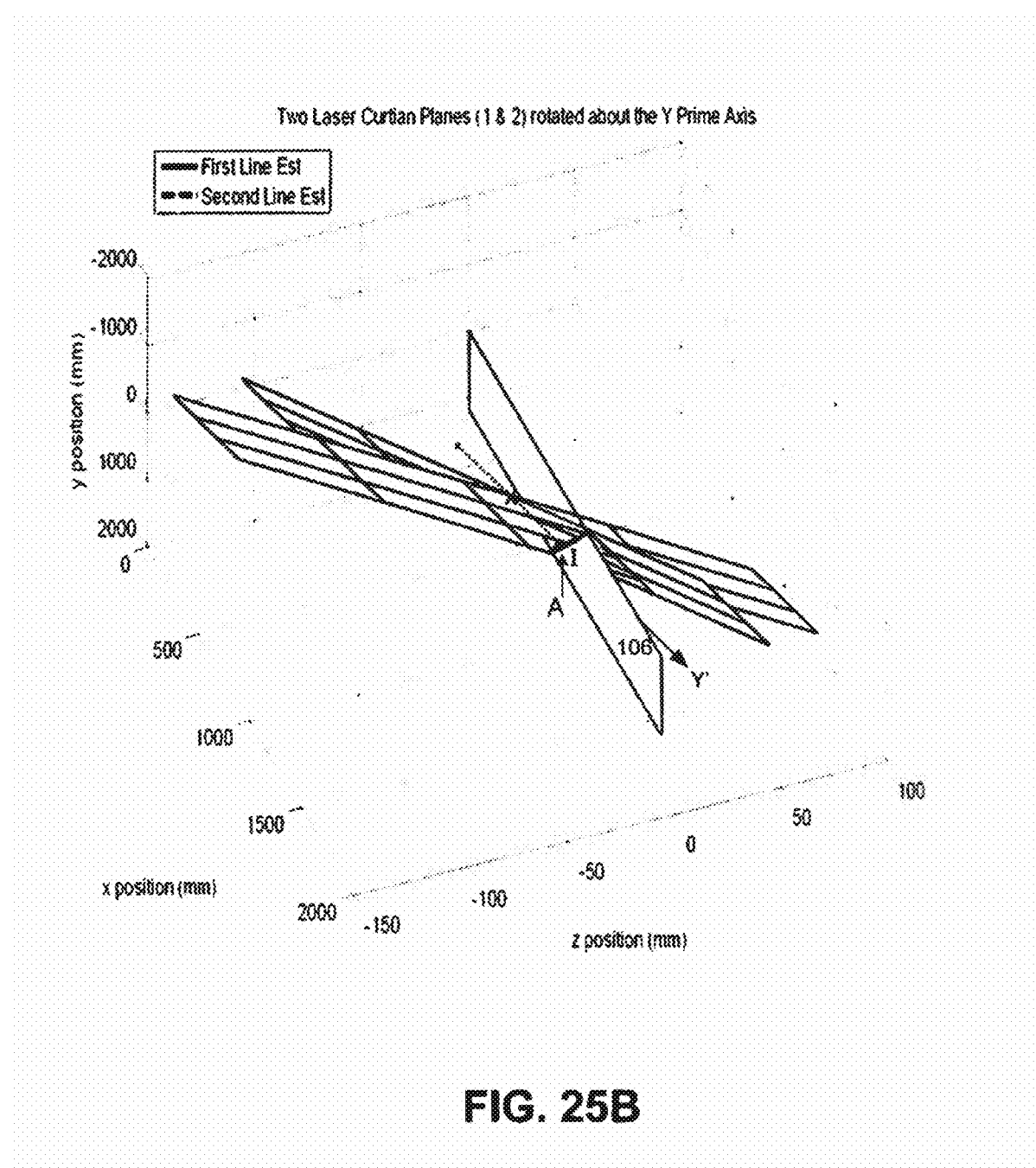

FIGS. 25A and 25B show the planes of the light curtain LC used to generate the intersection lines I and II of FIG. 24 as well as the region of interest 106. As can be seen, angle $\theta_y$ represents the angle of the light curtain rotated about the Y'-axis. The intersection line II is generated by rotating the light curtain LC by the first known angle $\theta_1$ about the Y'-axis.

Figure 26:
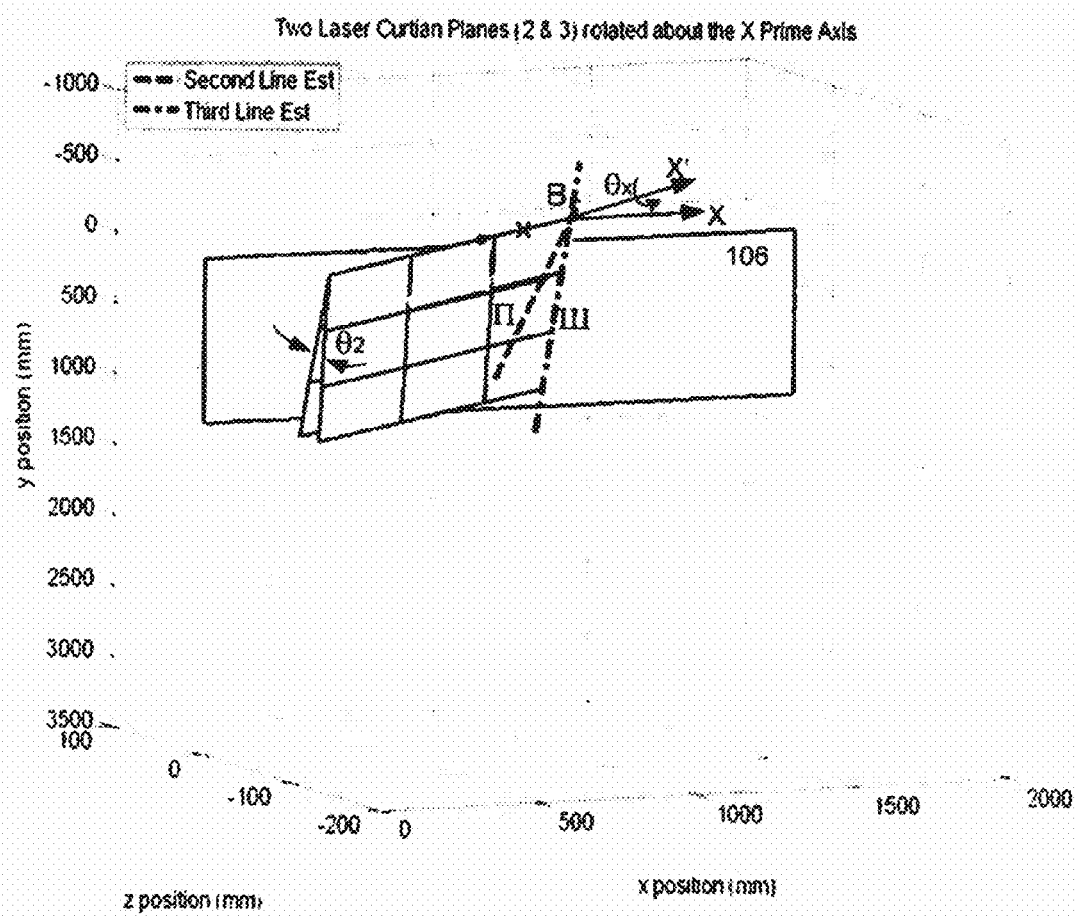
FIG. 26 is a Matlab simulation plot showing second and third planes of the light curtain used to generate intersection lines of FIG. 24.

FIG. 26 shows the planes of the light curtain LC used to generate the intersection lines II and III of FIG. 24 as well as the region of interest 106. Angle $\theta_x$ represents the angle of the light curtain rotated about the X'-axis. The intersection line III is generated by rotating the light curtain LC by the second known angle $\theta_2$ about the X'-axis.

Figure 27A:
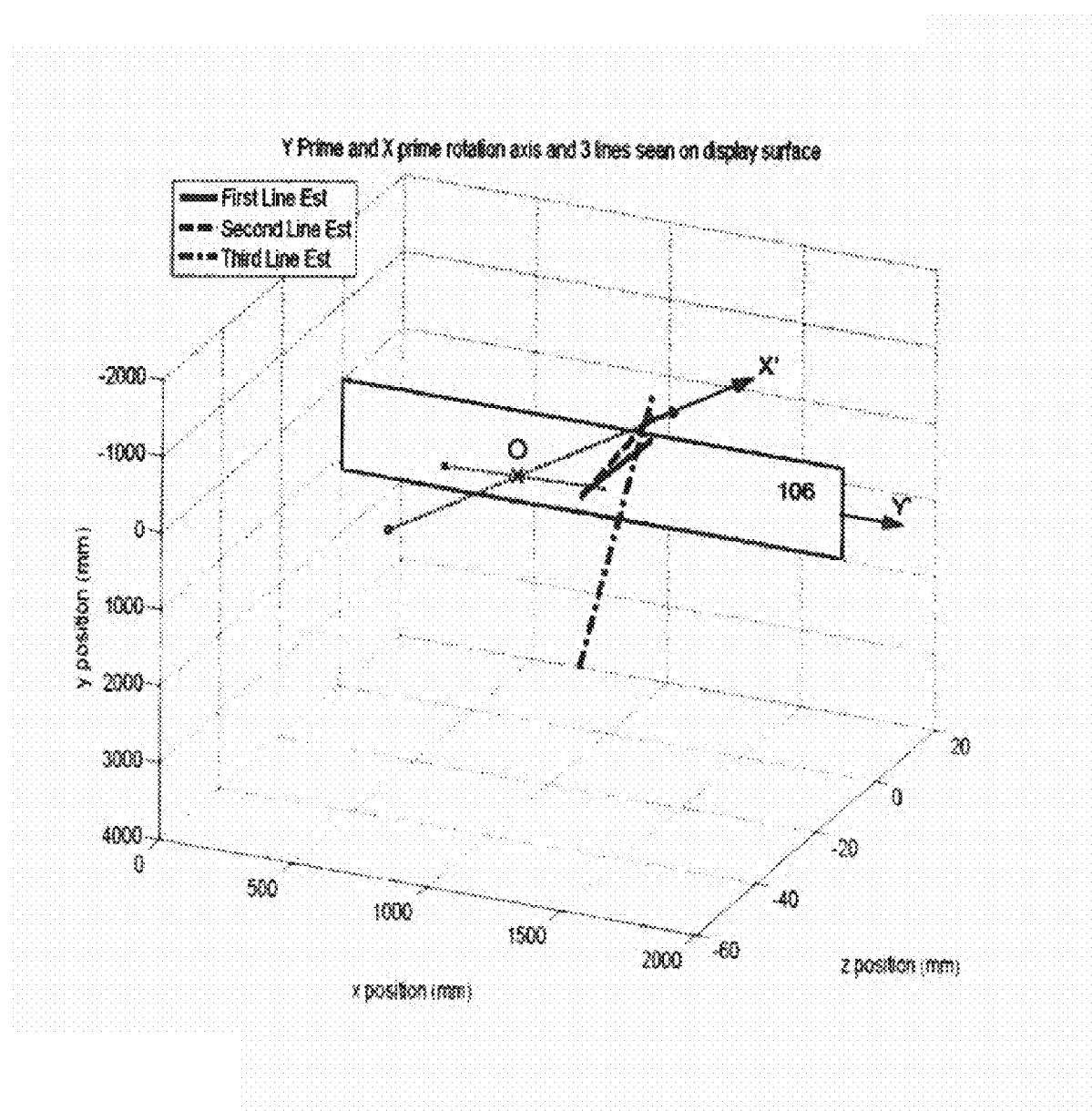
FIGS. 27A and 27B are Matlab simulation plots showing the X'-Y' plane of the light curtain.
Figure 27B:
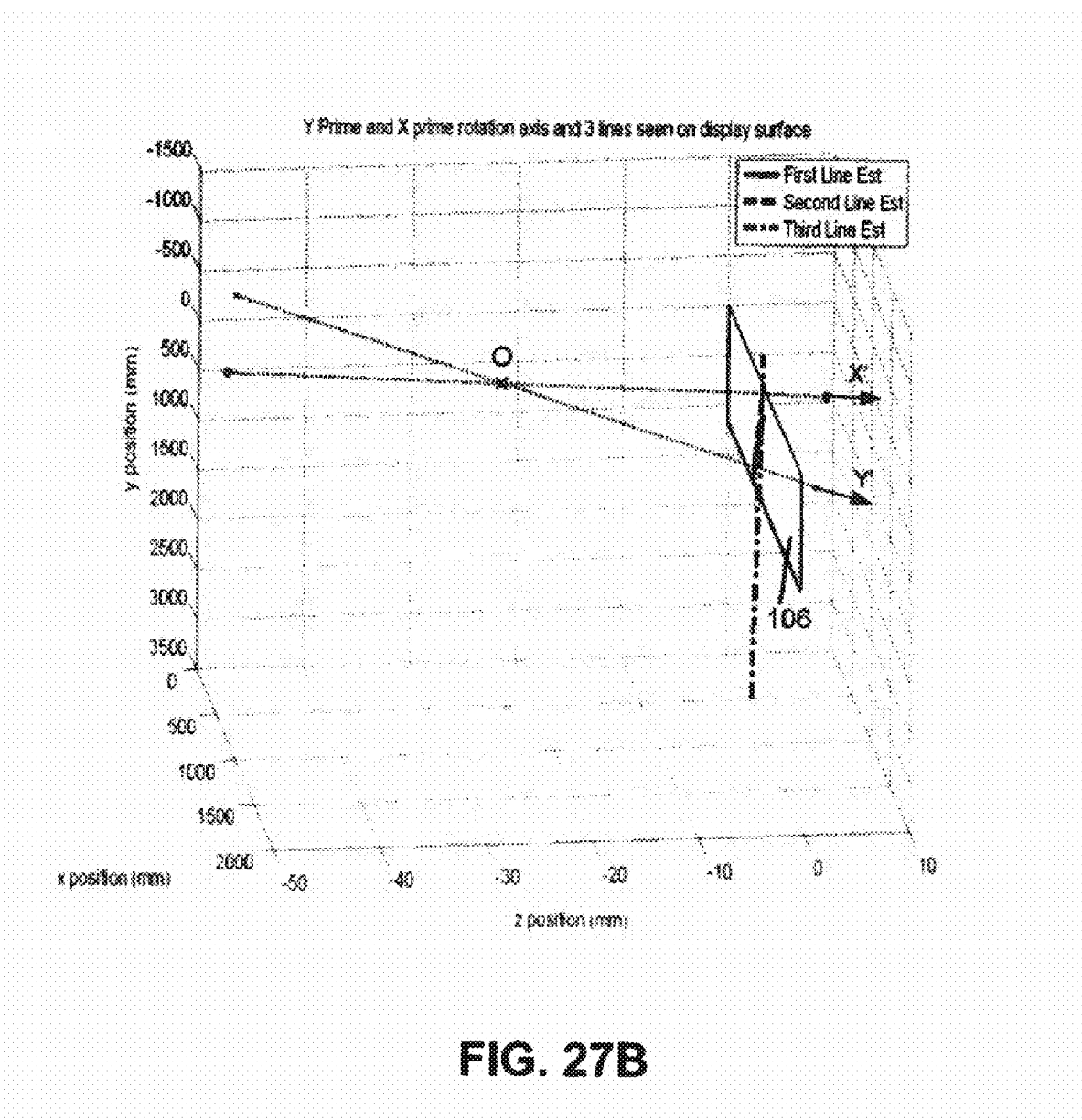
Figure 28:
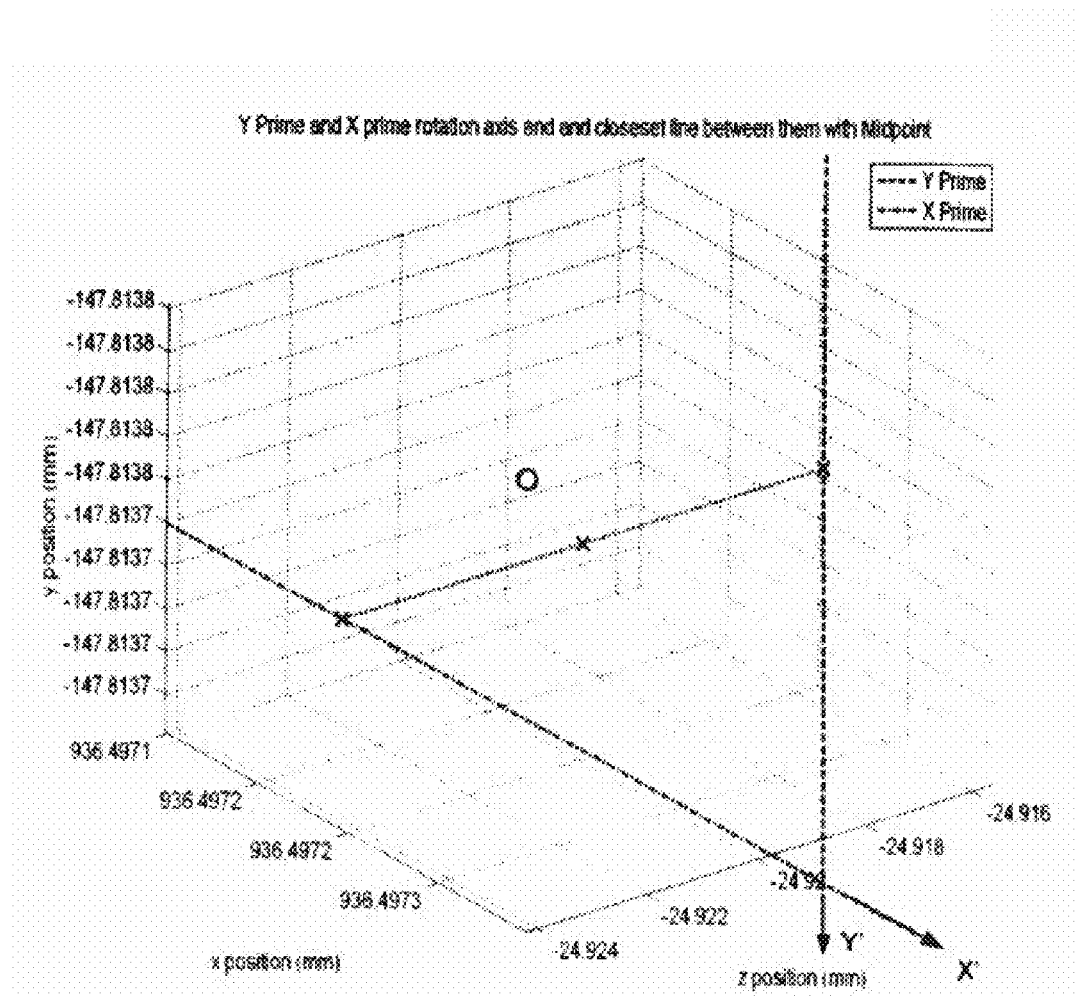
FIG. 28 is an enlarged view of the simulation plots of FIGS. 27A and 27B.

The final position of the light curtain LC is shown in FIGS. 27A and 27B. FIG. 28 shows the intersection point X'-axis and the Y'-axis. As can be seen, the offset between the X'-axis and the Y'-axis is approximately 0.01. The pivot point O of the light curtain LC showing the shortest distance between the final X'-axis and the final Y'-axis is also shown.

Three light curtains LC were installed at different locations and at different angles and the method for adjusting the position of the light curtain LC described above was tested. The test results are shown in Table 1 below.

TABLE 1

Test Results for three initial light curtain LC positions

| | Group 1 | | Group 2 | | Group 3 | |
|---|---|---|---|---|---|---|
| | True Value | Estimated Value | True Value | Estimated Value | True Value | Estimated Value |
| X | 936 | 935.7085 | 936 | 931.0489 | 803 | 803.0450 |
| Y | −150 | −150.3607 | −150 | −146.3855 | −177 | −177.8764 |
| Z | −25 | −25.0369 | −25 | −25.3362 | −37 | −37.0135 |
| θx | 1.5 | 1.4999 | 2 | 2.0008 | 1.378 | 1.3772 |
| θy | 5 | 4.9983 | 0.5 | 0.5068 | 4.5304 | 4.5307 |

In Table 1, the true value represents the actual pivot point of the illumination assembly 150. During each test, the light curtain LC was oriented to impinge on the display surface thereby to generate the three intersection lines. After completion of the iterative analysis using the above-described method, the estimated values were computed based on the captured image frames of the three intersection lines. Group 2 used the same illumination assembly pivot point as Group 1, however different angles $\theta_x$ and $\theta_y$ were used. Group 3 used a different illumination assembly pivot point and different angles $\theta_x$ and $\theta_y$ than Groups 1 and 2. As can be seen, the estimated values obtained are very close to the true values.

Figure 29:
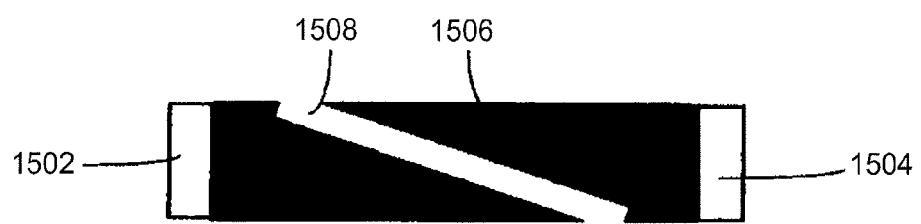
FIG. 29 is a top plan view of a gauge tool.

Once the position of the light curtain LC has been adjusted as described above, the light curtain LC may need to be finely adjusted. To finely adjust the position of the light curtain LC, a gauge tool 1500 is used as shown in FIG. 29. As can be seen, gauge tool 1500 in this embodiment is rectangular in shape and comprises end portions 1502 and 1504, and middle portion 1506. The end portions 1502 and 1504 are bright and in this example are white. The middle portion 1506 is primarily dark and in this example is black with the exception of a bright (white) generally diagonal line or band 1508 extending thereacross.

Figure 30:
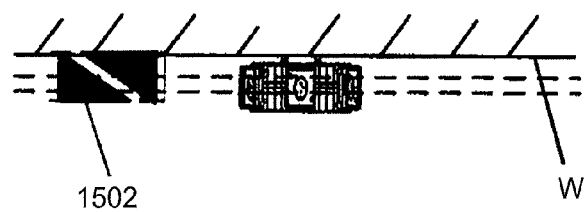
FIG. 30 is a top plan view of the interactive input system of FIG. 1 showing the gauge tool of FIG. 29 in proximity with the region of interest.
Figure 31:
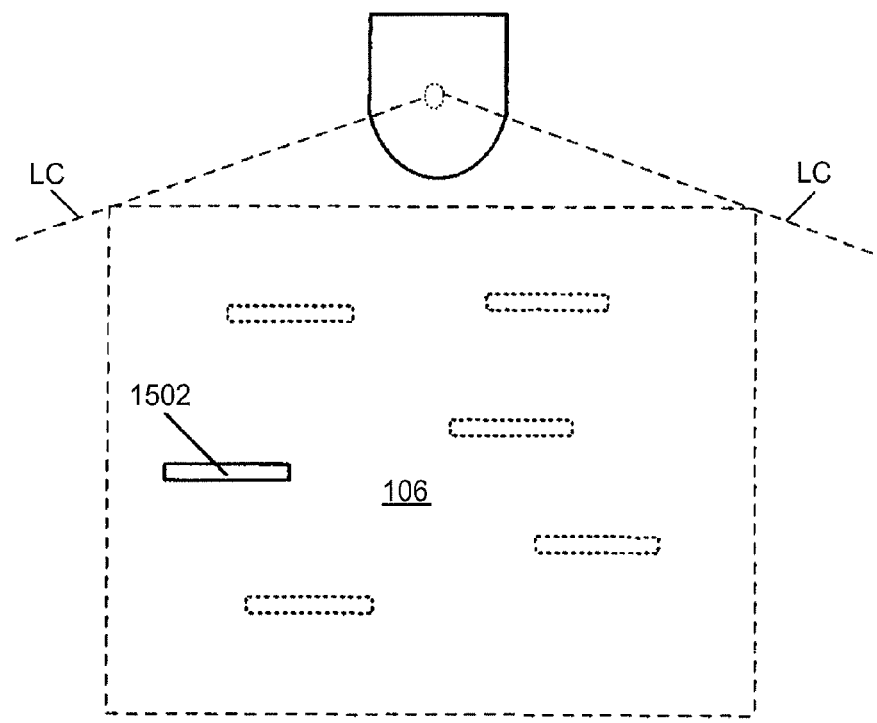
FIG. 31 is a schematic front elevational view of the interactive input system of FIG. 1 showing the gauge tool of FIG. 29 at a plurality of positions within the region of interest.
Figure 32:
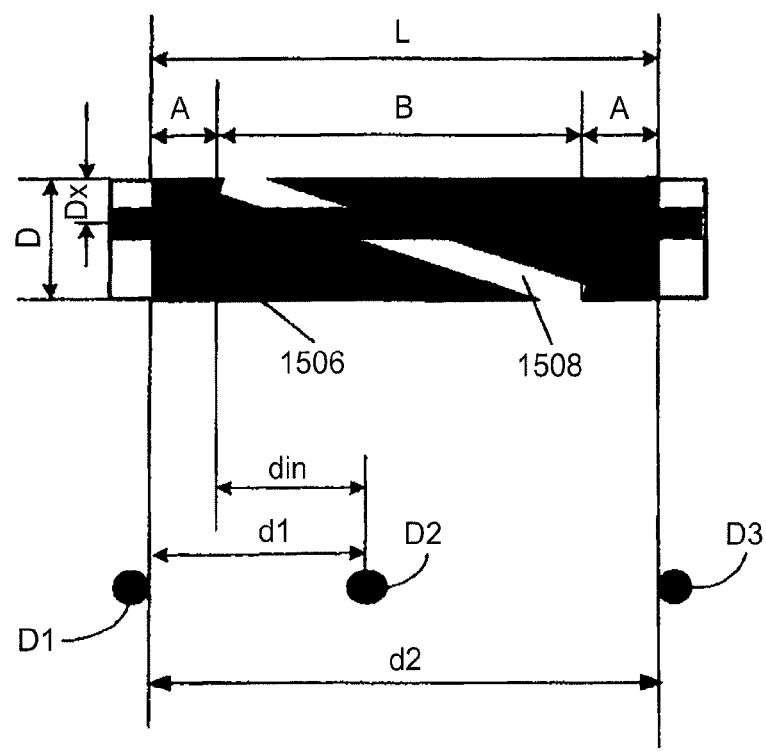
FIG. 32 is an exemplary image of the gauge tool of FIG. 29 showing reference marks used for image processing.

As shown in FIGS. 30 and 31, during use the gauge tool 1500 is placed against the display surface such that the light curtain LC impinges on the top surface of the gauge tool 1500. The portions of the light curtain LC that intersects with the white end portions 1502 and 1504 and the white diagonal line 1508 are reflected back towards the imaging module 124. The portions of the light curtain LC that intersect with the black middle portion 1506 are absorbed and thus are not reflected back towards the imaging module 124. The imaging module 124 in turn captures an image frame and communicates the captured image frame to the touch processing module 126. The touch processing module 126 processes the captured image frame and identifies three dots D1, D2 and D3 representing the portions of the light curtain reflected back to the imaging module 124, as shown in FIG. 32. The distance $D_x$ between the light curtain LC and the region of interest 106 is calculated as a function of the relative position of dot D2 with respect to dots D1 and D3. Specifically, the distance $D_x$ between the light curtain LC and the region of interest 106 is calculated using the following equations:

$$din = d1 - d2(A/L) \quad (1)$$

$$Dx = (D/B)(L/d2)din \quad (2)$$

where L is the length of the middle portion 1506, B is the length of the diagonal line 1508, A is the distance between the edge of the middle portion 1506 and the edge of the diagonal line 1508, D is the width of the middle portion 1508, d1 is the distance between the inside edge of dot D1 and the middle of dot D2, d2 is the distance between the inside edges of dots D1 and D3, and din is the distance between dot D2 and the left edge of the middle portion 1506. Since the distance A between the edge of the middle portion 1506 and the edge of the diagonal line 1508, the length B of the diagonal line, the width D of the middle portion 1508 and length L of the middle portion are known, the value of the distance Dx between the light curtain LC and the region of interest 106 is easily calculated. Measurements of distance Dx at various locations of the region of interest 106 may be used to calculate the desired fine adjustment of the light curtain LC.

Based on the data of the distance Dx or the visual observation in the image frame, corresponding adjustment may be performed manually by rotating the adjustment knobs 190, 192 and 196. It will be noted that distance A, length B, width D, length L, and distance Dx are physical measurements and are measured in millimeters, and distance d1, distance d2, and distance din are image measurements and are measured in pixels.

In this embodiment, the length L of the middle portion 1506 is 140 mm, the distance A between the edge of the middle portion 1506 and the edge of the diagonal line 1508 is 20 mm, the length B of the diagonal line 1508 is 100 mm, and the width D of the middle portion 1506 is 40 mm. It will be appreciated that other dimensions may be used.

Figure 33:
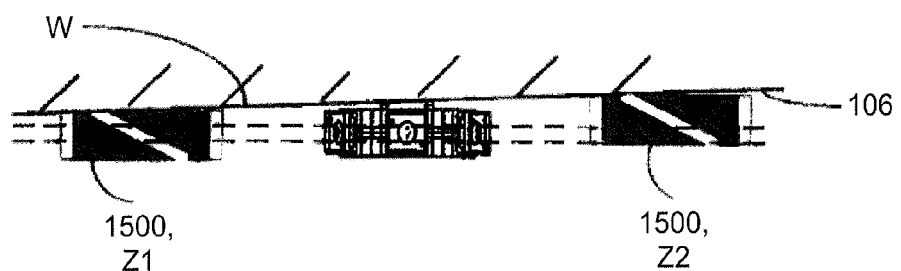
FIGS. 33 and 34 are top plan views of the interactive input system of FIG. 1 showing the gauge tool of FIG. 29 in proximity with a flat and curved display surface, respectively, at two locations.

FIG. 33 is another top view of the interactive input system 100 showing the gauge tool 500 placed against the display surface at two different locations, identified as Z1 and Z2, such that the light curtain LC impinges on the top surface thereof. The distance Dx is calculated according to equations (1) and (2) above for each of the locations Z1 and Z2. As will be appreciated, the distance Dx for location Z1 is less than the distance Dx for location Z2. This indicates that the light curtain LC is closer to the display surface on the left hand side than it is on the right hand side. As such, the user is prompted to rotate one of the adjustable knobs 190 or 192 to adjust the position of the light curtain LC until the plane of the light curtain is generally parallel with the plane of the region of interest 106.

Figure 34:
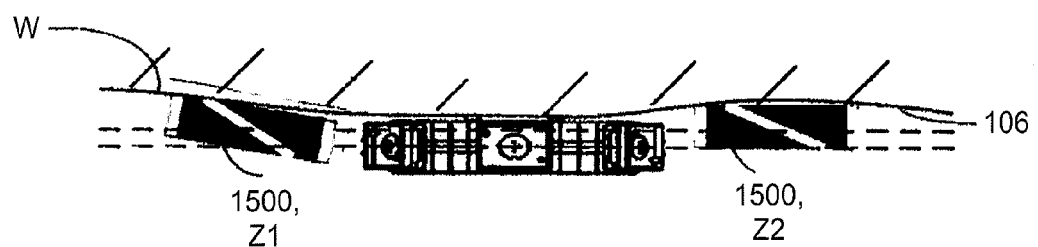

FIG. 34 is a top view of the interactive input system 100 mounted on a curved support surface W. As can be seen, in this example the gauge tool 500 is again placed against the display surface at two different locations, identified as Z1 and Z2. In this case, the light curtain LC does not fully impinges on the top surface of the gauge tool 500 at location Z1 as the light curtain LC is positioned too far away from the display surface. As such, the user is prompted to rotate the adjustment knobs 190 and 192 to adjust the Z-position of the light curtain LC such that it is brought nearer to the display surface. Further, since the display surface is curved, the user is prompted to rotate one of the adjustable knobs 190 or 192 to adjust the position of the light curtain LC until the distance Dx is generally equal for locations Z1 and Z2.

Although the gauge tool is described above as being rectangular in shape, those skilled in the art will appreciate that other shapes may be used. For example, the gauge tool may be triangular in shape. Further, the white diagonal line on the top surface of the gauge tool may be replaced with a bright region of other shape or pattern such as for example a triangular shape or a stair-type pattern.

Although embodiments are described wherein the gauge tool is used to finely adjust the position of the light curtain LC based on the calculated value of distance Dx after an initial method for adjusting the position of the light curtain LC has been carried out, those skilled in the art will appreciate that the gauge tool may be used to adjust the position of the light curtain LC without the use of the above-described light curtain adjustment method.

Figure 35:
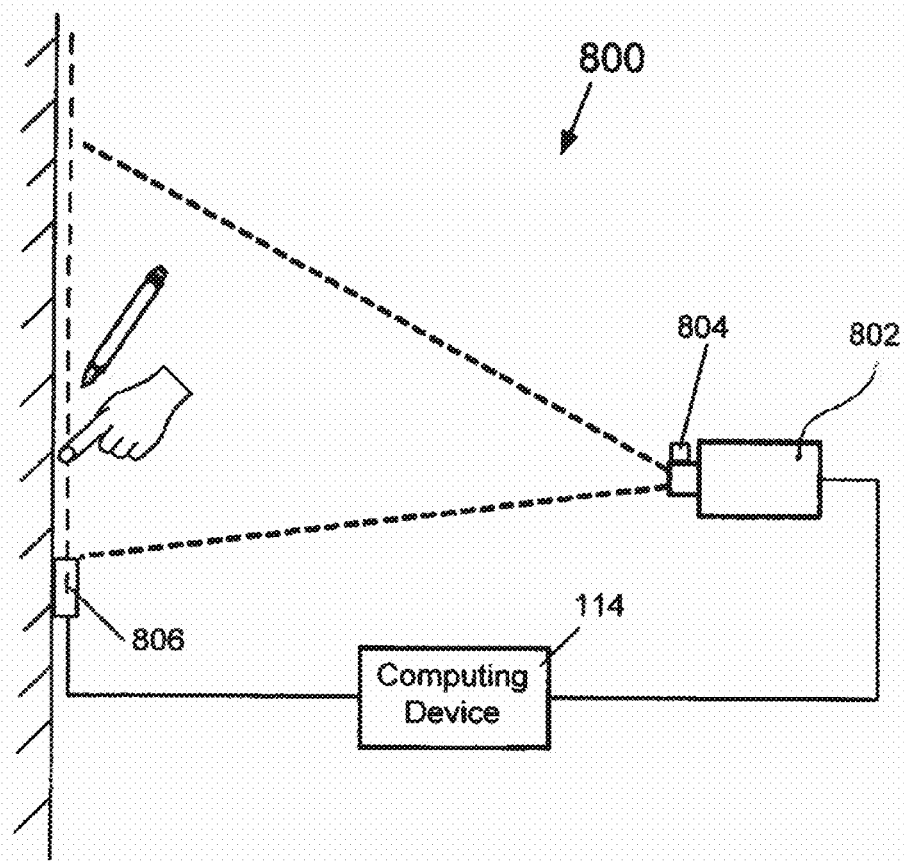
FIG. 35 is a side elevational view of another embodiment of an interactive input system.

Although the interactive input system is shown as comprising an interactive projector mounted adjacent the distal end of a boom-like support assembly, those of skill in the art will appreciate that alternatives are available. For example, FIG. 35 shows another embodiment of an interactive input system identified by reference number 800. As can be seen, in this embodiment interactive input system comprises a front projector 802 for projecting an image on a support surface or the like. An imaging module 804 is positioned adjacent the projector 802 and has a field of view looking at a region of interest on the support surface. An illumination assembly 806 is mounted on the support surface and emits a light curtain in front of the support surface. A touch processing module (not shown) receives image frames captured by the imaging module and carries out one of the image processing methodologies described previously to locate the position of a pointer that is brought into contact with the support surface, and to differentiate between a pen tool and a finger. In this embodiment, the illumination assembly 806 is adjustable based on the adjustment method discussed above.

Figure 36:
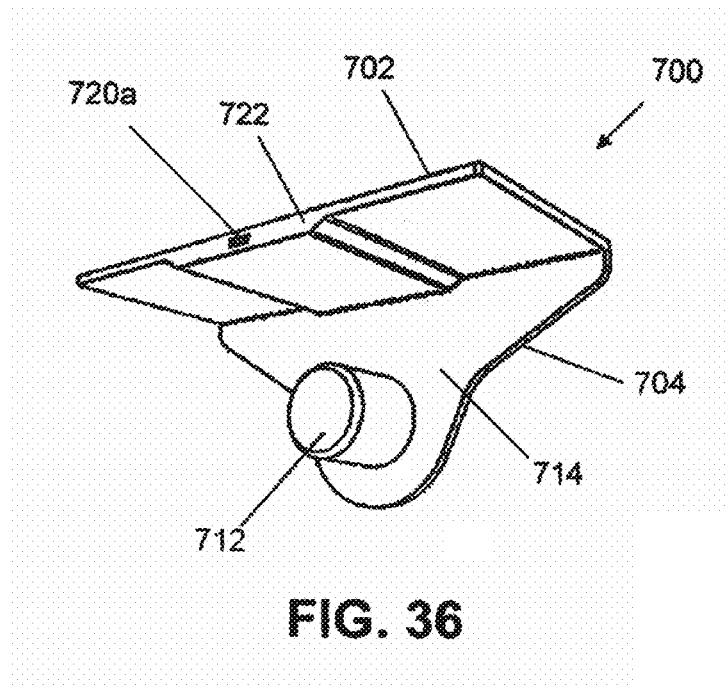
FIG. 36 is a bottom perspective view of another embodiment of a gauge tool.
Figure 37:
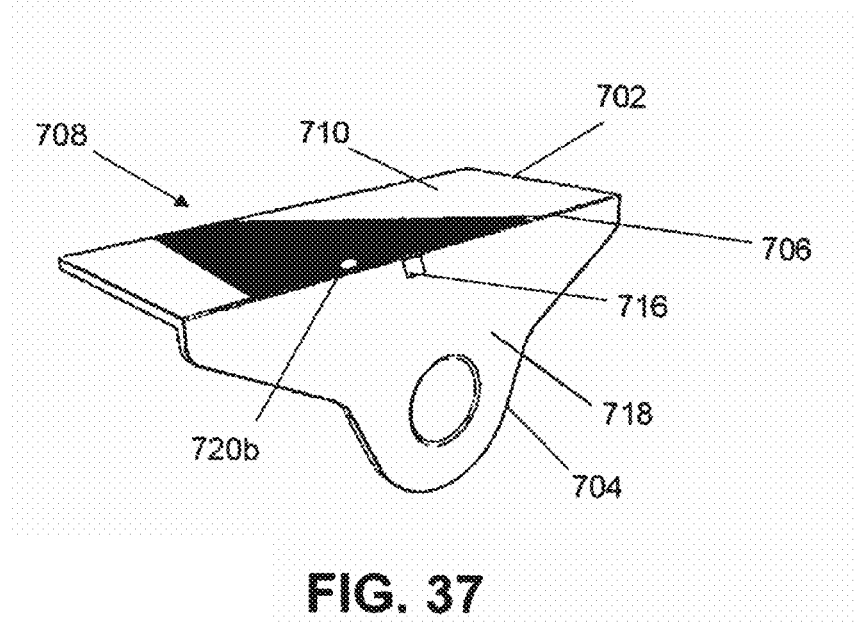
FIG. 37 is a top perspective view of the gauge tool of FIG. 36.
Figure 38:
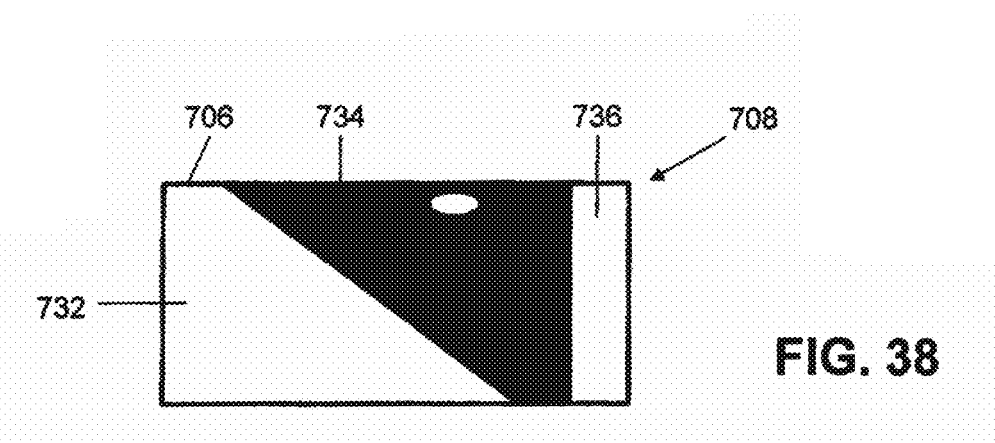
FIG. 38 is a top plan view of the gauge tool of FIG. 36.

Although methodologies and gauge tools for adjusting the position of the light curtain so that it is substantially parallel with the display surface have been described above, alternatives are available. For example, FIGS. 36 to 38 show another gauge tool 700 used for adjusting the position of the light curtain. In this embodiment, the gauge tool 700 comprises a top plate 702 and a front plate 704 perpendicularly extending downwardly from the front edge 706 of the top plate 702. A reference mark 708 that is high-contrast under infrared (IR) light, e.g. a black and white mark, is printed, painted or otherwise provided on the top surface 710 of the top plate. A handle 712 protrudes from the back surface 714 of the front plate 704 to facilitate grasping by a user. A contact switch 716 is located on the front surface 718 of the front plate 704, which closes when the front surface 718 of the front plate 704 is brought into contact with the display surface. The contact switch 716 controls a first indicator 720a in the form of an illumination source such as a green LED, installed on the back side 722 of the top plate 702 for indicating to the user whether or not the front surface 718 of the gauge tool 700 is in contact with the display surface. The contact switch 716 also controls a second indicator 720b in the form of an illumination source, such as an IR LED installed on the top surface 710 of the top plate 702 near the front edge 706 for indicating to the interactive input system whether or not the front surface 718 of the gauge tool 700 is in contact with the display surface.

In use, when the user holds the handle 712 and presses the front plate 704 of the gauge tool 700 against the display surface, with the top surface 710 of the top plate 702 generally facing the imaging module 124, the contact switch 716 closes, which consequently results in the first and second indicators 720a and 720b being turned on. With the gauge tool 700 positioned in this manner, the light curtain LC impinges on the top plate 702. The top plate 702 of the gauge tool 700 in turn reflects the light curtain LC allowing the imaging module 124 to capture an image frame including the reference mark 708.

FIG. 38 shows the top surface 710 of the top plate 702 better illustrating the design of the reference mark 708. As can be seen, moving across the top plate 702 from left to right, the reference mark 708 comprises three portions or regions 732, 734 and 736, namely a first portion 732 that is bright in IR (e.g., white), a second portion 734 that is dark in IR (e.g., black) adjacent to the first portion 732, and a third portion 736 that is bright in IR (e.g., white) adjacent to the second portion 734. The first portion 732 is configured in a mariner such that its width, measured in a direction parallel to the front edge 706, monotonically changes according to a predefined scheme (e.g., linearly increases) from front edge 706 to the opposite rear edge of the top plate 710. In this embodiment, the width of second portion 734 also monotonically changes according to a complementary scheme (e.g., linearly decreases) from the front edge 706 to the opposite rear edge of the top plate. The width of the third portion 736 in this embodiment is constant.

Figure 39A:
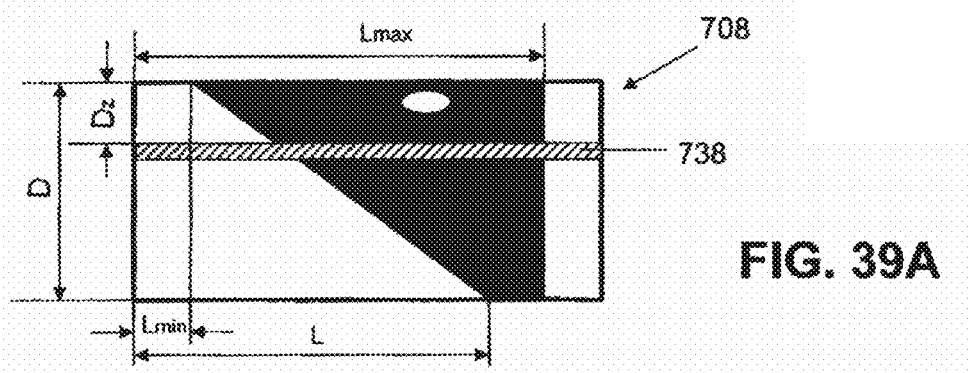
FIG. 39A is a top plan view of the gauge tool of FIG. 36 showing the geometry of a reference mark of the gauge tool and the light curtain impinging on the gauge tool.
Figure 39B:
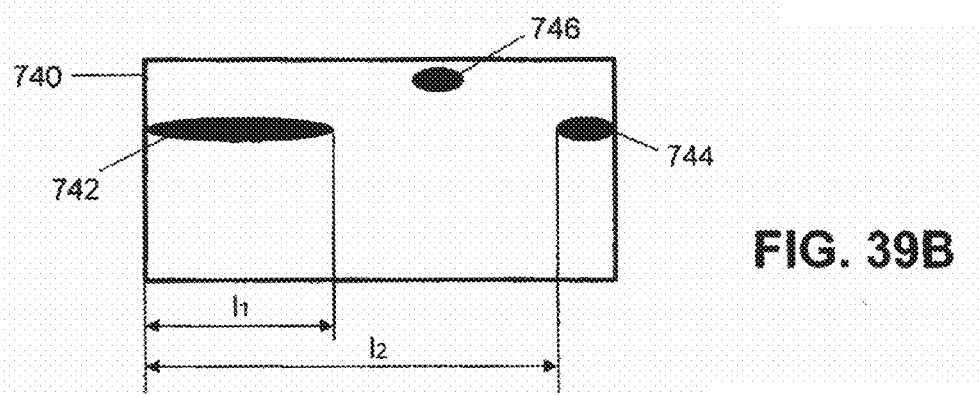
FIG. 39B is an image frame of the gauge tool of FIG. 39A showing three bright bands in the image frame.

When the user applies the gauge tool 700 against the display surface as described above, and the light curtain LC impinges on the top plate 702, the reference mark 708 reflects the light curtain LC. The imaging module 124 captures image frames of the reference mark 708, and transmits the captured image frames to the touch processing module 126. FIG. 39A illustrates an example of the light curtain LC impinging on the top surface of the top plate 702 and intersecting the reference mark 708, and FIG. 39B shows the corresponding image frame 740 captured by the imaging module 124. As shown in FIG. 39A, the reference mark 708 and the light curtain LC intersect at a location 738. As a result, at least a portion of the light curtain LC is reflected towards the imaging module 124. As the first and third portions 732 and 736 of the reference mark 708 are bright in IR and the second portion 734 of the reference mark 708 is dark in IR, the captured image frame 740 comprises two bright bands 742 and 744 corresponding to the first and third portions 732 and 736, respectively, separated by a dark area corresponding to the second portion 734. The second indicator 720b also appears as a bright dot 746 in the captured image frame 740. The touch processing module 126 receives the captured image frame 740 from the imaging module 124, and detects the existence of the bright dot 746 therein. If the bright dot 746 is detected in the captured image frame 740, the touch processing module 126 then determines that the gauge tool 700 is in contact with the display surface, and that the captured image frame 740 is to be used for aligning the light curtain LC. If the bright dot 746 is not detected in the captured image frame 740, the touch processing module 126 then determines that the gauge tool 700 is not in contact with the display surface, and that the captured image frame 740 is not to be used for aligning the light curtain LC.

By virtue of the shape of the first portion 732 of the reference mark 708, the width of the bright band 742 provides an indication of the distance between the display surface and the light curtain LC. By capturing image frames of the reference mark 708 at different positions within the region of interest 106, the interactive input system is generally able to determine whether the light curtain LC is parallel to the display surface by checking whether the width of the bright band 742 of the first portion 732 is constant in captured image frames.

In this embodiment, the touch processing module 126 calculates the distance between the display surface and the light curtain LC, and provides instructions to users regarding how to adjust the light curtain LC so that the plane of the light curtain LC becomes generally parallel to the plane of the display surface. The distance Dz between the display surface and the light curtain LC is calculated from the ratio of the width of the bright band 742 and the distance between bright bands 742 and 744, expressed by the following equations:

$$R = l_1/l_2 \tag{3}$$

$$Dz = D*(Lmax*R - Lmin)/(L - Lmin) \tag{4}$$

where l1 and l2 are parameters in image pixels measured from the image frame 740, and D, L, Lmin and Lmax are predefined physical measurements (e.g., in millimeters or inches) of the reference mark, respectively.

In addition to calculating the distance Dz between the light curtain LC and the display surface, the interactive input system also detects the location (X', Y') of the gauge tool. After the user applies the gauge tool 700 at various locations within the region of interest 106 and against the display surface, the interactive input system obtains a set of three-dimensional (3D) position data (X', Y', Dz) describing the position of the light curtain LC in the 3D space in front of the region of interest 106, which is used by a light curtain alignment procedure for aligning the light curtain LC, as will now be described below.

Figure 40:
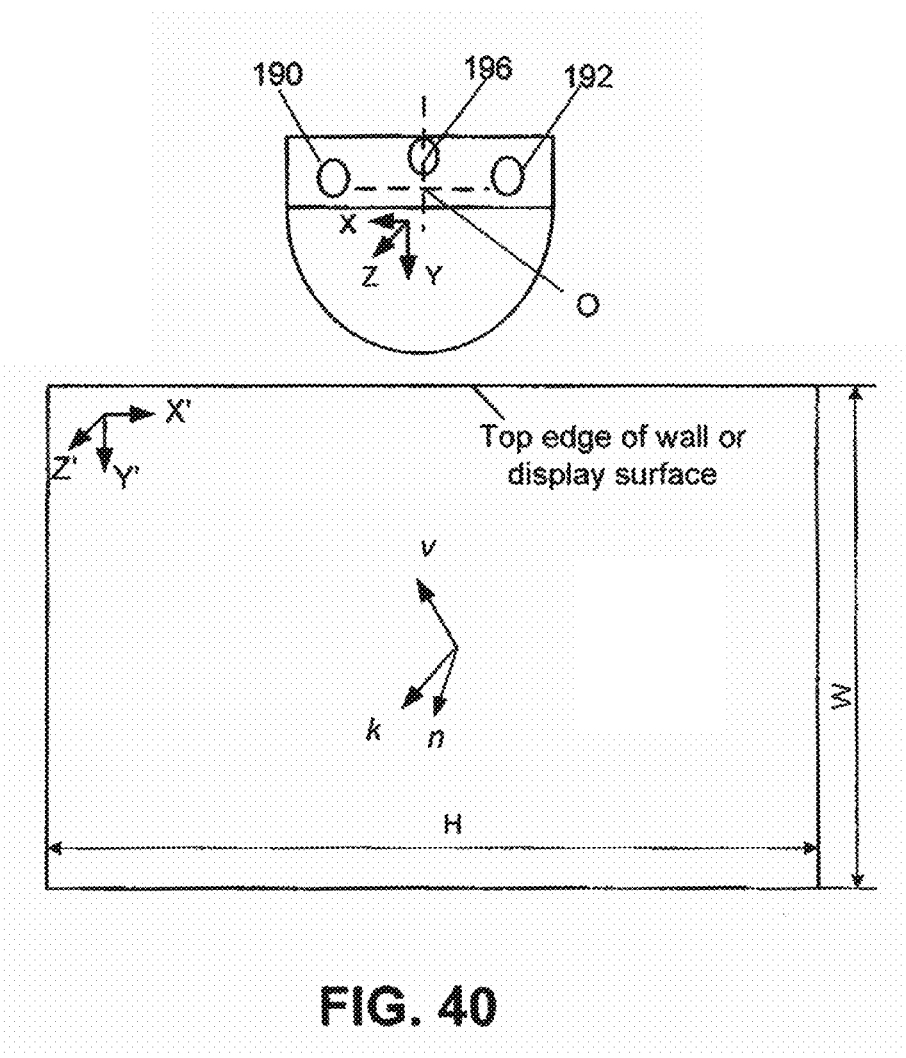
FIG. 40 is a schematic front elevational view of the adjustable support of FIG. 11A and its coordinate system.

The set of 3D position data (X', Y', Dz) is the position data in a 3D coordinate system (X', Y', Z') defined for the region of interest 106. As shown in FIG. 40, the 3D coordinate system (X', Y', Z') for the region of interest 106 is defined as a 3D Cartesian coordinate system with the origin at the upper left corner of the region of interest 106, the X'-axis increasing horizontally towards the right, the Y'-axis increasing downwardly, and the Z'-axis being perpendicular to the X'-Y' plane and directed out of page. FIG. 40 also illustrates the 3D Cartesian coordinate system (X, Y, Z) defined for the illumination assembly 150 with the origin at the pivot point O thereof, which is the center of the cylindrical collimating lens 170, the X-axis increasing horizontally towards the left, the Y-axis increasing downwardly, and the Z-axis being perpendicular to the X-Y plane.

As described above with reference to FIGS. 11C and 11D, the position of the light curtain LC is adjusted by rotating the adjustment knobs 190, 192 and 196. The touch processing module 126 calculates how much each adjustment knob 190, 192 and 196 has to be rotated by converting the set of 3D position data (X', Y', Dz) in the (X', Y', Z') coordinate system to a set of 3D position data in the (X, Y, Z) coordinate system, fitting a plane to the converted set of 3D position data, and then using the obtained plane coefficients to find a rotation axis that allows the light curtain plane to be made parallel to the display surface.

A point $(X_1', Z_1')$ in the (X', Y', Z') coordinate system can be converted to a point $(X_1, Y_1, Z_1)$ in the (X, Y, Z) coordinate system as:

$$X_1 = -WX_1' + X_0 \tag{5}$$

$$Y_1 = HY_1' + Y_0 \tag{6}$$

where H is the height of the display surface (taken to be the unit of length), W is the width of the display surface and $X_0$ and $Y_0$ are predefined offsets.

Figure 41:
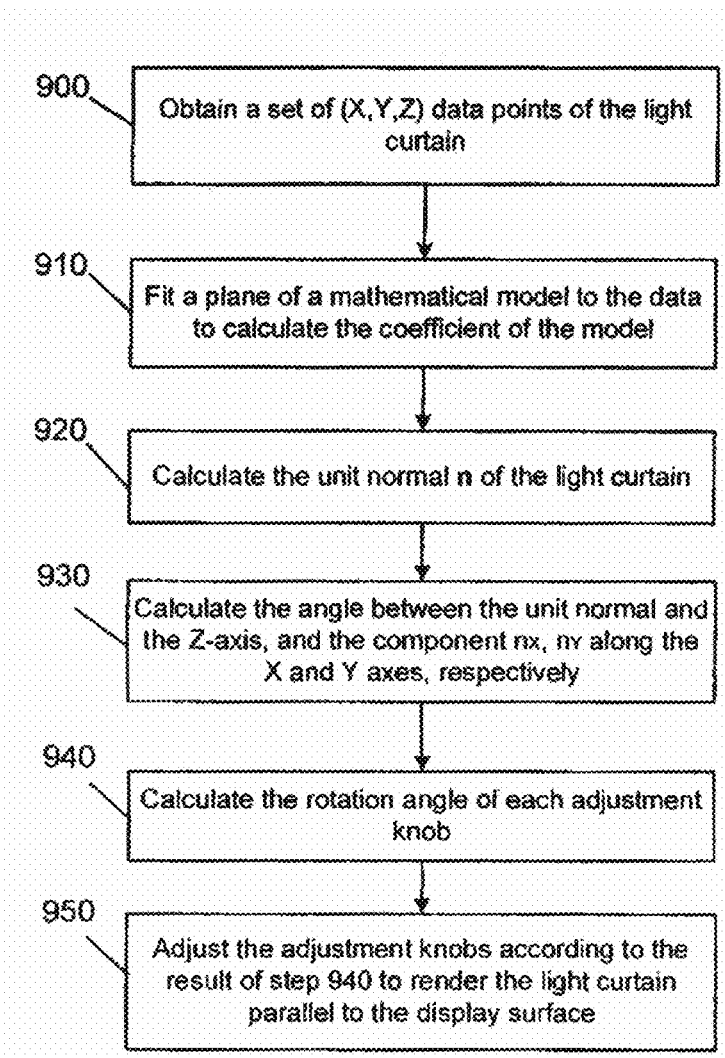
FIG. 41 is a flowchart showing an alternative method for adjusting the position of the light curtain.

The steps of the method for adjusting the position of the light curtain LC are shown in FIG. 41. During the method, the gauge tool 700 is brought into contact with the display surface and swiped across the region of interest 106. The captured image frames are then processed to obtain a set of (X', Y', Z') data points of the light curtain reflections appearing in the captured image frames (step 900), which is converted to a set of (X, Y, Z) data points as described above. Then, a plane represented by a mathematical model is fit to the set of data points to calculate the coefficients of the mathematical model (step 910). The mathematical model of the plane is expressed as:

$$AX+BY+CZ+d=0 \qquad (7)$$

Fitting the mathematical model to the set of data points is a least-squares problem such that the coefficients A, B, C are solvable via singular value decomposition (SVD). The coefficients A, B, C are the un-normalized components of a unit vector n perpendicular to the light curtain plane, and d is the distance from the closest point on the light curtain plane to the pivot point origin O. The normalized unit vector n, also referred to unit normal, is then calculated from the coefficients A, B, C (step 920), according to:

$$n = \frac{1}{\sqrt{A^2+B^2+C^2}}[A, B, C]^T \qquad (8)$$

where $[A,B,C]^T$ represents the transpose of the row vector [A, B, C].

After the unit normal n is determined, the angle between the unit normal and the Z-axis, and the components along the X and Y axes, respectively, are calculated (step 930).

As shown in FIG. 40, the angle θ between the unit normal n and the Z-axis is the angle through which the light curtain plane must be rotated to render it generally parallel to the plane of the display surface. An axis about which the light curtain LC is rotated is defined as v, also a unit vector. The relationship is expressed by the following equations:

$$\cos(\theta) = n \cdot k \qquad (9)$$

and, $$\sin(\theta) = \sqrt{1-\cos(\theta)^2} \qquad (10)$$

where $k=[0, 0, 1]^T$ is a unit vector along the Z-axis. The axis of rotation, also a unit vector, is then the vector cross-product:

$$v = n \times k \qquad (11)$$

which in this case is:

$$v = [n_Y, -n_X, 0]^T$$

where $n_x$ and $n_y$ are the components of the unit normal n along the X-axis and Y-axis, respectively. The axis v and angle θ allow a rotation matrix R to be specified according to:

$$R_{ij} = \delta_{ij} \cdot \cos(\theta) + n_i \cdot n_j \cdot (1-\cos(\theta)) - \sum_{k=1}^{3} \epsilon_{ijk} \cdot n_k \cdot \sin(\theta) \qquad (12)$$

where, $\delta_{ij}$ is the Kronecker delta symbol, whose value is 1 if i=j and zero otherwise, and, $\epsilon_{i,j,k}$ is the Levi-Civita symbol, whose value is 1 for a cyclic permutation of the indices i, j, k (e.g., 1,2,3 or 2,3,1), −1 for an acyclic permutation (e.g., 2,1,3), and zero otherwise (e.g., 1,2,1). Rotation matrix R should be an orthogonal matrix, meaning that:

$$\det(R) = 1$$
$$R^T \cdot R = I_3$$

where $$I_3 = \begin{bmatrix} 1 & 0 & 0 \\ 0 & 1 & 0 \\ 0 & 0 & 1 \end{bmatrix}$$

Any data point $X=[X, Y, Z]^T$ can be "de-rotated" by computing:

$$R^T \cdot X$$

where $$R^T = Q = \begin{bmatrix} Q_{11} & Q_{12} & Q_{13} \\ Q_{21} & Q_{22} & Q_{23} \\ Q_{31} & Q_{32} & Q_{33} \end{bmatrix}$$

since the inverse of an orthogonal matrix is just its transpose. From rotation matrix R the rotation angles needed to make the plane of the light curtain LC generally parallel to the plane of the display surface can be obtained. If $Q=R^T$, then the appropriate angles are:

$$\theta_X = \arctan\left(\frac{-Q_{31}}{\sqrt{Q_{32}^2+Q_{33}^2}}\right) \qquad (13)$$

$$\theta_Y = \arctan\left(\frac{Q_{32}}{Q_{33}}\right) \qquad (14)$$

where $\theta_X$ is the tilt angle, and $\theta_Y$ is the roll angle. The corresponding number of turns of each adjustment knob are calculated (step 940) according to:

$$N_X = d_{tilt} \cdot \frac{\sin(\theta_X)}{pitch_{tilt}} \qquad (15)$$

$$N_Y = d_{roll} \cdot \frac{\sin(\theta_Y)}{pitch_{roll}} \qquad (16)$$

The parameters $pitch_{tilt}$ and $pitch_{roll}$ refer to the spindle pitches of the corresponding adjustment knobs, and ($d_{tilt}$, $d_{roll}$) are the distances through which the turns are applied. To resolve the roll into turns of the left and right adjustment knobs 190 and 192, the following equations are used:

$$\text{left roll knob} = \frac{-N_Y}{2} - \frac{d-t}{pitch_{roll}} \qquad (17)$$

$$\text{right roll knob} = \frac{N_Y}{2} - \frac{d-t}{pitch_{roll}} \qquad (18)$$

In the above, d is the shortest distance between the plane of the light curtain LC and the origin O as defined earlier, and t is the "target depth", which is the desired distance between the plane of the light curtain LC and the display surface, in this embodiment, 6 mm. Given the correct number of turns for the adjustment knobs, the light curtain LC can be adjusted to this specified depth tin front of the display surface. Once the number of turns of each adjustment knob is known, the adjustment knobs are rotated accordingly to render the plane of the light curtain LC parallel to the plane of the display surface (step 950).

Figure 42:
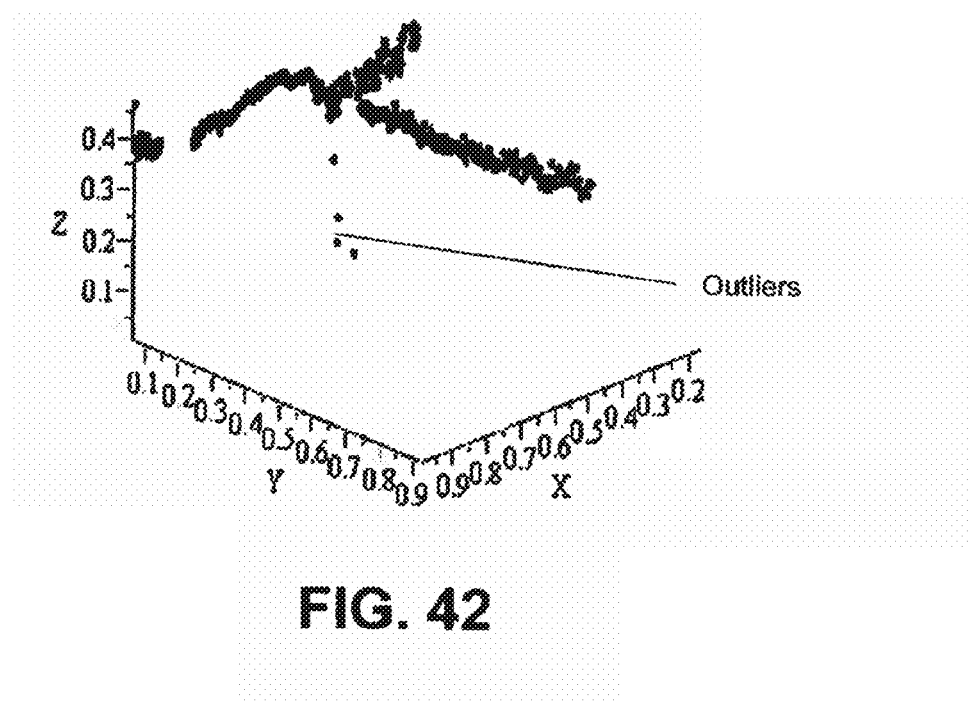
FIG. 42 is an example of a set of data obtained from the gauge tool following movement of the gauge tool in a "T" shape on the display surface, showing the outliers.

During plane fitting, it has been found that some data points may be noisy resulting in numerous outliers (i.e., data points greater than some distance tolerance of the best mathematical model). If these outliers are used during plane fitting, a bias will be introduced into the least-squares estimate. FIG. 42 shows an example of a set of data points obtained in response to moving the gauge tool across the display surface in a "T" shape pattern. As can be seen, there are outliers and noise in the Z-values. If all the data points including the outliers are used during plane fitting, it may generate an unsatisfactory result. Thus, it is desired to adopt a robust fitting procedure to obtain the best plane coefficients. In this embodiment, a robust fitting method known as random sample consensus (RANSAC) is employed in the plane fitting step (step 910), as will now be described.

Random sample consensus is a general technique for obtaining robust fits in a wide range of fitting problems. The main goal is to find a fit that does not contain the influence of any outliers in the data set. Generally, outliers are data points that cannot be described by the mathematical model of interest, namely that mathematical model which appears to describe most of the data points well. Any fit must describe a certain minimum number of data points. In the case of a plane in 3D space, three (X, Y, Z) points are required for model definition while a 2D line requires only two data points for model definition. The minimum number of data points is referred to as the minimum sample set (MSS). Given a model and a MSS, the distance from the model to each data point (X, Y, Z) can be computed. In the case of a plane, this distance is the orthogonal distance from the plane to each data point. By employing RANSAC, any data points that lie beyond some maximum distance T from the MSS are excluded. The RANSAC algorithm selects minimum sample sets at random and looks for the one which maximizes the number of inliers or data points within a distance tolerance T of the best model. This is known as the consensus set. The selection of minimum sample sets does not continue indefinitely, but concludes after a fixed number of trials or iterations, which are computed adaptively as the RANSAC algorithm proceeds. Once the consensus set has been identified, then a regular least-square fit to the inliers is performed.

Figure 43:
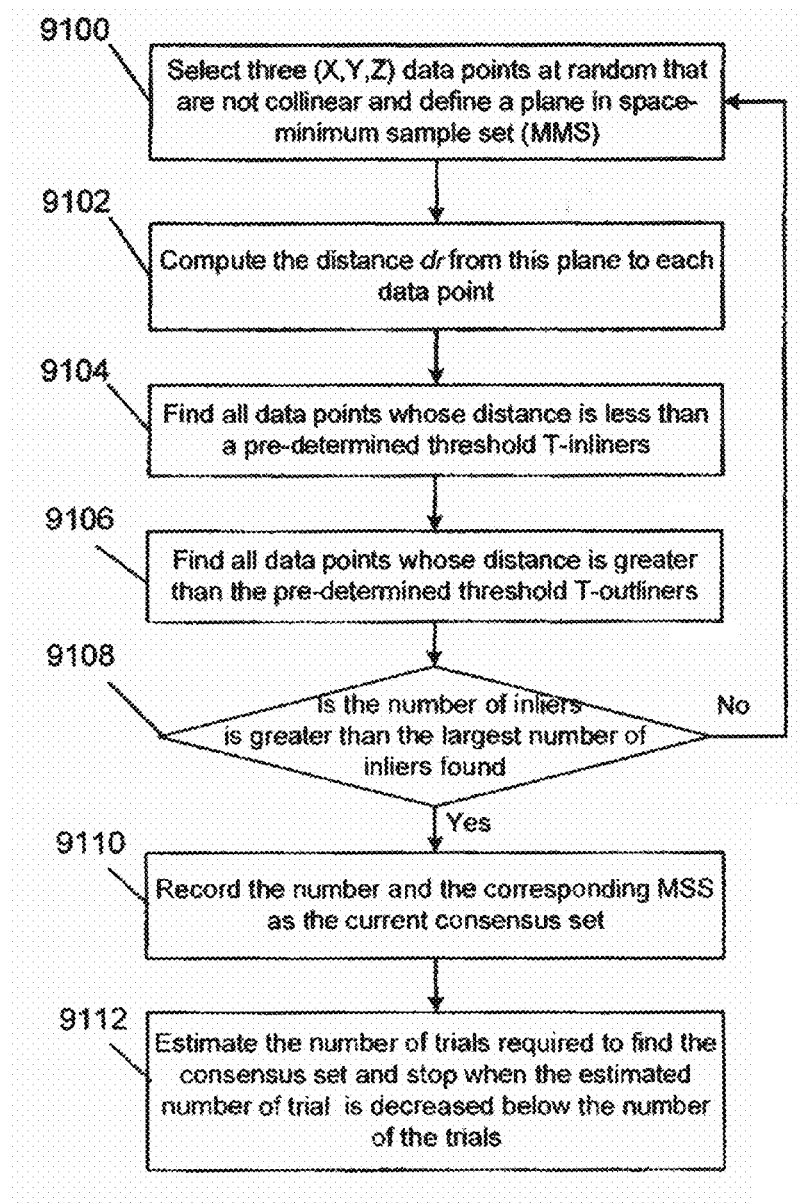
FIG. 43 is a flowchart of a random sample consensus fitting method.

The steps, for one trial or iteration, are discussed with reference to the flowchart shown in FIG. 43. First, three (X, Y, Z) data points at random that are not collinear are selected to define a plane in space (step 9100). This is the minimum sample set (MSS). The distance dr from this plane to each data point is then computed (step 9102). All data points whose distance is less than a defined threshold T are found thereby to determine the inliers (step 9104). All data points whose distance is greater than the defined threshold T are then found thereby to determine the outliers (step 9106). A check is then made to determine if the number of inliers is greater than the largest number of inliers found during any previous iteration (step 9108). If so, the number of inliers and the corresponding MSS are recorded as the current consensus set (step 9110). Otherwise, at step 9108 the process returns back to step 9100 to perform another trial or iteration. The algorithm then estimates the number of trials or iterations required to find the consensus set. The estimated number of trials to find the consensus set is based on the fraction of inliers found at a given iteration. If the estimated number of trails or iterations is less than the number of actual trials or iterations performed, the process stops (step 9112). At this point, the final consensus set, which include all inliers are ready for use in a least-square fit to compute the coefficients of the mathematical model of the plane. Otherwise, addition trials or iterations are performed.

An important point to appreciate about RANSAC is that it is non-deterministic, unlike regular least-squares. What this means in practice is that, for a given data set, slightly different results will be obtained if the RANSAC algorithm is run several times in succession. However, the final least-squares fit based on the inliers found by RANSAC should be very similar. This makes the method robust.

Rather than using a specific fixed distance threshold T, an automatic threshold selection may be employed in the light curtain alignment calculation. In this case, an appropriate value for the threshold T is chosen based on the input data set. In this embodiment, five passes are made through a given (X, Y, Z) data set, and each time three random non-collinear points are chosen to define a plane. For all of the points, the plane to point distances are found, and their average and standard deviations $\sigma$ are computed. This gives five values of $\sigma$, and the smallest of these values is chosen as the threshold T.

Figure 44:
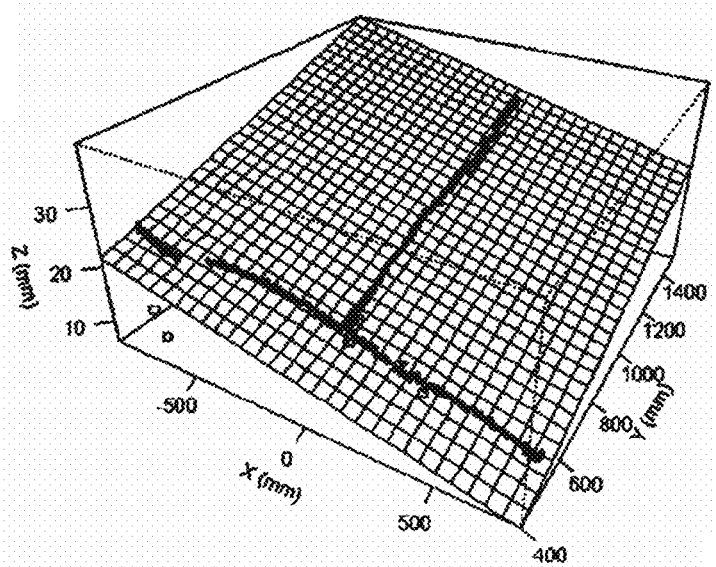
FIG. 44 shows a plane fit to the inliers of a set of "T" shape data points.

FIG. 44 shows an example of plane fitting to a set of data points using RANSAC. The consensus set comprises the inliers represented by "•", which are used during plane fitting, while the outliers represented by "☐" are excluded.

For the data points shown in FIG. 44, the RANSAC plane fit converged after five trials using an automatically selected threshold of T=0.052 (inches). The algorithm found 338 inliers and 71 outliers. The final least-squares plane coefficients are:
A=0.012553
B=−0.015068
C=0.865219
D=−0.50101 which results in a plane unit normal:
n=[0.014504 −0.017411, 0.999743]$^T$

This unit normal in turn leads to computing of the rotation matrix R:

$$R = \begin{bmatrix} 0.999895 & 0.000126283 & 0.0145042 \\ 0.000126283 & 0.999848 & -0.017411 \\ -0.0145042 & 0.017411 & 0.999743 \end{bmatrix}$$

from which rotation angles $\theta_x$=−0.00774 degree and $\theta_y$=−0.831057 degree are found. The corresponding rotation angle of the adjustment knobs are:
$N_{tilt}$=−0.6304
$N_{left\ roll}$=−3.2423
$N_{right\ roll}$=−4.4441

The adjustment knobs 190, 192 and 196 can then be rotated according to the calculated results to bring the plane of the light curtain LC generally parallel to the plane of the display surface.

Figure 45:
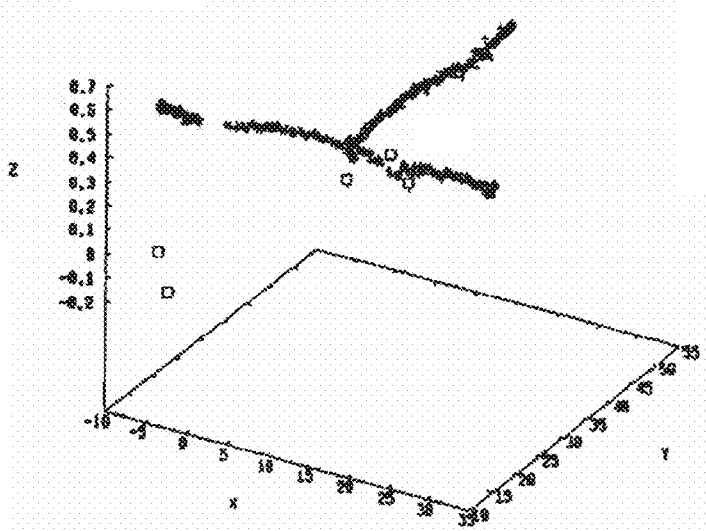
FIG. 45 shows the set of data being rotated to a plane generally parallel to the display surface.
Figure 46:
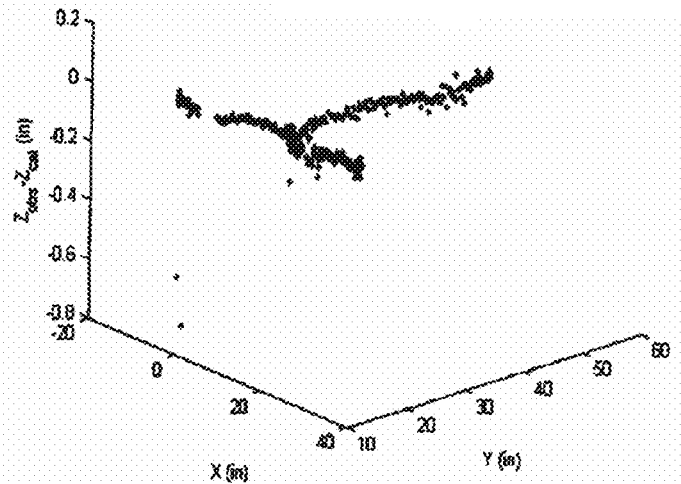
FIG. 46 shows the difference between the measured data and the computed Z-values on the plane after the plane is fit.

FIG. 45 shows the data points rotated to a position with the plane of the light curtain LC generally parallel to the plane of the display surface. FIG. 46 shows the difference in Z value between the initial measured data points and the computed data from the mathematical model of the fitted plane. The standard deviation in these residuals is 0.053 inches or 1.3 mm signifying that the plane effectively fits the set of measured data points within an acceptable tolerance.

Figure 47A:
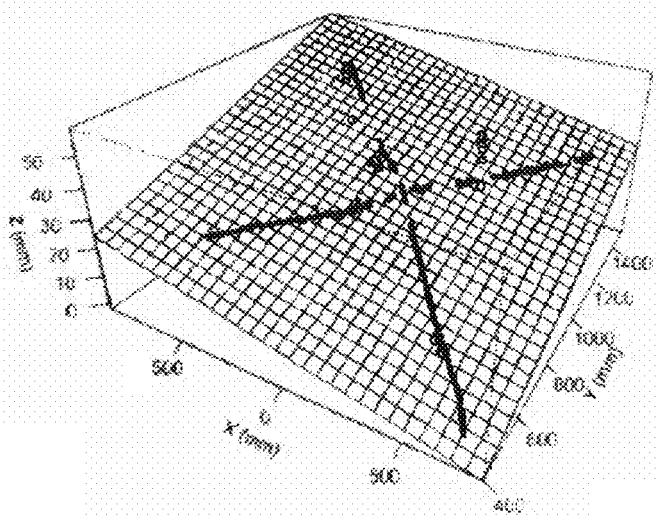
FIGS. 47a to 47c show further examples of plane fitting to different gauge tool movement patterns on the display surface to obtain data.
Figure 47B:
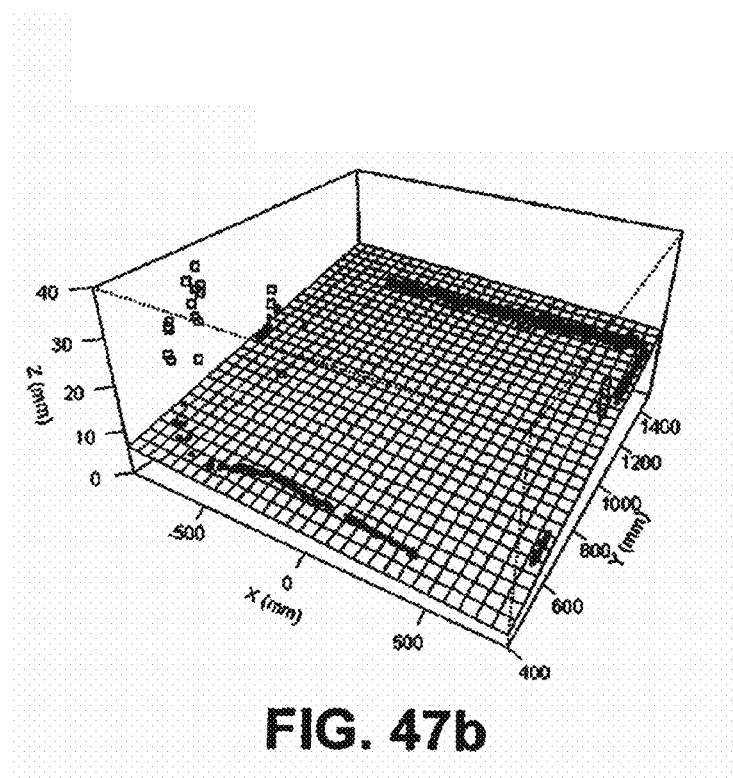
Figure 47C:
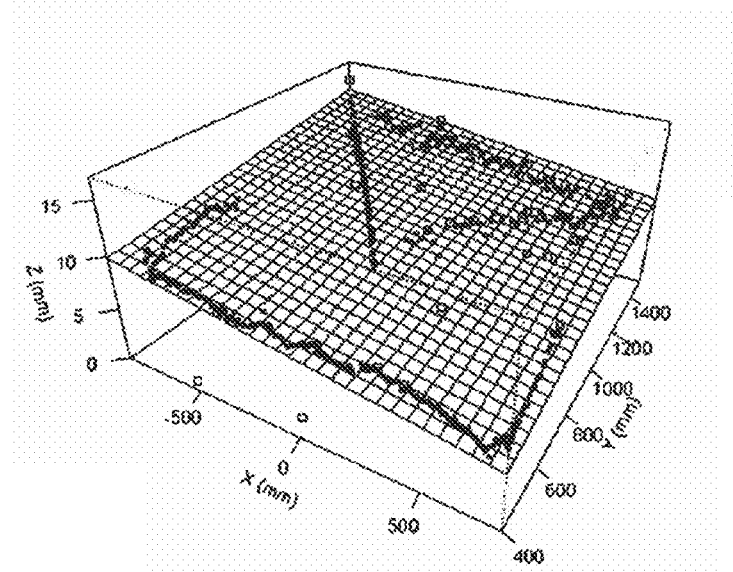

Several other data sets were also tested. FIGS. 47a to 47c show three other examples. FIG. 47a shows the plane fit to a set of data points generated in response to movement of the gauge tool across the display surface in an "x" pattern. FIG. 47b shows the plane fit to a set of data points generated in response to movement of the gauge tool along the edges of the display surface and FIG. 47c shows the plane fit to a set of data points generated in response to movement of the gauge tool across the display surface following a ⌐ pattern. As can been seen, the plane fits well to the inliers represented by "•" for all cases. The outliers represented by "□" are excluded.

It should be noted that since the RANSAC fitting is a robust method, the path that the gauge tool follows across the display surface in order to generate the set of data points typically will not affect the plane fitting result. This is to say that for a given light curtain orientation, the data points generated in response to any pattern of gauge tool movement across the display surface will generate a similar result. Tables 2 to 4 below show three examples. Four sets of data points generated as a result of different patterns of gauge tool movement across the display surface were obtained and tested for each of four light curtain orientations. In each table, the results for set 1 were computed from data points generated in response to movement of the gauge tool across the display surface following a "T" pattern. The results for set 2 were computed from data points generated in response to movement of the gauge tool across the display surface following a "x" pattern. The results of set 3 were computed from data points generated in response to movement of the gauge tool across the display surface following a "□" pattern. The results of set 4 were computed from data points generated in response to movement of the gauge tool across the display surface following a "⌐" pattern. Ideally, the angles $\theta_X$, $\theta_Y$ and the number of turns of the adjustment knobs are not affected by the gauge tool movement pattern that resulted in the generation of the data points. Namely, the values in the same column for the same parameter in the following tables should agree with each other for the same light curtain orientation.

TABLE 2

| Set | $\theta_X$ (deg) | $\theta_Y$ (deg) | Tilt turns | Left roll turns | Right roll turns |
|---|---|---|---|---|---|
| 1 | −0.6761 | −0.3126 | −0.4272 | 1.8056 | 1.3535 |
| 2 | −0.9524 | −0.3573 | −0.6018 | 3.9438 | 3.4271 |
| 3 | −0.7594 | −0.1253 | −0.4742 | 2.5717 | 2.3905 |
| 4 | −0.8898 | −0.1560 | −0.5622 | 4.0044 | 3.7788 |

TABLE 3

| Set | $\theta_X$ (deg) | $\theta_Y$ (deg) | Tilt turns | Left roll turns | Right roll turns |
|---|---|---|---|---|---|
| 1 | −1.1175 | 0.0706 | −0.7060 | 1.1006 | 1.2026 |
| 2 | −1.2158 | 0.2448 | −0.7682 | 2.5544 | 2.9084 |
| 3 | −1.1748 | 0.6581 | −0.7423 | 2.8535 | 3.8052 |
| 4 | −1.0882 | 0.8363 | −0.6875 | 2.5651 | 3.7744 |

TABLE 4

| Set | $\theta_X$ (deg) | $\theta_Y$ (deg) | Tilt turns | Left roll turns | Right roll turns |
|---|---|---|---|---|---|
| 1 | −1.7170 | −1.3125 | −1.0848 | −2.0381 | −3.9359 |
| 2 | −1.6596 | −1.5698 | −1.0485 | −2.6662 | −4.9359 |
| 3 | −1.8341 | −1.1424 | −1.1587 | −0.5863 | −2.2382 |
| 4 | −1.6950 | −1.2836 | −1.0709 | −1.7994 | −3.6554 |

In these tables, negative and positive numbers represent required turns of the adjustment knobs in different directions. For sets 1, the number of turns for the left and right roll is much smaller than that of the other sets, indicating perhaps that a "T" pattern movement for the gauge tool across the display surface is not the best pattern to use. The reason is that this simple pattern may not adequately represent the plane of the light curtain LC, especially when there is a reflection. Therefore, it is best to use those patterns that cover more of the region of interest.

In order to further test the RANSAC method, an independent implementation using Mobile Robot Planning Toolkit (MRPT) was employed to compare with the RANSAC method. The MRPT contains an example of 3D plane fitting that was adapted for use with the light curtain data set. The plane surface normal n was computed from least-squares fitting to the inliers and compared with the results computed using the RANSAC method. Table 5 below shows the results of the comparison.

TABLE 5

| Set | MRPT | RANSAC |
|---|---|---|
| 1 | [−8.13088e−05, −0.000205192, 1] | [−0.000514, 0.000151, 1.0] |
| 2 | [−0.00629618, −0.000768107, 1] | [−0.004804, −0.001647, 0.999987] |
| 3 | [−0.00136505, −0.0182697, 1] | [−0.002177, −0.016413, 0.999863] |
| 4 | [0.00354709, −0.0172904, 1] | [0.003328, −0.016776, 0.999854] |
| 5 | [0.0141567, −0.0163843, 1] | [0.014804, −0.016896, 0.999748] |
| 6 | [−0.00124424, −0.00138161, 1] | [−0.002758, −0.001385, 0.999995] |
| 7 | [−0.000706494, −0.000130609, 1] | [−0.000286, −0.000212, 1.0] |

As will be appreciated, the results from the implementation of RANSAC agree with those from the independent implementation of MRPT.

Figure 48A:
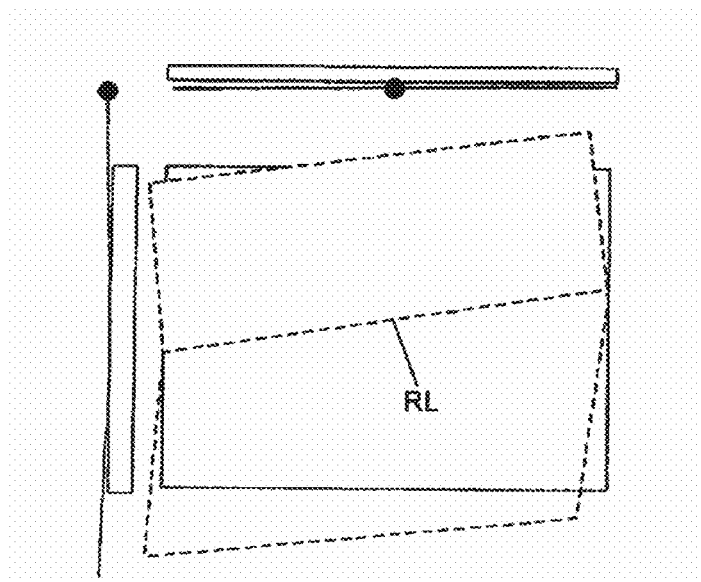
FIGS. 48a to 49d show various examples of light curtain positions including a reflection of the display surface.

If light curtain LC does not intersect the display surface, the straight-forward fit of a plane to the data set using RANSAC yields the target light curtain position. As a result, the geometric relationship between the target light curtain position and its current position can be readily converted into a sequence of adjustment knob rotations as mentioned above. However, in many cases, the light curtain intersects the display surface resulting in reflections of the light curtain from the display surface, either within the region of interest 106 or in an area surrounding the region of interest. Examples of some scenarios are shown in FIGS. 48*a* to 49*b*. The intersection line between the light curtain LC and the display surface resulting in a reflection line RL is shown in FIG. 48*a*. In this case, fitting a plane to the data points generated in response to movement of the gauge tool across the display surface when the reflection line RL exists may cause ambiguities.

For cases where the reflection line RL is present, an extended RANSAC plane fitting method is employed and generalized to account for observations in the reflection. If a reflection line RL is present, then the generated data points corresponding to the reflection line have Z<0. Equation (5) is rewritten and has the following condition:

$$Z = -\left(\frac{A}{C}\right)X - \left(\frac{B}{C}\right)Y - \frac{d}{C} < 0 \qquad (19)$$

In other words, knowing (A, B, C) allows a test to be performed. Moreover, finding all such points then allows the sign of Z to be changed and the normal RANSAC algorithm to be applied to the modified data. This process is known as "unfolding".

Figure 50:
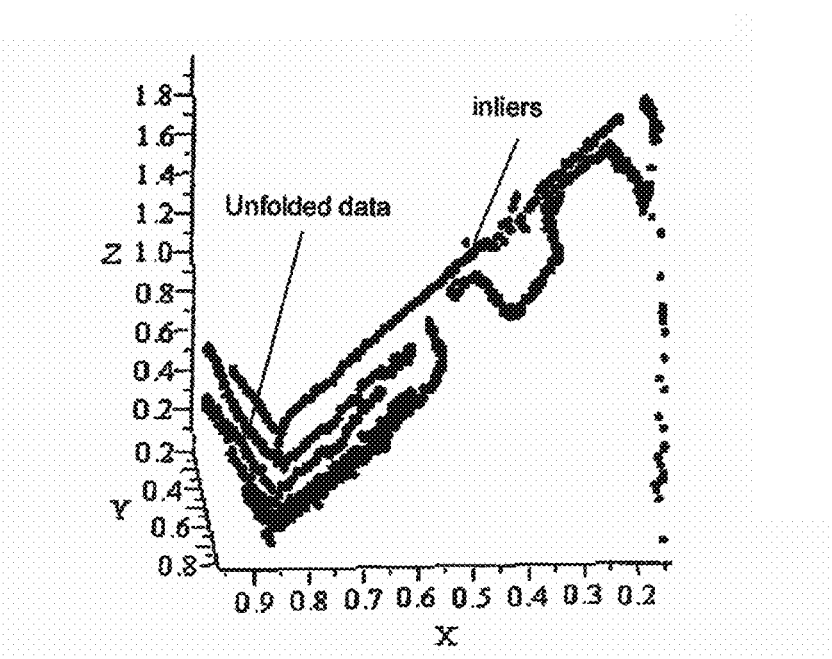
FIG. 50 is a plot showing a data set including reflections.
Figure 51:
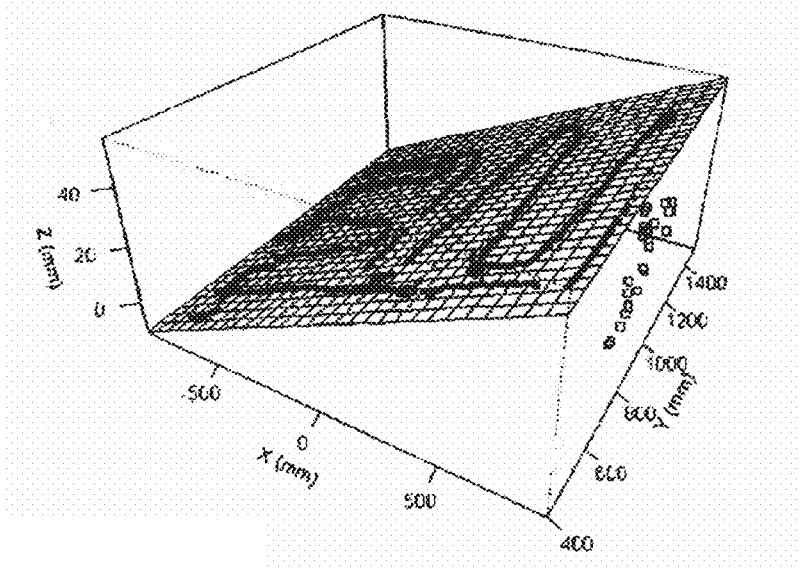
FIG. 51 is a plot showing the result of a RANSAC fit to the data set of FIG. 50.

FIG. 50 shows a set of data points generated in a situation where a reflection line RL is present. In this example, the data points to the left of the set have been unfolded and tested for inliers and outliers. After all inliers have been identified, the plane of light curtain LC is fit to the inliers. FIG. 51 shows the plane of the light curtain LC fit to the inliers that includes the unfolded data points.

At this step, the data points representing the reflection line RL are not known. Another possible solution of plane fitting is that the right part of the data set could be as result of the reflection line RL and unfolded, which would result in plane fitting to these data points. Therefore, it is important to know which plane represents the real light curtain plane, and not its reflection.

To differentiate the light curtain from its reflection, the following rules are considered.

Figure 48B:
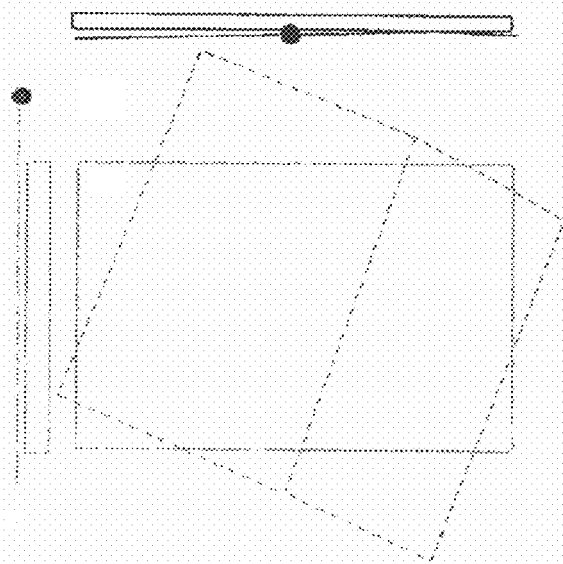
Figure 48C:
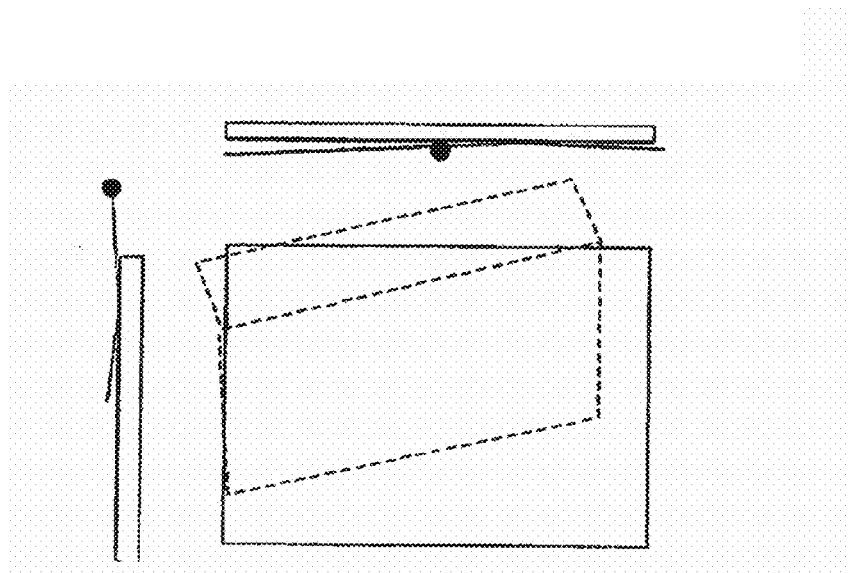

Firstly, if there are data points having Z-values that are positioned on the same side as the illumination assembly 150 relative to the reflection line RL, then these data points represent the light curtain LC and not its reflection. During implementation, the reflection line RL is calculated from the plane at Z=0. Then the locations of the data points and the illumination assembly 150 with respect to the reflection line RL will be known. This rule is illustrated in FIG. 48a to FIG. 48c, in which the data points in the upper or left area of the display surface are real light curtain data points and not reflections.

In some other cases, a whiteboard may be placed on the support surface that positions the illumination assembly 150 such that a portion of the light curtain may be behind the display surface. In this case, if there are inlier data points in the area of the display surface that a direct ray of the light curtain LC would be blocked by the display surface then it must be a reflection. This is illustrated by the cases shown in FIGS. 49a and 49b, where the illumination assembly 150 is behind the display surface but tilted out. The dotted line is the light curtain plane found from plane fitting and as can be seen, it passes the plane of Z=0. The indicated area at the top right corner of the display surface represents the area where the light curtain intersects the whiteboard (light curtain not visible). If there are data points in this area, they must be reflections. In the example shown, data points in the left area of the display surface are real light curtain data points.

Figure 49A:
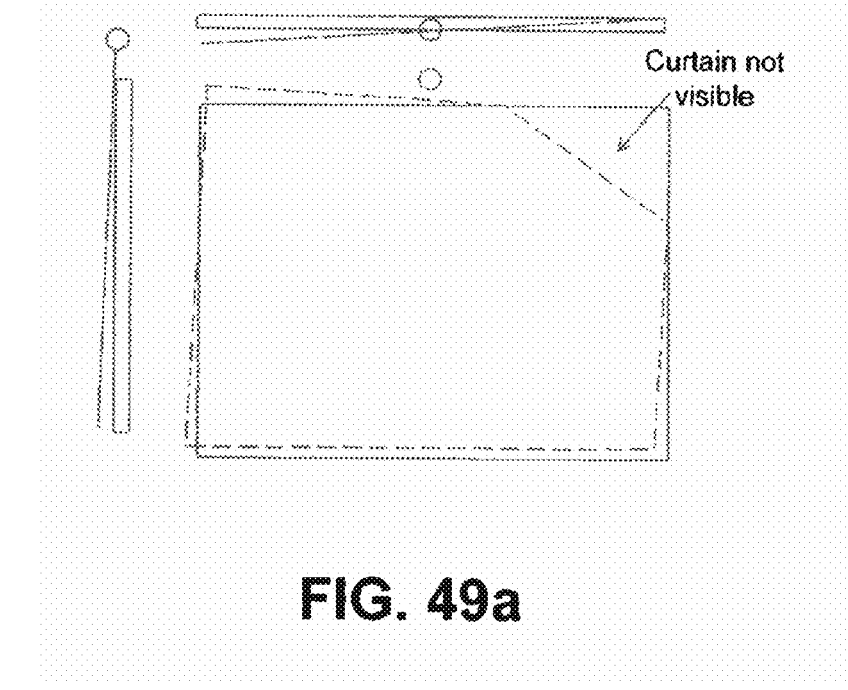
Figure 49B:
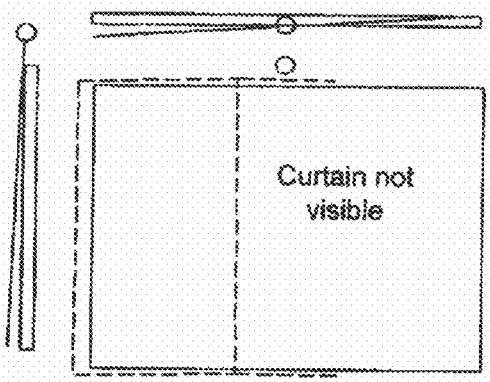
Figure 49C:
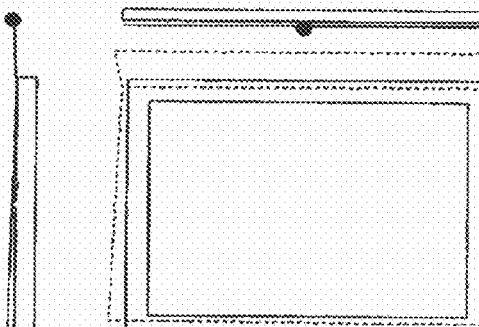
Figure 49D:
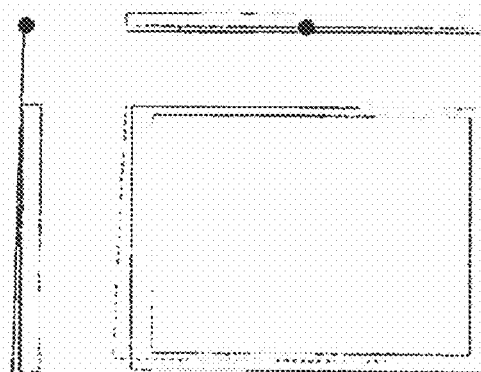

For some other cases, additional steps may need to be performed in order for the real light curtain to be detected. In these instances, the current light curtain plane position is recorded. The user is then instructed to make a "safe" rotation. Safe means the rotation applied to the adjustment knobs by the user causes the light curtain LC to rotate around the reflection line RL. The new light curtain plane is then determined and compared with the previous light curtain plane. The result of the comparison allows the user to be directed to a non-ambiguous case. This is illustrated in FIGS. 49c and 49d, where the light curtain LC is very nearly aligned, but is either in front of or behind the display surface and tilted in or out slightly.

Another approach to deal with the reflections is to describe the shape of the display surface directly rather than unfold it. The light curtain is described using a "folded plane" model which is fitted to the (X, Y, Z) data using a nonlinear least-squares technique. In the "folded plane model", the light curtain plane given by the following equation is fitted to the data points:

$$Z = |A \cdot X + B \cdot Y + C| \tag{20}$$

Figure 52:
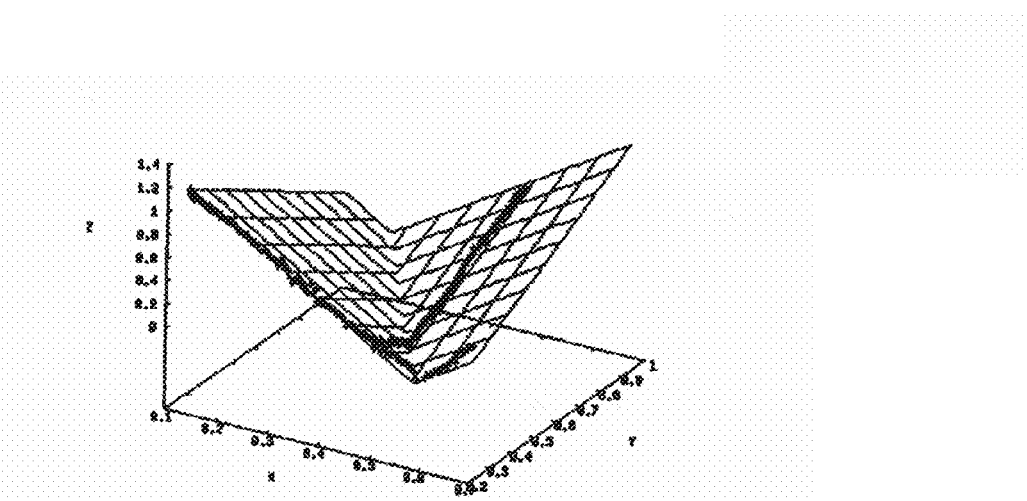
FIGS. 52 to 54 show examples of plane fitting to a data set having a reflection using a folded model.
Figure 53:
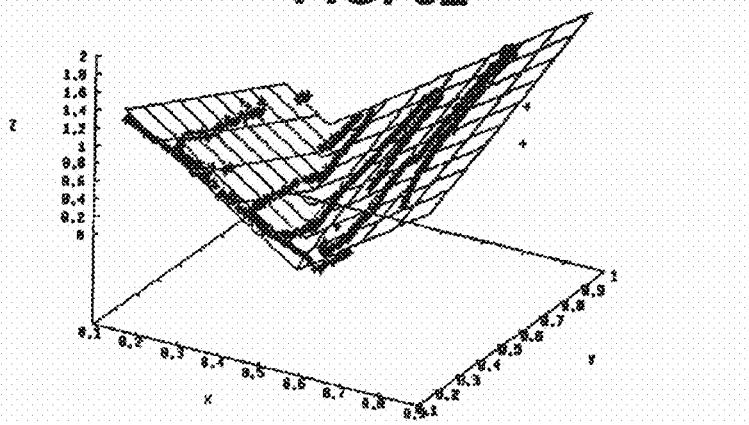
Figure 54:
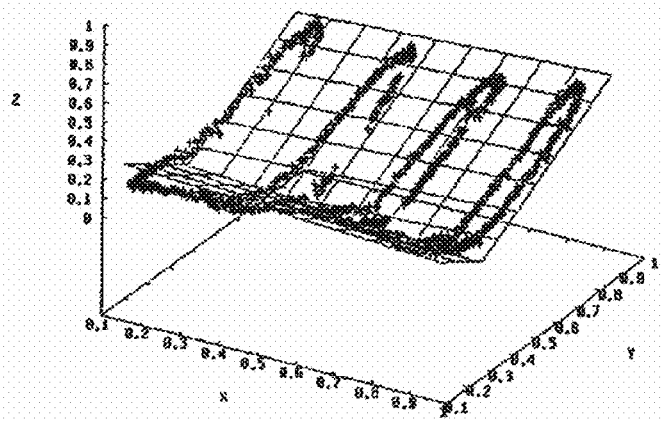

FIGS. 52 to 54 show examples of plane fitting using the folded model.

After the plane fitting, the light curtain position is identified using the rules discussed above. The number of turns of each adjustment knob to position the light curtain so that the light curtain plane is generally parallel to the plane of the display surface is calculated and the adjustment instructions are presented to the user on the display surface via an alignment wizard. The alignment procedure with reference to the alignment wizard is shown in FIGS. 55 to 62 as will now be described.

Figure 55:
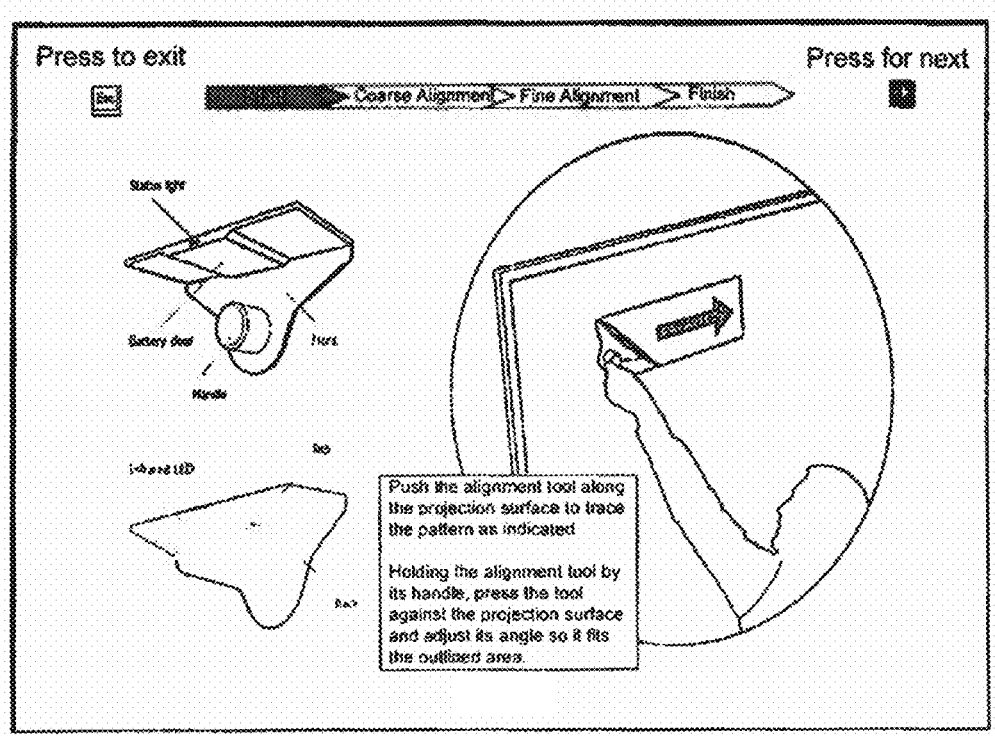
FIGS. 55 to 62 show user interfaces of an alignment wizard for the method of FIG. 41.

During operation, the user is prompted to follow graphical instructions of the alignment wizard presented on the display surface. When the alignment wizard starts, it requests the user to input the current settings of the adjustment knobs, such as the value shown in an indicator widow (not shown) below each adjustment knob or a demarcation thereon. Then, the alignment wizard graphically instructs the user how to hold the gauge tool and move it across the display surface as shown in FIG. 55. In particular, the alignment wizard instructs the user to press the gauge tool against the display surface, adjust its angle so that the light curtain will impinge on the top plate, and move the gauge tool across the display surface to trace the identified pattern. It also shows the desired orientation of the gauge tool and the path that the gauge tool should follow as it is moved across the display surface. Menus are also provided adjacent the top edge of the graphical interface to show the status of the alignment operation, in this figure "Start" status. As the alignment operation proceeds, the graphical interface moves to the next menu.

Figure 56:
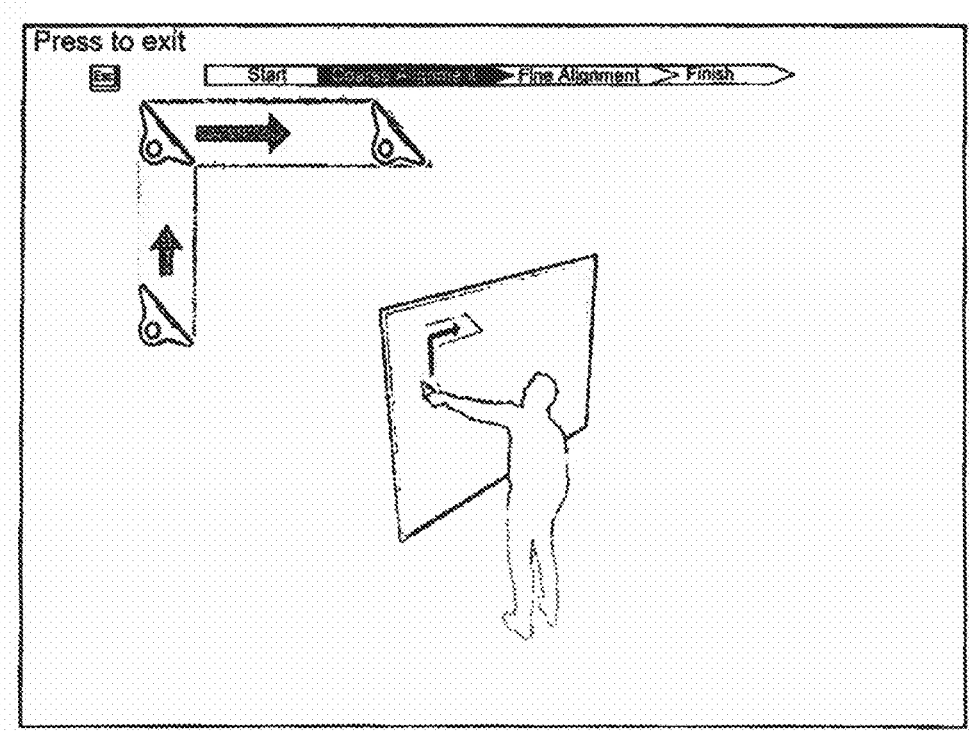

FIG. 56 shows the next step in the alignment operation, namely the coarse alignment procedure. At this step, the alignment wizard instructs the user to place the gauge tool adjacent the upper left corner of the display surface and to move the gauge tool following the indicated path and orientation. As the gauge tool is moved along the path, data points representing reflections of the light curtain LC are obtained in the manner described above. If the resulting data points are valid, the path to be traced by the gauge tool that is displayed by the alignment wizard changes to a different color, such as green, to indicate that the data points have been accepted. However, if the path to be traced that is displayed by the alignment wizard does not change color, the generated data points are deemed unsatisfactory. In this case, the user is prompted to repeat the tracing. Once the path has changed color, the alignment wizard automatically displays the next instruction.

Figure 57:
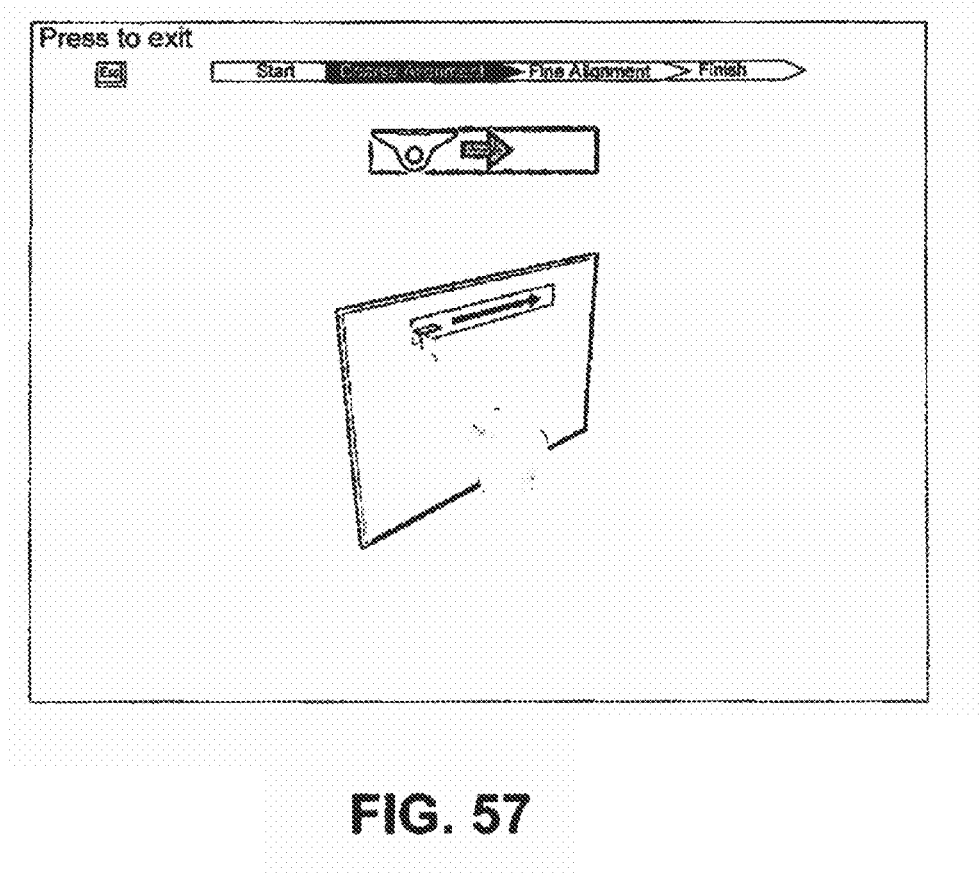
Figure 58:
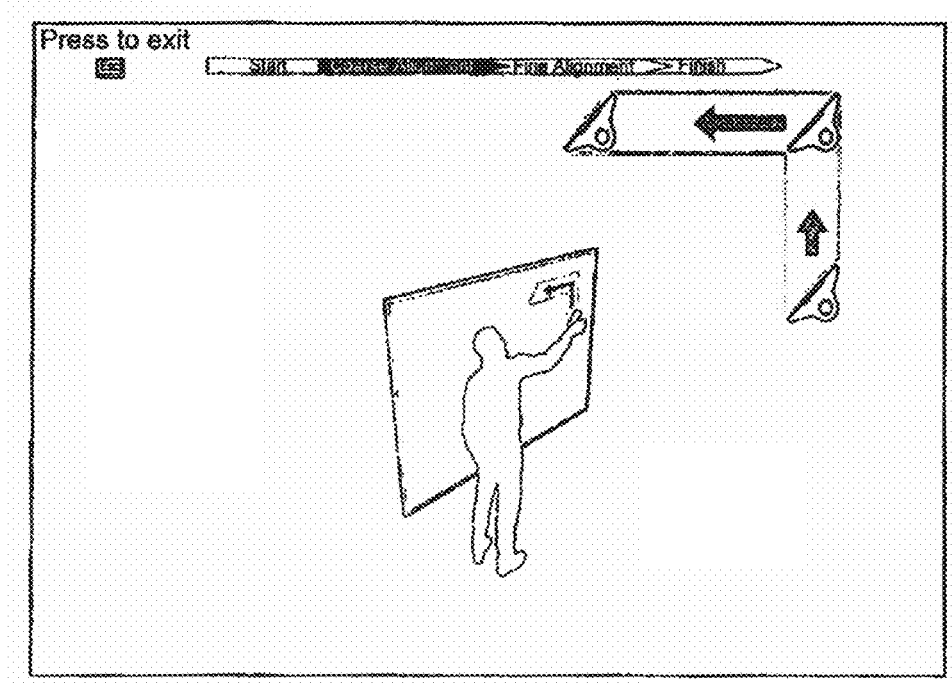
Figure 59:
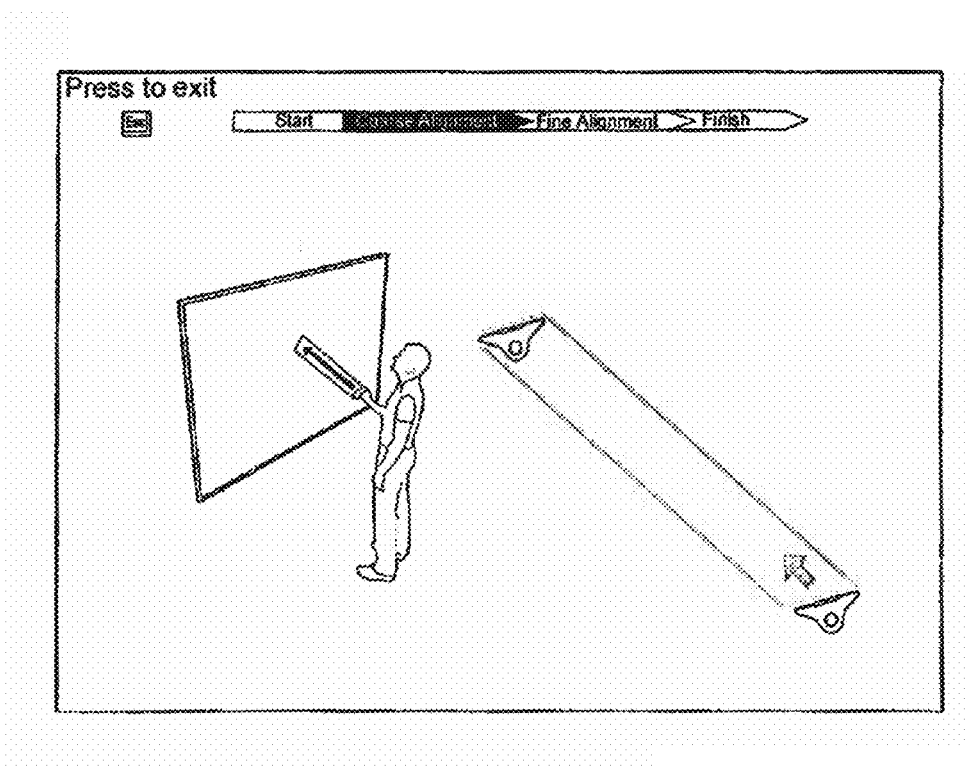
Figure 60:
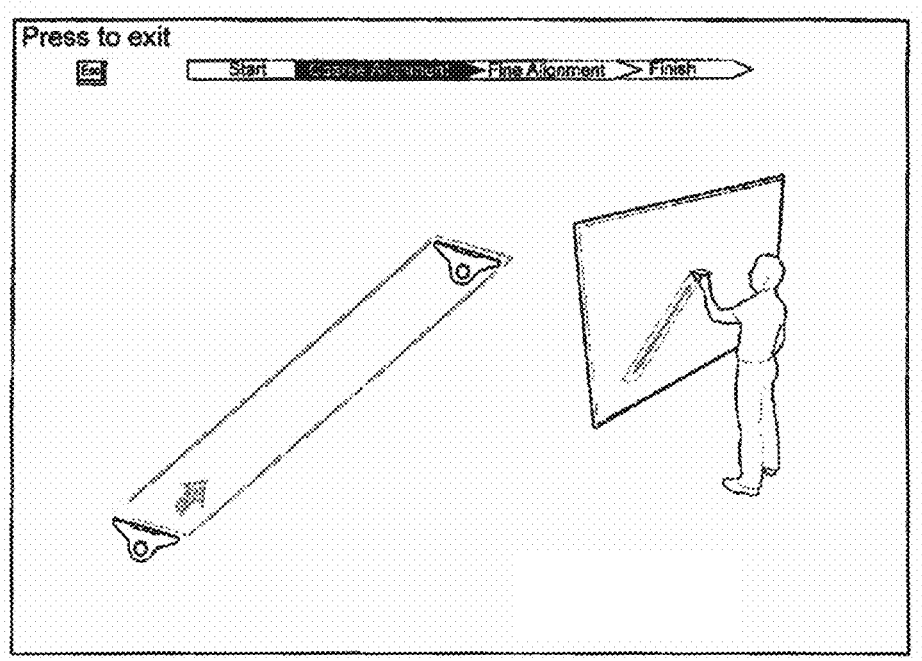
Figure 61:
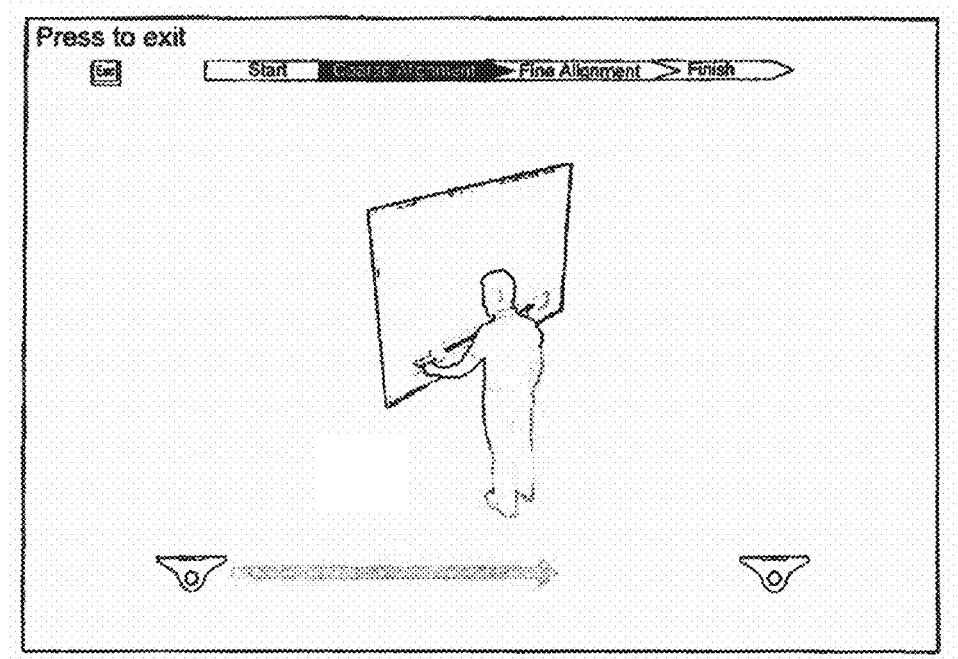
Figure 62:
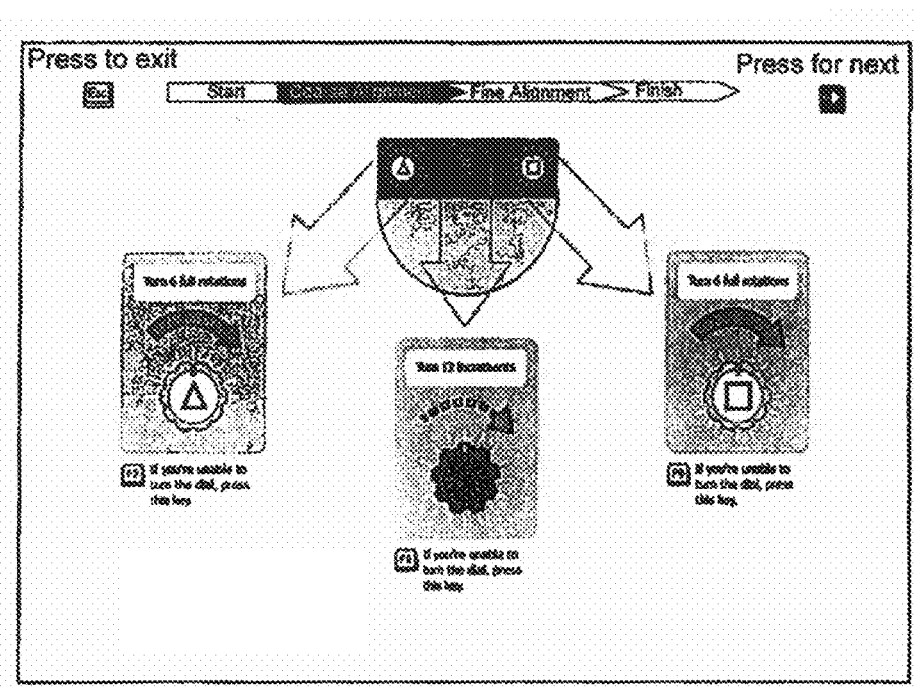

The next step shown in FIG. 57 instructs the user to trace a path across the display surface using the gauge tool that extends along the top edge of the display surface with the top plate of the gauge tool facing straight up. Then, the next step shown in FIG. 58 instructs the user to trace a path across the display surface using the gauge tool following the upper right corner of the display surface while tilting the gauge tool so that the top plate thereof faces the illumination assembly 150. After that, the next steps shown in FIGS. 59 and 60 instruct the user to trace a path across the display surface using the gauge tool following a diagonal line across the display surface from bottom right to top left followed by a diagonal line from bottom left to top right. The last step shown in FIG. 61 instructs the user to trace a path across the display surface using the gauge tool following the bottom edge of the display surface. Once the data points generated in response to gauge tool movement along all the paths have been accepted, the data points are processed as described above. The number of turns of each adjustment knob is then calculated and the alignment wizard then instructs the user to rotate each of the three adjustment knobs a certain amount as shown in FIG. 62, and indicates when this has been done. There is also an instruction in case an adjustment knob is not able to turn in the amount indicated allowing the adjustment knob rotations to be reset by pressing a hot key. After each adjustment knob is rotated according to the instruction, the light curtain LC will move towards its desired orientation parallel to the display surface. The alignment steps may be repeated to achieve a fine adjustment. It will be appreciated by those skilled in the art that the disclosed alignment wizard is exemplary. Other user interfaces and the gauge tool paths may be employed.

Figure 63:
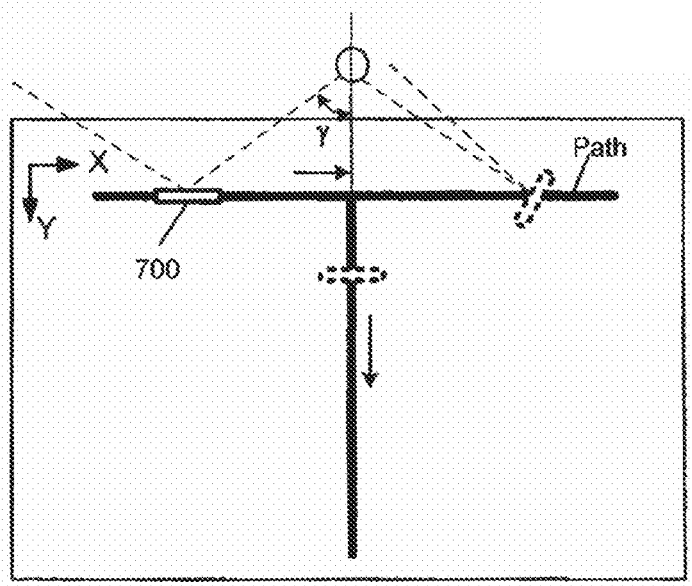
FIG. 63 is a schematic front view of the interactive input system of FIG. 1 showing the gauge tool placed at different locations with different orientations.

As discussed above, the measured data points are obtained by moving the gauge tool 700 across the display surface along predetermined paths following certain patterns. Examples of the disclosed patterns include a "T" pattern, an "x" pattern, a "☐" pattern and a "ℤ" pattern. Other patterns can of course be employed. When the gauge tool is at certain locations, such as at the upper left corner of the display surface as shown in FIG. 63, the reflected light from the light curtain LC impinging thereon is significantly off the vertical and the view of the imaging module is significantly off the vertical. Therefore, the direct reflection and the peak of the lambertian distributed diffuse reflection from the top plate of the gauge tool points away from the imaging module and is not easily visible by the imaging module. To address this problem, the user is instructed to orient the gauge tool so that the top plate is turned to face the light curtain/imaging module. However, since the desired angle of the top plate varies as the gauge tool is moved, positioning of the gauge tool during movement can be challenging.

Figure 64:
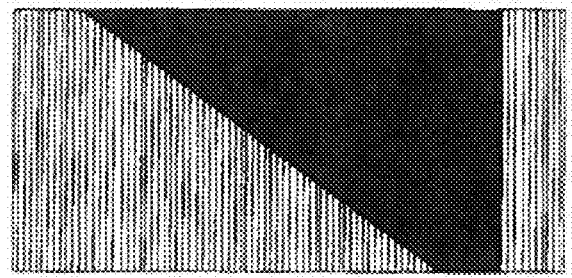
FIG. 64 is a top plan view of another embodiment of a gauge tool.
Figure 65:
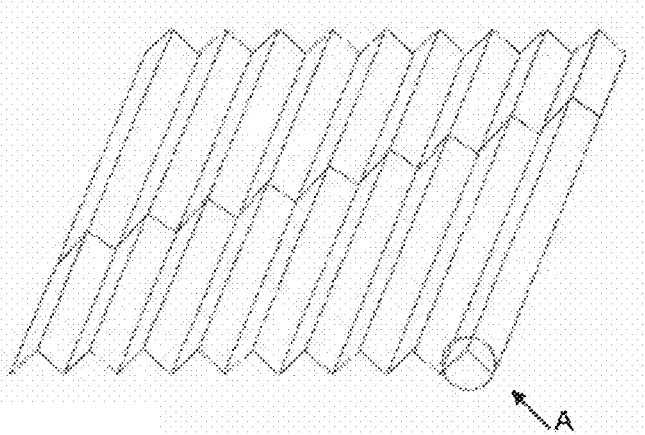
FIG. 65 is a perspective view of a surface portion of the gauge tool of FIG. 64.
Figure 66:
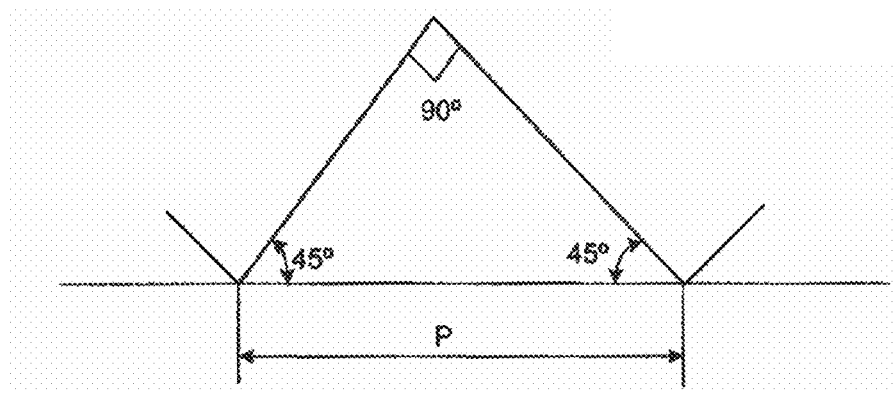
FIG. 66 is an enlarged side view of the surface portion of FIG. 65 taken in the direction of arrow A in FIG. 65.

To solve this problem, the upper surface of the top plate of the gauge tool corresponding to the white part of the reference mark may be designed to have a sawtooth profile. FIGS. 64 to 66 show a gauge tool employing such a top plate configuration. As can be seen in FIGS. 64 and 65, the white part surface is folded while the black part can be kept flat or folded because it does not reflect light. FIG. 66 shows the geometry of each fold. The top angle between two sides is 90°. Each side has a 45° angle with respect to the horizontal plane of the top plate. The pitch P of each fold is in the range of from about 0.7 to about 2 mm. With this design, light directly reflected by the sides of the surface and the peak of the lambertian distributed diffuse reflection from neighbor sides are all directed to the imaging module. Therefore, the gauge tool can effectively reflect light to the imaging module 124 when the top plate is horizontal and the gauge tool is placed at any location on the display surface.

Figure 67:
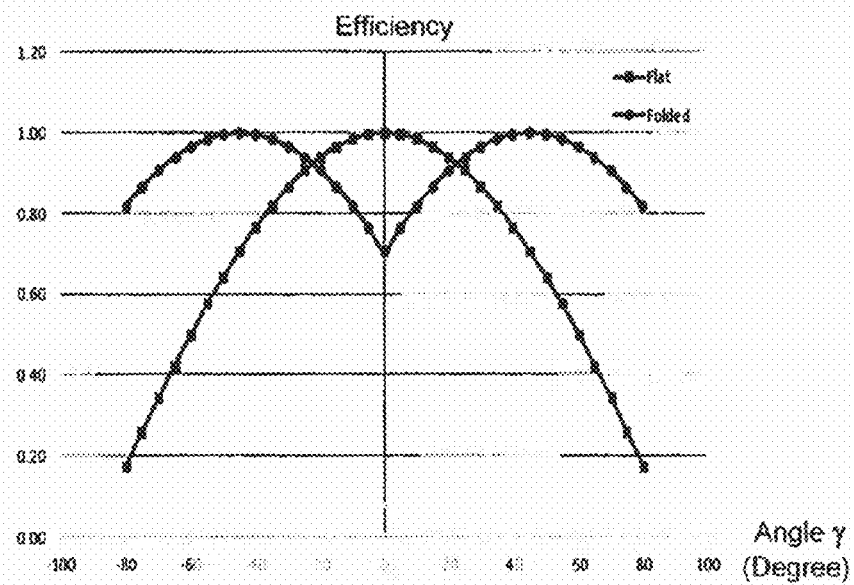
FIG. 67 is plot showing the reflection efficiency of the gauge tool of FIG. 64.

FIG. 67 is a plot showing efficiency of light reflected to the imaging module 124 by the folded surface compared with that of a normal gauge tool. The horizontal axis γ is the angle of the gauge tool viewed from the imaging module with respect to the vertical direction of the display surface, as shown in FIG. 63. The data of the plot is calculated when the gauge tool is moved horizontally along a line close to the top edge of the display surface, which is the worst case. As can be seen in FIG. 67, with the flat surface, although the efficiency within ±20 degrees around the central vertical line of the display surface is very high—over 80%, it drops quickly once the angle is over ±20 degrees. On the contrary, with the folded surface, the efficiency of the central area within ±20 degrees is relatively low compared with the flat surface. However, the efficiency is still higher than 70% and thus, enough to provide proper measurement. On the other hand, the area between 20 and 80 degrees, which covers most areas of the display surface, has efficiency over 80%. It is much higher than that of the flat top plate surface. The overall performance of the folded top plate surface of the gauge tool is better.

Figure 68:
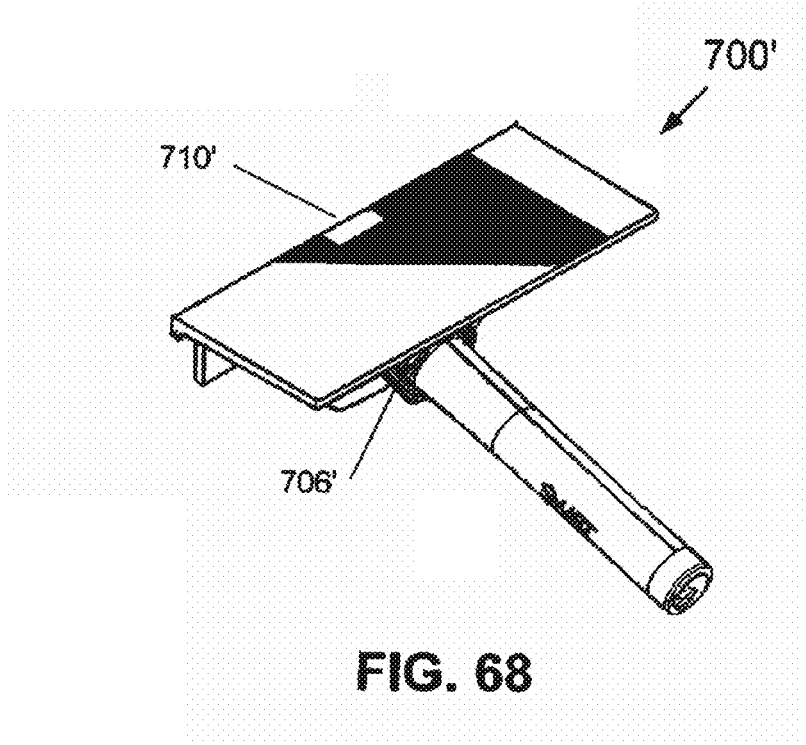
FIG. 68 is a perspective view of yet another embodiment of a gauge tool.

FIG. 68 shows another embodiment of a gauge tool 700' that is able to couple with an active pen tool. The handle 706' has a hole that is complementary in shape to the pen tool. When the gauge tool is not in use, it can be separated from the pen tool and stored in a safe place. When the gauge tool is required to perform alignment, the pen tool is inserted into the hole in handle 706' allowing the user to manipulate the gauge tool. The tip of the pen tool is positioned behind the front plate of the gauge tool and bears against the front plate when the gauge tool is brought into contact with the display surface resulting in the tip of the active pen tool illuminating. The illumination emitted from the pen tool passes through a widow 710' on the top plate of the gauge tool and appears in image frames captured by the imaging module, indicating the contact status of the gauge tool. The advantage of this design is that the gauge tool itself is very simple obviating the need for any power source or electronics.

Figure 69:
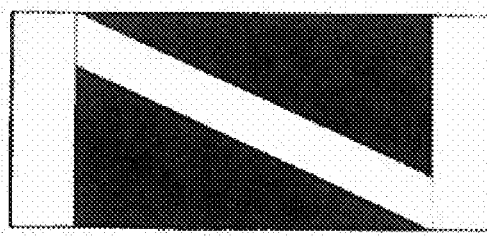
FIG. 69 shows an alternative top surface pattern design for the gauge tool.

In addition to the gauge tool, the design of the reference mark on the top surface of the gauge tool is not limited to the embodiments discussed above. FIG. 69 shows another example of the reference mark, which has two white parts at its opposite ends connected by a white diagonal line in the middle. Of course, lines having other shapes may be used.

Figure 70:
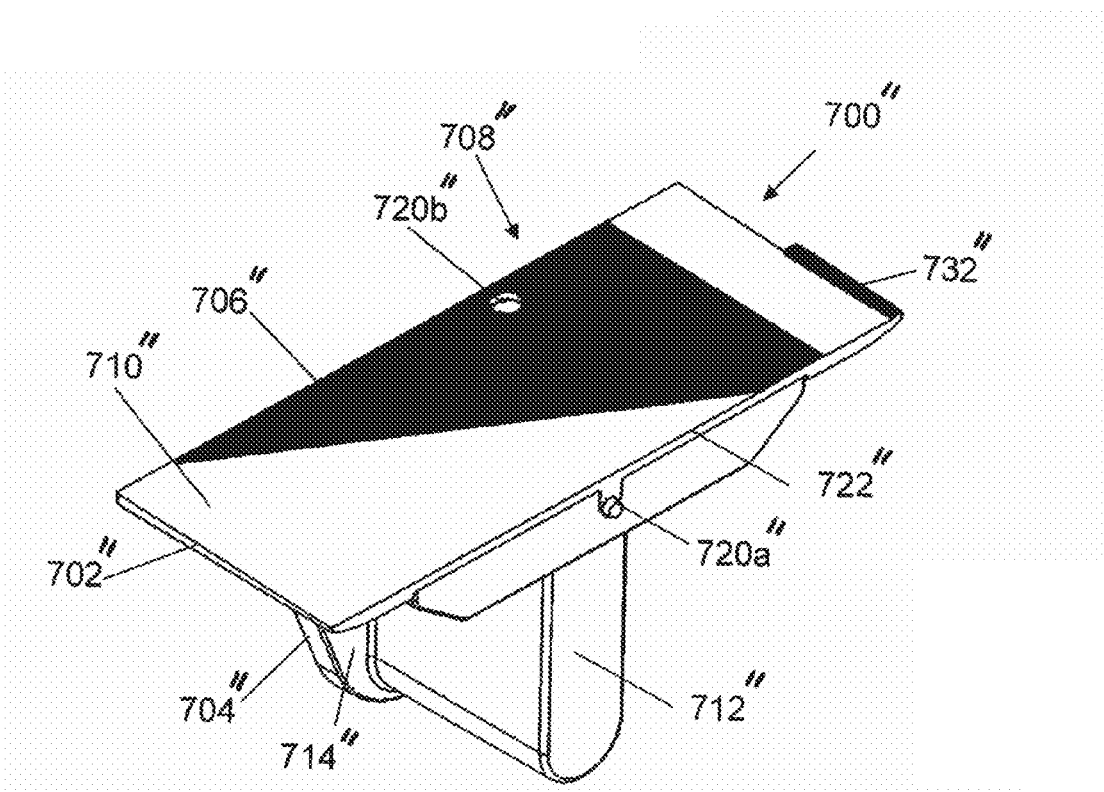
FIG. 70 is a top perspective view of yet another embodiment of a gauge tool.
Figure 71:
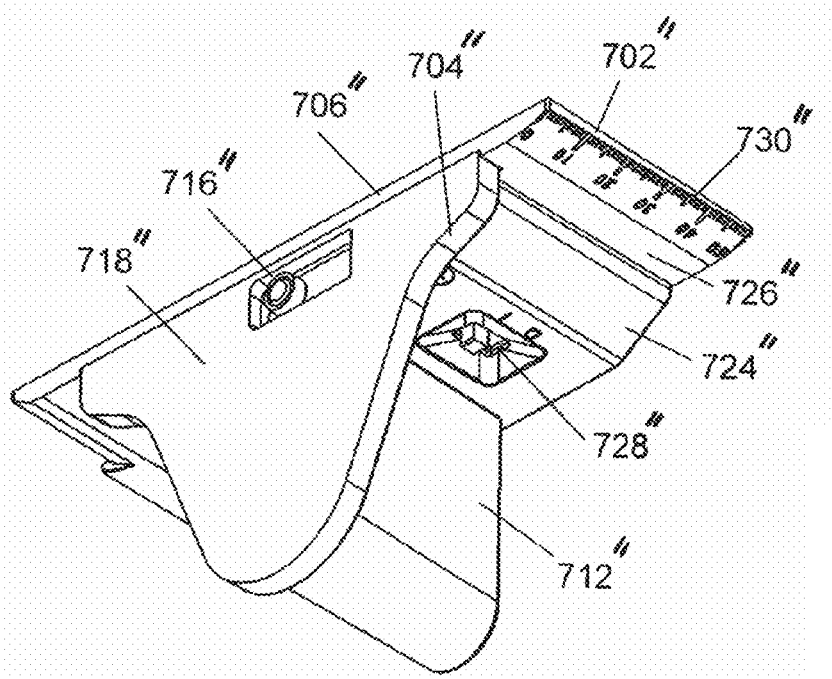
FIG. 71 is a bottom perspective view of the gauge tool of FIG. 70.

Turning now to FIGS. 70 and 71, yet another gauge tool 700" is shown. In this embodiment, the gauge tool 700" comprises a top plate 702" and a front plate 704" perpendicularly extending downwardly from the front edge 706" of the top plate 702". A reference mark 708" that is high-contrast under infrared (IR) light, e.g. a black and white mark, is printed, painted or otherwise provided on the top surface 710" of the top plate. A handle 712" protrudes from the back surface 714" of the front plate 704" to facilitate grasping by a user. A contact switch 716" is located on the front surface 718" of the front plate 704", which closes when the front surface 718" of the front plate 704" is brought into contact with the display surface. The contact switch 716" controls a first indicator 720a" in the form of an illumination source such as a green LED, installed on the back side 722" of the top plate 702" for indicating to the user whether or not the front surface 718" of the gauge tool 700" is in contact with the display surface. The contact switch 716" also controls a second indicator 720b" in the form of an illumination source, such as an IR LED installed on the top surface 710" of the top plate 702" near the front edge 706" for indicating to the interactive input system whether or not the front surface 718" of the gauge tool 700" is in the contact with the display surface. The gauge tool 700" further comprises a bottom cover 724" fastened to the undersurface 726" of the top plate 702" such that a cavity (not shown) is formed between the undersurface 726" and the bottom cover 724". A battery and an electronic circuit board (not shown) supporting the operation of the contact switch 716" and the indicators 720a" and 720b" is accommodated in the cavity. A power switch 728" is provided on the bottom cover 724" that is actuable between positions to control the supply of power to the electronic circuit board. When the gauge tool 700" is ready to use, the user can push the power switch 728" to a first position to turn the power on. When the gauge tool 700" is not in use, the user can push the power switch 728" to another position to turn power off. In this way, power consumption when the gauge tool 700" is not in use is avoided. A ruler 730" is provided on the undersurface 726" of the top plate 702" along one side edge for convenience. Optionally, part of the top plate 702" can be extended such that a side bar 732" is formed. A black mark, is printed, painted or otherwise provided on the side bar 732" as a reference.

In general, regardless of configuration, the gauge tool should have at least one measurable parameter whose value is determined by the distance between the light curtain LC and the display surface. The interactive input system as a result is able to detect the gauge tool and measure the at least one measurable parameter at different locations within the region of interest 106. The light curtain LC is determined to be aligned with the display surface when the at least one measurable parameter maintains a constant value at different gauge tool positions within the region of interest 106. As described above, the reference mark on the gauge tool may be configured such that the value of the at least one measurable parameter is a predefined monotonic function of the distance between the light curtain LC and the display surface. The predefined monotonic function may be a continuous function (such as for example a linear function, a polynomial function, an exponential function or the like), a discrete function (e.g., a step function or the like), or a combination of continuous and discrete functions.

In the examples described above, the plane of the display surface is assumed to be planar or generally planar. As will be appreciated, in many instances, the display surface may be warped or curved. In the previous embodiment, the surface model of the plane was expressed by Equation 7. In order to accommodate a warped or curved display surface, a second-order surface model can be used that expresses the plane according to the expression:

$$Z = \alpha_0 + \alpha_1 \cdot X + \alpha_2 \cdot Y + \alpha_3 \cdot X \cdot Y + \alpha_4 \cdot X_2 + \alpha_5 \cdot Y_2 \qquad (21)$$

Figure 72:
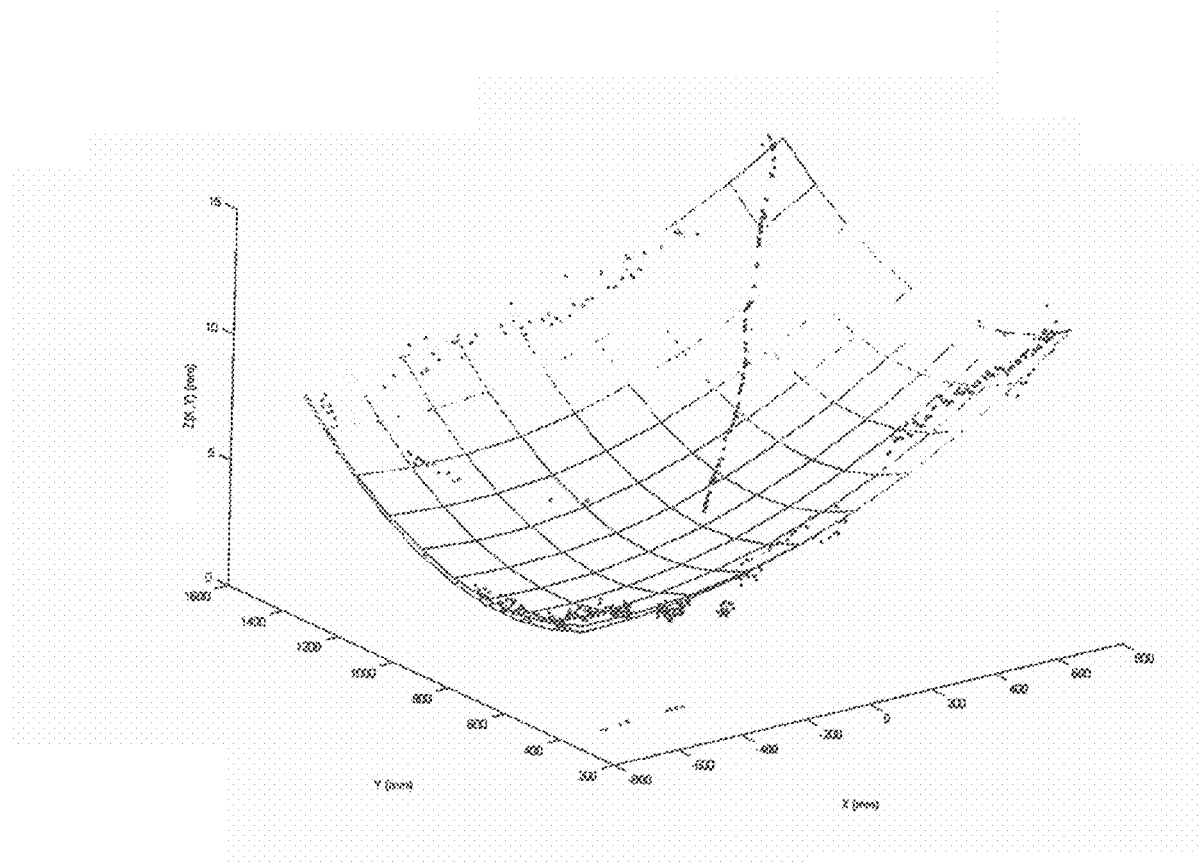
FIG. 72 shows an M-estimate fit to a light curtain data set.

The coefficients $\alpha_0$ to $\alpha_5$ are found by fitting the second-order surface model to the observed (X, Y, Z) data points. A robust M-estimate fitting approach such as that described in the publication entitled "Numeral Recipes" authored by Press et al., Section 15.7.2, Third edition, Cambridge University Press 2008 or in the publication entitled "The Geometry of Multiple Images" authored by Faugeras et al., Section 6.4.1, MIT Press, 2001, is employed. FIG. 72 shows an example of an M-estimate fit to the light curtain LC data set. Two surfaces are shown, with the lower surface being a least-squares fit and the upper surface being the M-estimate result. As will be appreciated, the M-estimate minimizes the effects of outliers in the data.

Figure 73:
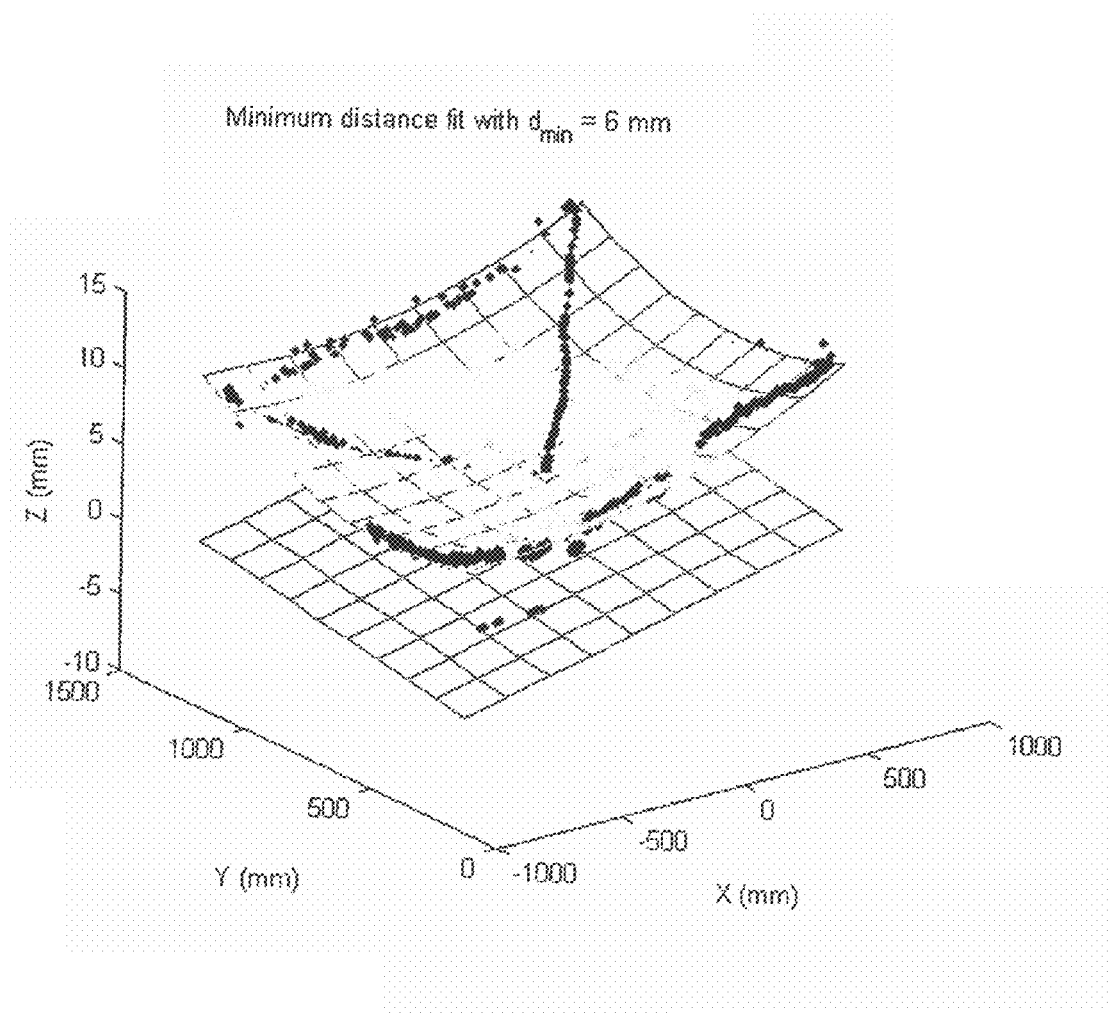
FIG. 73 shows a minimum light curtain distance plane fit.

With the description of the display surface shape available, the light curtain LC is adjusted so that the plane of the light curtain is positioned relative to the warped or curved display surface in an optimal sense. In particular, adjustment of the light curtain LC is constrained so that the plane of the light curtain approaches only to within some minimum distance of the display surface. This ensures that the light curtain LC does not intersect the display surface. An example of such a minimum light curtain distance plane fit is shown in FIG. 73. The minimum light curtain plane distance constraint produces a nonlinear fitting problem which may be solved using standard techniques.

Figure 74:
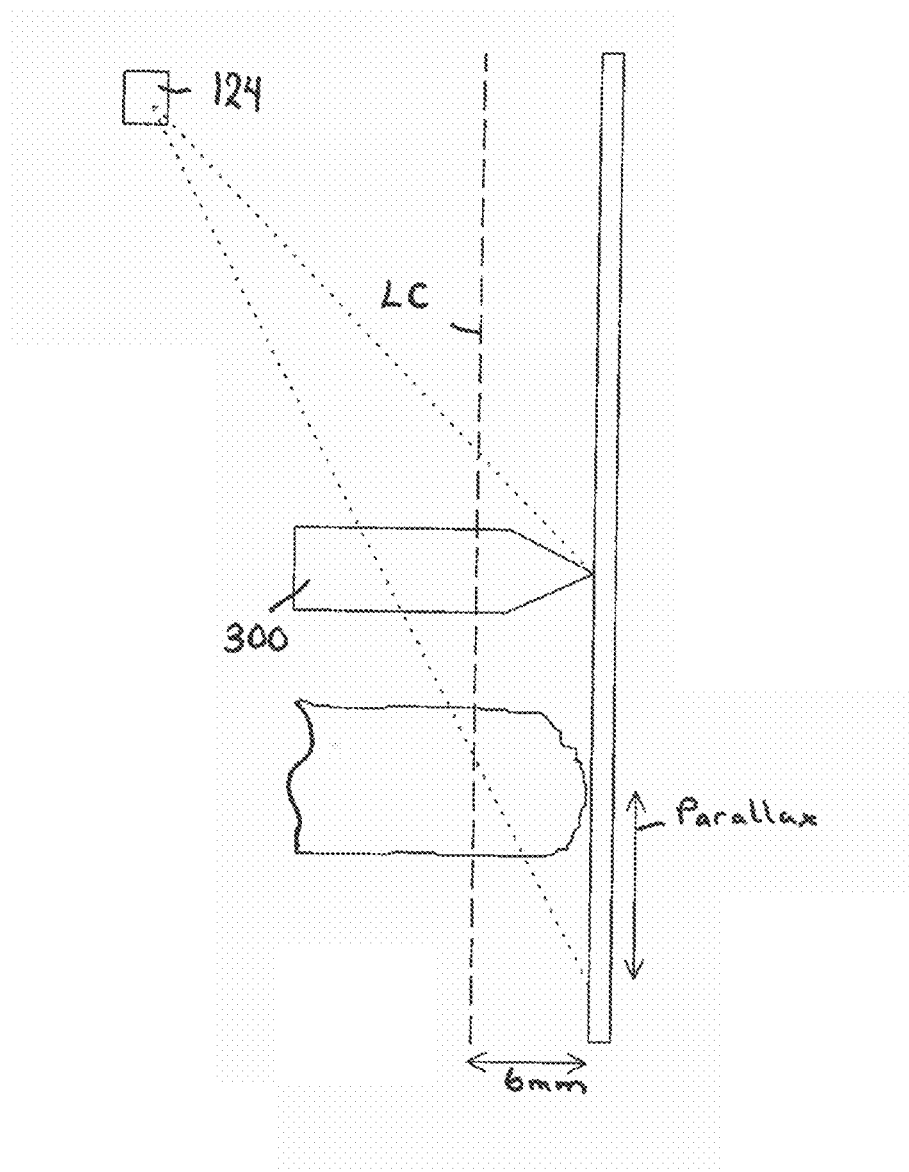
FIG. 74 shows an active pen tool and finger in contact with the display surface and showing a parallax effect.

If desired, a finger orientation procedure may also be employed. FIG. 74 shows the light curtain LC spaced from the display surface with a finger F and an active pen tool 300 in contact with the display surface and intersecting the light curtain. As will be appreciated, the distance between the light curtain and the display surface introduces a parallax effect as will now be explained. When the active pen tool 300 is brought into contact with the display surface and its tip illuminates, the emitted light received by the imaging module 124 originates from the tip of the active pen tool 300, which is positioned at the display surface. When a user touches the display surface with a finger, the light reflected by the finger that is seen by the imaging module 124 originates from the intersection of the finger and the light curtain LC, which is spaced from the display surface. To address this parallax effect, the parallax field can be mapped over the display surface using a plurality of calculated active pen positions and finger positions.

Figure 75:
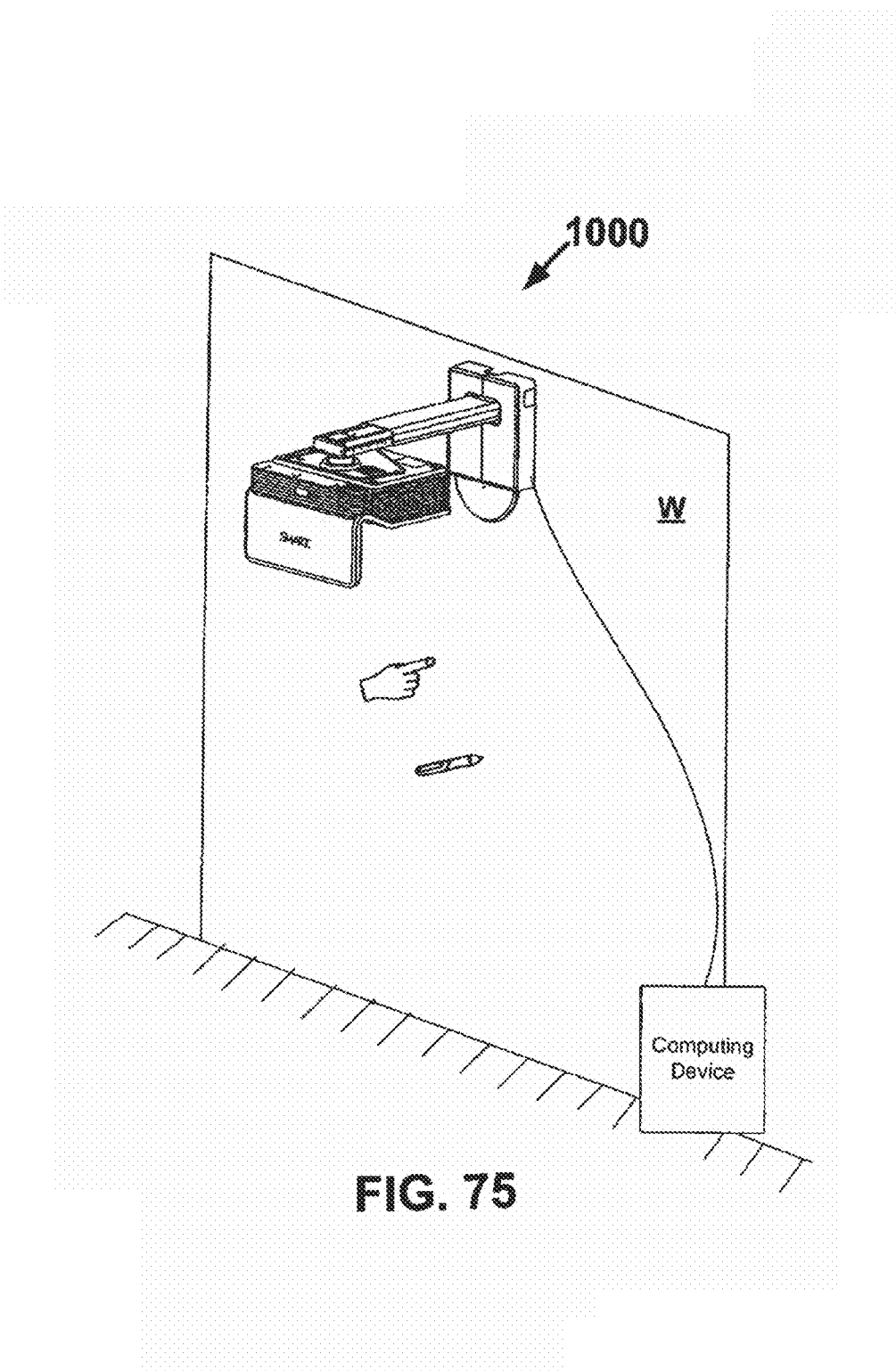
FIG. 75 is yet another embodiment of an interactive input system.

FIG. 75 shows another embodiment of an interactive input system 1000 very similar to that shown in FIG. 1. In this embodiment, a short throw projector, such as that sold by SMART Technologies ULC, under the name "SMART Light-Raise™ 60wi" is used to project images on the display surface.

Although adjustment knobs are used to adjust the position of the light curtain LC, those skilled in the art will appreciate that other types of mechanical or electrical mechanisms may be used. For example, in another embodiment each adjustment knob may be coupled to a motor to automatically rotate the adjustment knobs to align the plane of the light curtain LC with the plane of the display surface once the desired light curtain position is determined.

In the above embodiments, the region of interest and the display surface are described as being a portion of the support surface. If desired, the region of interest and the display surface can be bounded by a frame secured to the support surface or otherwise supported or suspended in a generally upright manner. The frame may comprise a tray to hold one or more active or passive pen tools. Alternatively, the region of interest and the display surface may be defined by a whiteboard or other suitable surface secured to the support surface.

Although embodiments have been described, those of skill in the art will appreciate that variations and modifications may be made without departing from the scope thereof as defined by the appended claims.

What is claimed is:

1. A method for adjusting the position of a light curtain emitted by an illumination assembly over a surface, comprising:
   determining a position of the light curtain;
   calculating a difference between the determined position of the light curtain and a desired position of the light curtain; and
   adjusting the position of the illumination assembly based on the calculated difference, wherein determining the position of the light curtain comprises:
   adjusting the position of the illumination assembly such that the light curtain intersects with the surface at a first location and capturing a first image frame of the surface;
   tilting the illumination assembly by a first known angle such that the light curtain intersects with the surface at a second location and capturing a second image frame of the surface;
   tilting the illumination assembly by a second known angle such that the light curtain intersects with the surface at a third location and capturing a third image frame of the surface; and
   processing the captured image frames to determine the position of the light curtain.

2. The method of claim 1 wherein the adjusting comprises adjusting the position of the illumination assembly until the light curtain is substantially at the desired position.

3. The method of claim 1 further comprising:
processing the captured image frames to determine the line of intersection between the light curtain and the surface at each of said first, second and third locations, and using the lines of intersection to determine the position of the light curtain.

4. The method of claim 1 wherein the first known angle is with respect to one of an X' and Y' axis of the plane of the light curtain and the second known angle is with respect to the other of the X' and Y' axis of the plane of the light curtain.

5. The method of claim 1 further comprising prompting a user to adjust the position of the illumination assembly.

6. The method of claim 5 wherein the prompting comprises displaying a set of instructions to the user via a projection module or a display unit.

7. The method of claim 5 wherein the prompting comprises broadcasting a set of instructions to the user via a speaker system.

8. The method of claim 2 further comprising:
processing the captured image frames to determine the line of intersection between the light curtain and the surface at each of said first, second and third locations, and using the lines of intersection to determine the position of the light curtain.

9. A method for adjusting the position of a light curtain emitted by an illumination assembly over a surface, comprising:
determining a position of the light curtain by measuring the distance between the light curtain and the surface at least at two locations;
calculating a difference between the determined position of the light curtain and a desired position of the light curtain by comparing the distance between the light curtain and the surface at a first location with the distance between the light curtain and the surface at a second location; and
adjusting the position of the illumination assembly based on the calculated difference.

10. The method of claim 9 wherein the measuring comprises placing a gauge tool adjacent to the surface.

11. The method of claim 10 wherein said measuring comprises processing captured image frames of said gauge tool to determine the distance at least at the two locations.

12. The method of claim 11 wherein an imaged surface of said gauge tool comprises at least one measurable parameter having a value determined by the distance between the surface and the light curtain.

13. The method of claim 9 further comprising prompting a user to adjust the position of the illumination assembly.

14. The method of claim 13 wherein the prompting comprises displaying a set of instructions to the user via a projection module or a display unit.

15. The method of claim 13 wherein the prompting comprises broadcasting a set of instructions to the user via a speaker system.

16. The method of claim 9 wherein the adjusting comprises adjusting the position of the illumination assembly until the light curtain is substantially at the desired position.

17. A method for adjusting the position of a light curtain emitted by an illumination assembly over a surface, comprising:
determining a position of the light curtain;
calculating a difference between the determined position of the light curtain and a desired position of the light curtain; and
adjusting the position of the illumination assembly based on the calculated difference, wherein said determining comprises:
capturing image frames of a gauge tool moving across said surface and processing the image frames to obtain a set of data points of light curtain reflections;
fitting the data points to a plane represented by a mathematical model to determine the coefficients of the mathematical model; and
using the coefficients to determine the required light curtain adjustment.

18. The method of claim 17 wherein the mathematical model of the plane is selected assuming the surface is planar.

19. The method of claim 18 wherein the determined light curtain adjustment is the adjustment required to orient the light curtain generally parallel to the surface.

20. The method of claim 17 wherein the data points are fitted to the plane via a least-squares method and said coefficients are solved via singular value decomposition.

21. The method of claim 19 wherein the data points of said set are processed to reduce outliers.

22. The method of claim 21 wherein random consensus fitting is employed to determine a consensus set of data points to use during fitting.

23. The method of claim 17 wherein said gauge tool is moved across different portions of said surface in different patterns and wherein a set of data points of light curtain reflections for each pattern are obtained, the sets of data points being used to determine the coefficients of the mathematical model.

24. The method of claim 17 wherein the mathematical model of the plane is selected assuming the surface is warped or curved.

25. The method of claim 24 wherein the determined light curtain adjustment is the adjustment required to orient the light curtain so that the minimum separation between the light curtain and any location on the surface is beyond a threshold.

26. The method of claim 24 wherein the data points are fit to said plane using an M-estimate fitting approach.

27. The method of claim 17 further comprising prompting a user to adjust the position of the illumination assembly.

28. The method of claim 7 wherein the prompting comprises displaying a set of instructions to the user via a projection module or a display unit.

29. The method of claim 27 wherein the prompting comprises broadcasting a set of instructions to the user via a speaker system.

30. The method of claim 17 wherein the adjusting comprises adjusting the position of the illumination assembly until the light curtain is substantially at the desired position.

31. An interactive input system comprising:
an illumination assembly configured to illuminate a light curtain over a surface;
an imaging module configured to capture image frames of the surface; and
processing structure configured to process captured image frames to determine the location of one or more pointers brought into proximity with said surface and breaking the plane of said light curtain, said processing structure, during calibration, further being configured to perform the method of:
determining a position of the light curtain;
calculating a difference between the determined position of the light curtain and a desired position of the light curtain; and adjusting the position of the illumination assembly based on the calculated difference, wherein determining the position of the light curtain comprises:
- adjusting the position of the illumination assembly such that the light curtain intersects with the surface at a first location and capturing a first image frame of the surface;
- tilting the illumination assembly by a first known angle such that the light curtain intersects with the surface at a second location and capturing a second image frame of the surface;
- tilting the illumination assembly by a second known angle such that the light curtain intersects with the surface at a third location and capturing a third image frame of the surface; and
- processing the captured image frames to determine the position of the light curtain.

32. A method for adjusting the position of a light curtain emitted by an illumination assembly over a surface, comprising:
- determining a position of the light curtain by measuring the distance between the light curtain and the surface at least at two locations;
- calculating a difference between the determined position of the light curtain and a desired position of the light curtain; and
- adjusting the position of the illumination assembly based on the calculated difference, wherein the measuring comprises placing a gauge tool adjacent to the surface and processing captured image frames of said gauge tool to determine the distance at least at the two locations.

33. The method of claim 32 wherein an imaged surface of said gauge tool comprises at least one measurable parameter having a value determined by the distance between the surface and the light curtain.

34. The method of claim 32 further comprising prompting a user to adjust the position of the illumination assembly.

35. The method of claim 34 wherein the prompting comprises displaying a set of instructions to the user via a projection module or a display unit.

36. The method of claim 34 wherein the prompting comprises broadcasting a set of instructions to the user via a speaker system.

37. The method of claim 32 wherein the adjusting comprises adjusting the position of the illumination assembly until the light curtain is substantially at the desired position.

38. An interactive input system comprising:
an illumination assembly configured to illuminate a light curtain over a surface;
an imaging module configured to capture image frames of the surface; and
processing structure configured to process captured image frames to determine the location of one or more pointers brought into proximity with said surface and breaking the plane of said light curtain, said processing structure, during calibration, further being configured to perform the method of:
- determining a position of the light curtain by measuring the distance between the light curtain and the surface at least at two locations;
- calculating a difference between the determined position of the light curtain and a desired position of the light curtain by comparing the distance between the light curtain and the surface at a first location with the distance between the light curtain and the surface at a second location; and
- adjusting the position of the illumination assembly based on the calculated difference.

39. An interactive input system comprising:
an illumination assembly configured to illuminate a light curtain over a surface;
an imaging module configured to capture image frames of the surface; and
processing structure configured to process captured image frames to determine the location of one or more pointers brought into proximity with said surface and breaking the plane of said light curtain, said processing structure, during calibration, further being configured to perform the method of:
determining a position of the light curtain;
calculating a difference between the determined position of the light curtain and a desired position of the light curtain; and
adjusting the position of the illumination assembly based on the calculated difference, wherein said determining comprises:
- capturing image frames of a gauge tool moving across said surface and processing the image frames to obtain a set of data points of light curtain reflections;
- fitting the data points to a plane represented by a mathematical model to determine the coefficients of the mathematical model; and
- using the coefficients to determine the required light curtain adjustment.

\* \* \* \* \*